INVENTORS
G. SANDALLS, JR DECEASED
AGNES R. SANDALLS
HIS ADMINISTRATRIX
E. L. VIBBARD
W. T. WICHMAN
BY William F. Simpson. ATTORNEY INVENTORS
G. SANDALLS JR DECEASED
AGNES R. SANDALLS
HIS ADMINISTRATRIX
E. L. VIBBARD
W.T. WICHMAN
BY William F. Simpson ATTORNEY

PAY STATION TELEPHONE SYSTEM

Filed June 3, 1954 21 Sheets-Sheet 3

INVENTORS
G. SANDALLS, JR. DECEASED
AGNES R. SANDALLS
HIS ADMINISTRATRIX
E. L. VIBBARD
W. T. WICHMAN
BY William F. Simpson. ATTORNEY INVENTORS
G. SANDALLS, JR DECEASED
AGNES R. SANDALLS
HIS ADMINISTRATRIX
E. L. VIBBARD
W. T. WICHMAN
BY William F. Sinkson ATTORNEY

PAY STATION TELEPHONE SYSTEM

Filed June 3, 1954 21 Sheets-Sheet 5

INVENTORS
G. SANDALLS, JR DECEASED
AGNES R. SANDALLS
HIS ADMINISTRATRIX
E. L. VIBBARD
W. T. WICHMAN
BY William F. Simpson ATTORNEY

PAY STATION TELEPHONE SYSTEM

Filed June 3, 1954 21 Sheets-Sheet 6

INVENTORS
G. SANDALLS, JR DECEASED
AGNES R. SANDALLS
HIS ADMINISTRATRIX
E. L. VIBBARD
W. T. WICHMAN
BY William F. Simpson ATTORNEY INVENTORS
G. SANDALLS, JR DECEASED
AGNES R. SANDALLS
HIS ADMINISTRATRIX
E. L. VIBBARD
W. T. WICHMAN
BY William F. Simpson ATTORNEY INVENTORS
G. SANDALLS, JR DECEASED
AGNES R. SANDALLS
HIS ADMINISTRATRIX
E. L. VIBBARD
W. T. WICHMAN
BY William F. Linkson ATTORNEY INVENTORS
G. SANDALLS, JR DECEASED
AGNES R. SANDALLS
HIS ADMINISTRATRIX
E. L. VIBBARD
W. T. WICHMAN
BY William F. Sinkeon ATTORNEY Aug. 5, 1958 G. SANDALLS, JR., ET AL 2,846,507

PAY STATION TELEPHONE SYSTEM

Filed June 3, 1954 21 Sheets-Sheet 10

INVENTORS
G. SANDALLS, JR DECEASED
AGNES R. SANDALLS
HIS ADMINISTRATRIX
E. L. VIBBARD
W. T. WICHMAN
BY William F. Simpson ATTORNEY INVENTORS
G. SANDALLS, JR DECEASED
AGNES R. SANDALLS
HIS ADMINISTRATRIX
E. L. VIBBARD
W. T. WICHMAN
BY
William F. Simpson ATTORNEY INVENTORS
G. SANDALLS, JR DECEASED
AGNES R. SANDALLS
HIS ADMINISTRATRIX
E. L. VIBBARD
W. T. WICHMAN
BY William F. Simpson, ATTORNEY Aug. 5, 1958 G. SANDALLS, JR., ET AL 2,846,507

PAY STATION TELEPHONE SYSTEM

Filed June 3, 1954 21 Sheets-Sheet 13

INVENTOR
G. SANDALLS, JR DECEASED
AGNES R. SANDALLS
HIS ADMINISTRATRIX
E. L. VIBBARD
W. T. WICHMAN
BY William F. Simpson ATTORNEY INVENTORS
G. SANDALLS, JR DECEASED
AGNES R. SANDALLS
HIS ADMINISTRATRIX
E. L. VIBBARD
W. T. WICHMAN
BY William F. Simpson ATTORNEY INVENTORS
G. SANDALLS, JR DECEASED
AGNES R. SANDALLS
HIS ADMINISTRATRIX
E. L. VIBBARD
W. T. WICHMAN
BY
William F. Simpson ATTORNEY INVENTORS
G. SANDALLS JR DECEASED
AGNES R. SANDALLS
HIS ADMINISTRATRIX
E. L. VIBBARD
W.T. WICHMAN
BY
William F. Simpson ATTORNEY INVENTORS
G. SANDALLS, JR DECEASED
AGNES R. SANDALLS
HIS ADMINISTRATRIX
E. L. VIBBARD
W.T. WICHMAN
BY William F. Simpson ATTORNEY INVENTORS
G. SANDALLS, JR DECEASED
AGNES R. SANDALLS
HIS ADMINISTRATRIX
E. L. VIBBARD
W. T. WICHMAN
BY William F. Simpson ATTORNEY INVENTORS
G. SANDALLS, JR DECEASED
AGNES R. SANDALLS
HIS ADMINISTRATRIX
E. L. VIBBARD
W. T. WICHMAN
BY William F. Simpson. ATTORNEY INVENTORS
G. SANDALLS, JR DECEASED
AGNES R. SANDALLS
HIS ADMINISTRATRIX
E. L. VIBBARD
W. T. WICHMAN
BY William F. Linkson ATTORNEY Aug. 5, 1958 G. SANDALLS, JR., ET AL 2,846,507

PAY STATION TELEPHONE SYSTEM

Filed June 3, 1954 21 Sheets-Sheet 21

INVENTORS
G. SANDALLS, JR DECEASED
AGNES R. SANDALLS
HIS ADMINISTRATRIX
E. L. VIBBARD
W. T. WICHMAN
BY William F. Simpson ATTORNEY

United States Patent Office 2,846,507

Patented Aug. 5, 1958

2,846,507

PAY STATION TELEPHONE SYSTEM

George Sandalls, Jr., deceased, late of North Tarrytown, N. Y., by Agnes R. Sandalls, administratrix, North Tarrytown, N. Y., Edward L. Vibbard, La Jolla, Calif., and Wesley T. Wickman, New York, N. Y., assignors to Bell Telephone Laboratories, Incorporated, New York, N. Y., a corporation of New York Application June 3, 1954, Serial No. 434,125

14 Claims. (Cl. 179—6.3)

This invention relates to telephone systems and more particularly to systems in which calls from lines equipped with coin boxes are charged against the calling person through the collection of deposited coins or tokens.

In dial switching telephone systems, to enable a calling party at the substation of a line equipped with a coin box to establish calls, it has been the customary practice to instruct him to deposit a coin, and if the call is one to be terminated outside of the local calling area, that is, an area requiring a toll charge, to then dial zero to secure the assistance of an operator. In response to the extension of a connection to a trunk terminating at a switchboard, an operator thereat, by plugging into the trunk jack, causes the coin box apparatus at the calling substation to refund the initially deposited coin, and then requests information from the calling party concerning the desired connection. The operator then makes out a toll ticket and requests the calling party to deposit coins in payment for the initial period of conversation, as determined by the tariff rate for a call to the desired destination. After audibly hearing the deposit of the required coins, the operator proceeds to establish the desired connection by dialing or keying up the digits of the desired line number, or through the assistance of a recording toll operator. When the called subscriber responds, the operator notes the time on the toll ticket and times the duration of the conversation. Just prior to the expiration of the initial period, the operator challenges the calling party and informs the party to signal through talking. When the operator receives such a termination signal, the calling party is informed of the additional coins required for the overtime period of conversation, the operator then listens for the deposit of these coins.

From the foregoing brief description it will be apparent that for every toll call the operator is required to make out a toll ticket for timing the call, and must give the call supervision throughout its duration. Some of the operator's time is also consumed in the establishment of the connection.

It is, therefore, an object of the present invention to provide novel facilities for handling toll calls at coin box stations in step-by-step offices, whereby persons using such stations may establish short haul toll connections via a cross bar tandem office, by dialing the called number directly, and whereby the services of an operator to supervise such connections for the purpose of collecting and refunding deposited coins are reduced to a minimum.

Another object of the present invention is to provide facilities by which short haul toll calls are completed via the cross bar tandem office, and local calls from the same coin box station are completed over the local office step-by-step switch train in the usual manner.

In accordance with the exemplary embodiment of the present invention these objects are obtained by simultaneously directing all calls from coin box lines to a trunk outgoing to a tandem office and to a local train of selector switches.

When the calling subscriber lifts the receiver and deposits a coin, a connection is automatically established through the step-by-step office to the first selector of a local train of switches, and at the same time to an incoming trunk in a tandem cross bar office via a step-by-step outgoing trunk. A feature of the present invention relates to the simultaneous establishment of the two connections. The incoming trunk in the tandem office seizes one of a plurality of associated senders, which thereupon sends a dial tone back thorugh the step-by-step office to the coin box of the calling subscriber. If dial tone is not received from the tandem office, a timing circuit in the step-by-step office causes the disconnection of the tandem office and dial tone is received locally.

Another feature of the present invention pertains to the provision of means in the step-by-step office for supplying dial tone if dial tone is not supplied for a predetermined interval from the tandem office.

When the coin subscriber dials after receiving dial tone from the tandem sender, the dial pulses are registered in the tandem sender and, at the same time, they set up the switches in the step-by-step local train. In the case where the call dialed is a local call, a tandem marker, associated with the tandem office senders, sets the incoming trunk to notify the step-by-step outgoing trunk to cut the coin subscriber through on the local step-by-step train. Under this condition the step-by-step outgoing trunk is released, causing the incoming tandem trunk and sender also to release.

When the call is an out-of-the-local zone or a toll call, the tandem marker prepares to signal the coin operator, and when dialing is completed, does so by lighting one of a plurality of zone charge lamps. The coin operator, in answering this signal with a cord, causes the step-by-step outgoing trunk to be signaled to release the step-by-step local train, causes the original deposited coin to be refunded, and requests the subscriber to deposit coins to cover the cost of the initial charge period in accordance with the lighted zone charge lamp. The coin operator checks that the proper coins are deposited by listening for the bell or gong in the coin box. When satisfied that the proper coins have been deposited, the operator disconnects the cord from the trunk, whereupon the tandem sender completes the connection to the called subscriber. When the called subscriber answers, the tandem trunk counts two to five seconds to be sure that the answer signal is not a busy indication, and then operates the charge relay to start timing the initial talking period, and signals the step-by-step office to set the coin box trunk for collection on disconnect. The tandem trunk times the call, and a half minute before the end of the initial charge period, functions to cause the coin box trunk in the step-by-step office to collect the coins. It also sets the coin trunk to refund on disconnect in case the subscriber deposits another coin before the end of the period. At the end of the initial charge period, if the subscribers are still talking, the coin operator is signaled by a flashing zone charge lamp to supervise the overtime period. The coin operator can manually refund the coins in the coin box associated with the calling subscriber station following collection of coins at the end of the initial charge period, and can manually collect or refund coins during the overtime period. The coin operator has switchhook supervision from the calling subscriber but none from the called subscriber; can monitor or talk to either subscriber; and can split the connection during the overtime period. When the coin operator is cut-in on the connection, the operaor has control, and the circuit waits for disconnect of the operator before it can be restored to normal.

During each operation of the toll call a prime signal and a check signal are sent between the step-by-step and tandem offices. For example, during seizure a start signal is sent from the outgoing trunk in the step-by-step office to the incoming trunk in the tandem office, and the incoming trunk returns a check signal to indicate receipt of the start signal and to set the outgoing trunk for the next operation. Each operation therefore in the over-all sequence of operations necessary in placing a call from a coin box associated with a step-by-step office to a subscriber in an office reached through the tandem office is checked. The signaling between the two offices provides for a reliable and accurate telephone system.

Another feature of the present invention pertains to the provision of a novel telephone system connecting step-by-step coin stations and their associated offices with other offices reached through a cross bar tandem point where each step of the necessary sequence of operations in placing a call between offices is checked before the next step or operation is possible.

Still another feature of the present invention relates to the provision of a novel and rapid coin trunk circuit which starts a trunk finder hunting for the coin trunk without waiting for the line finder to seize the calling line.

Further objects, features and advantages will become apparent and the invention will be more clearly understood upon consideration of the following detailed description taken in connection with the accompanying drawings wherein.

Figures 16, 17:
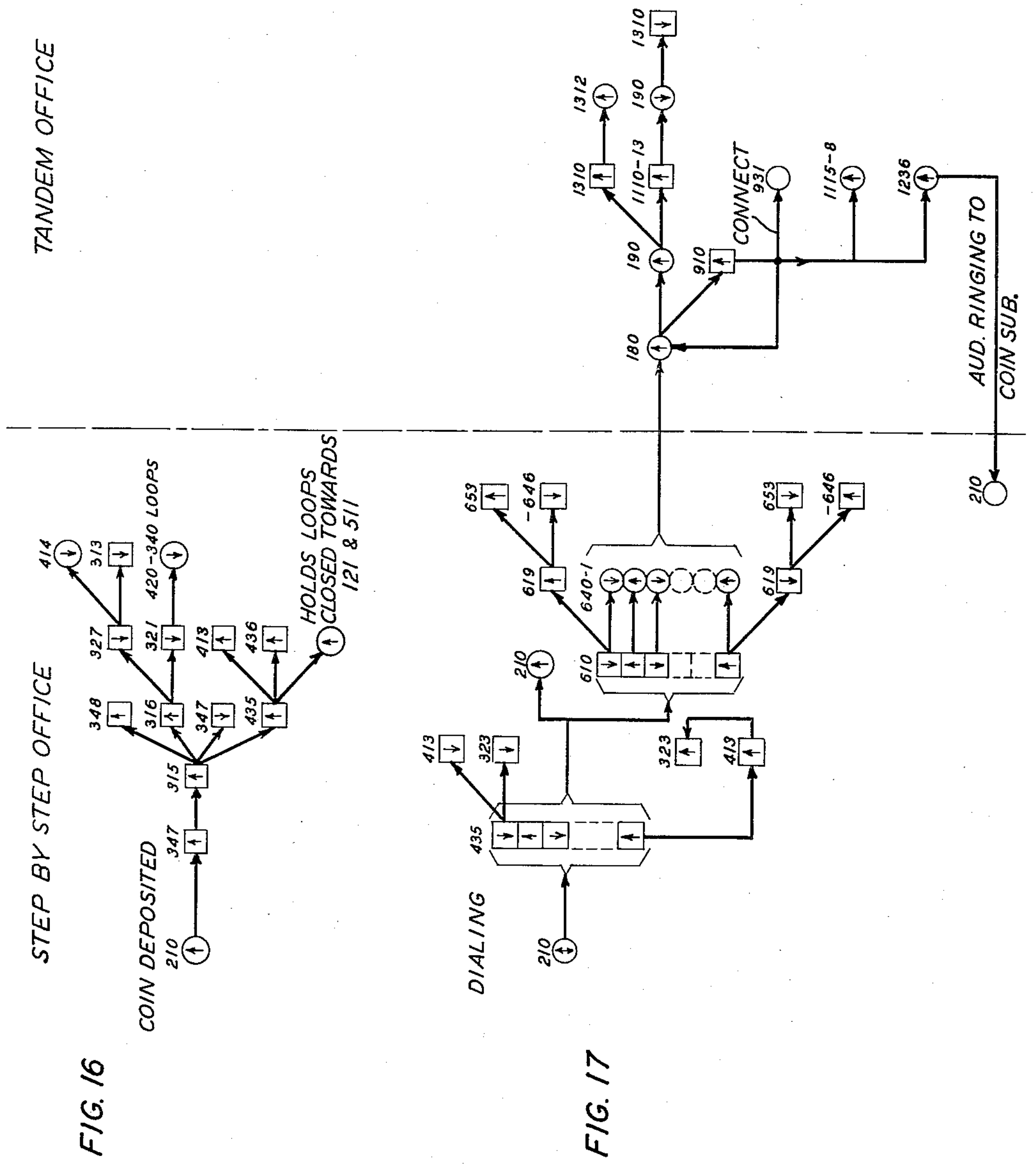
Figures 18, 18A:
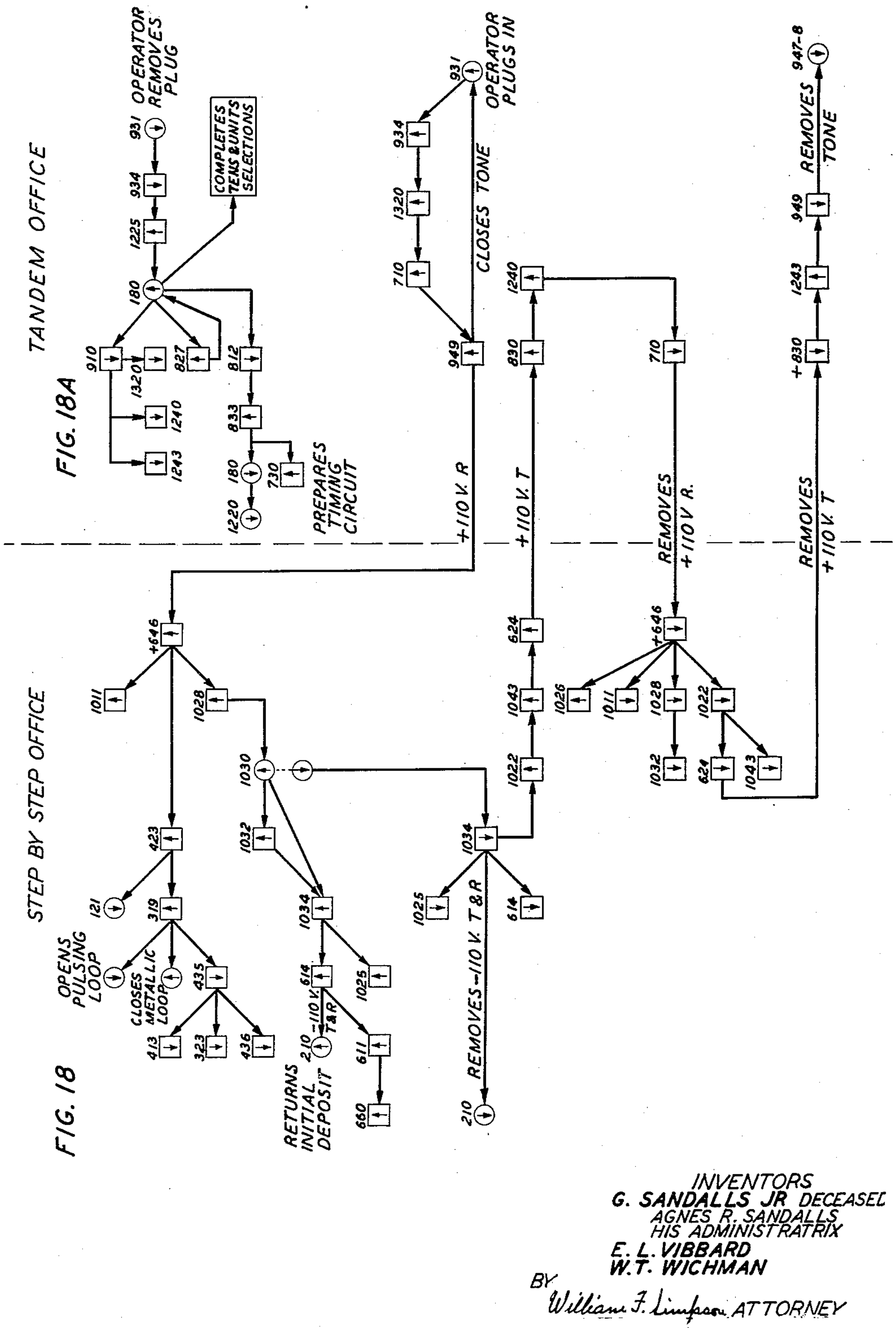
Figure 19:
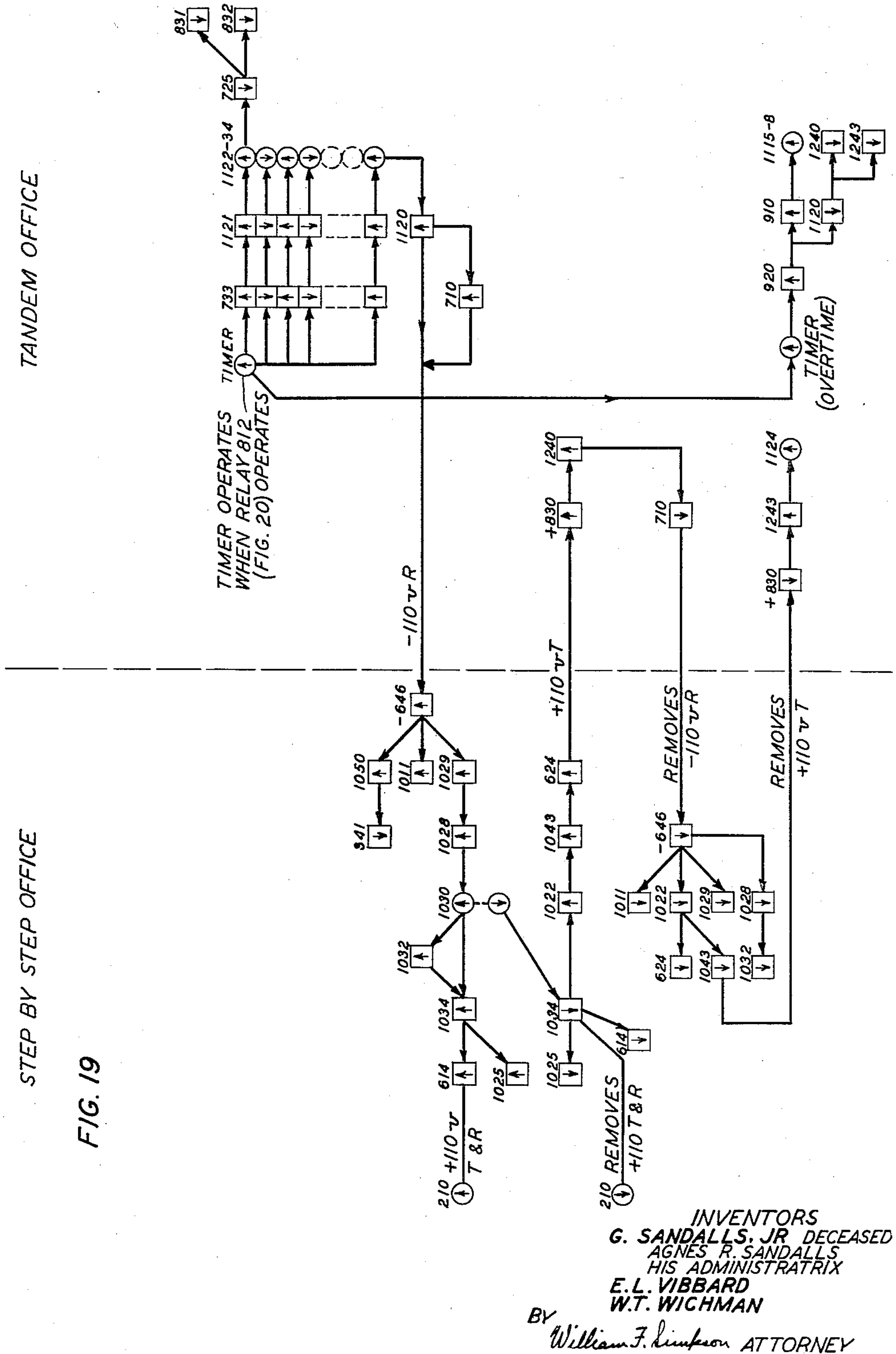
Figure 20:
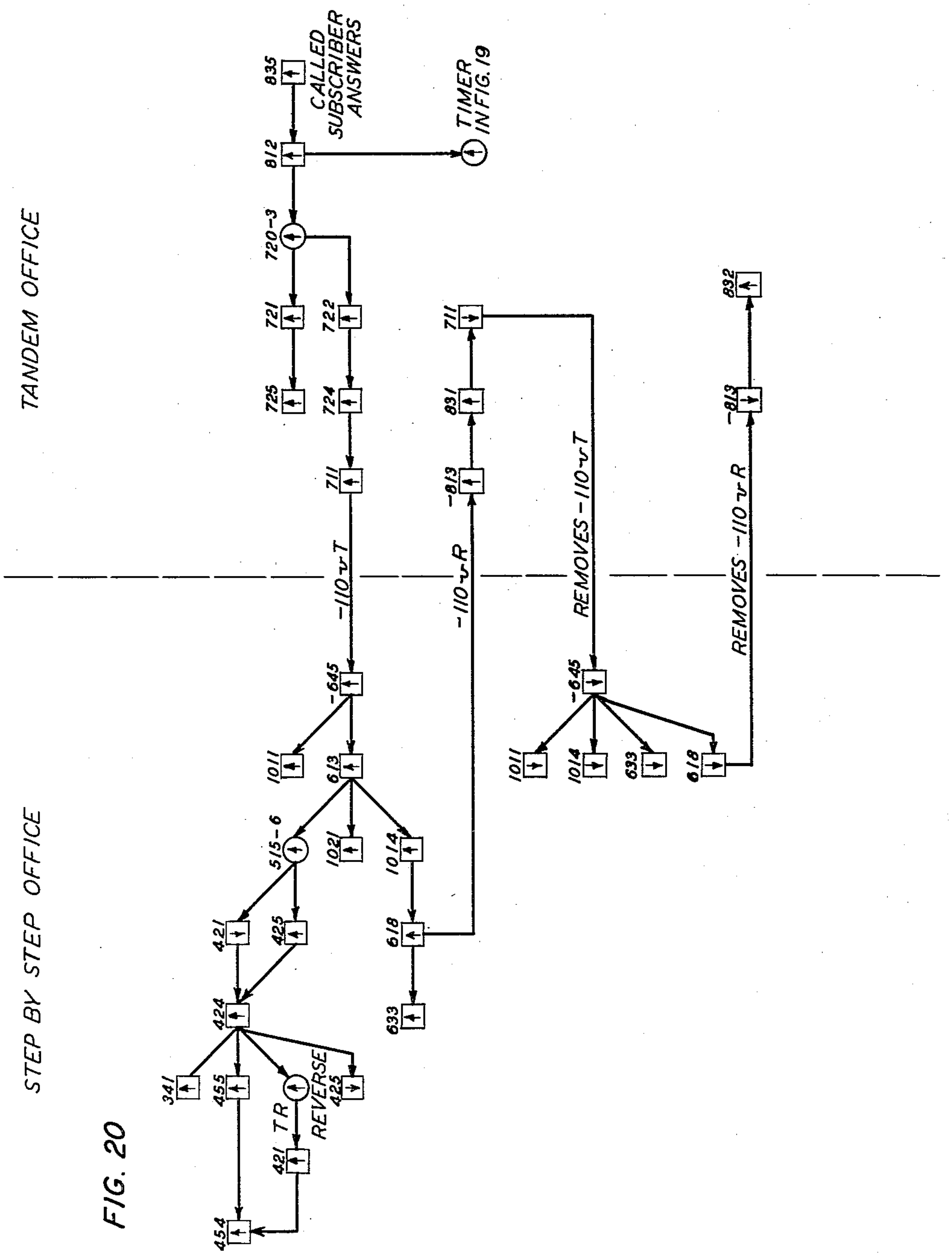
Figure 21:
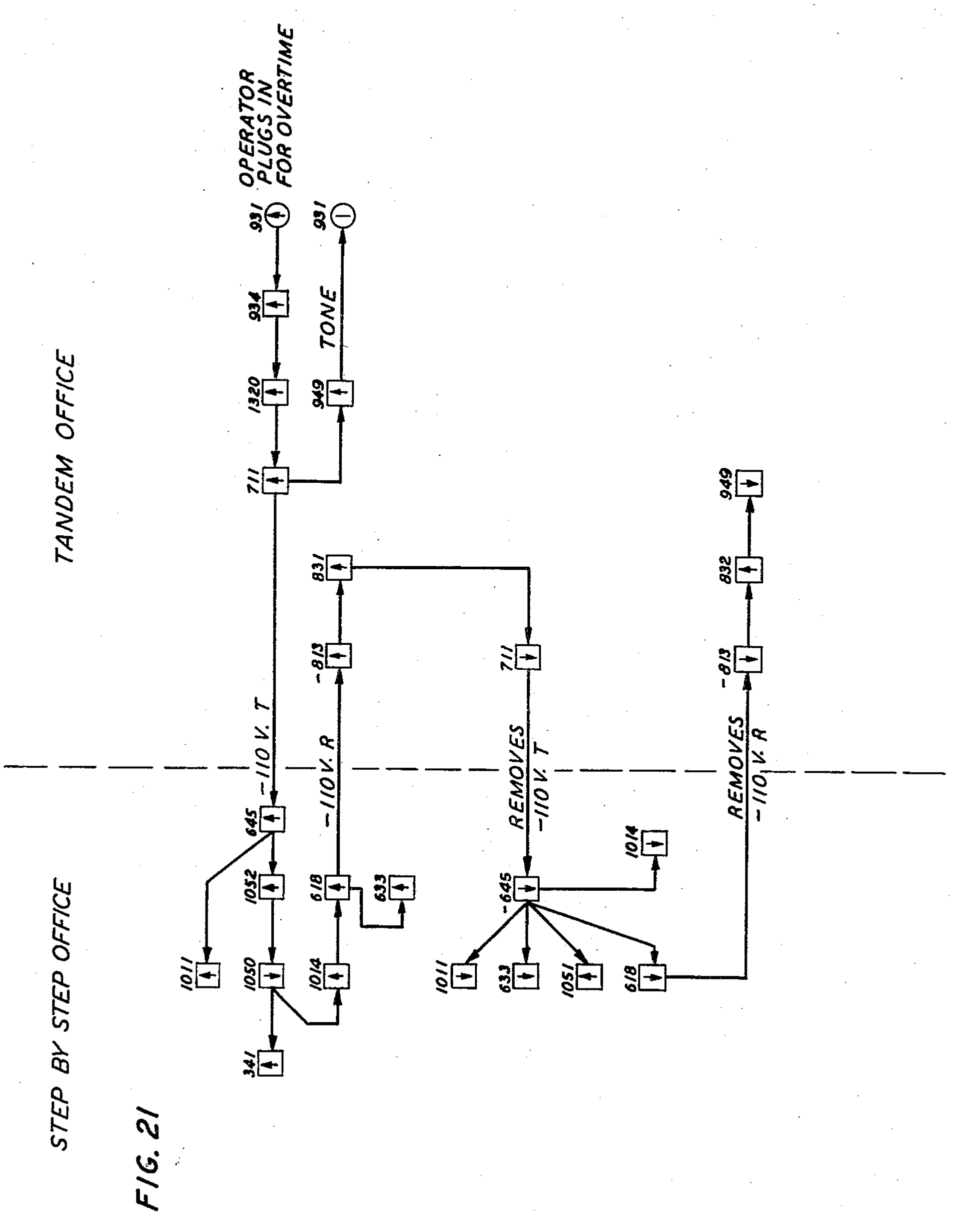
Figure 22:
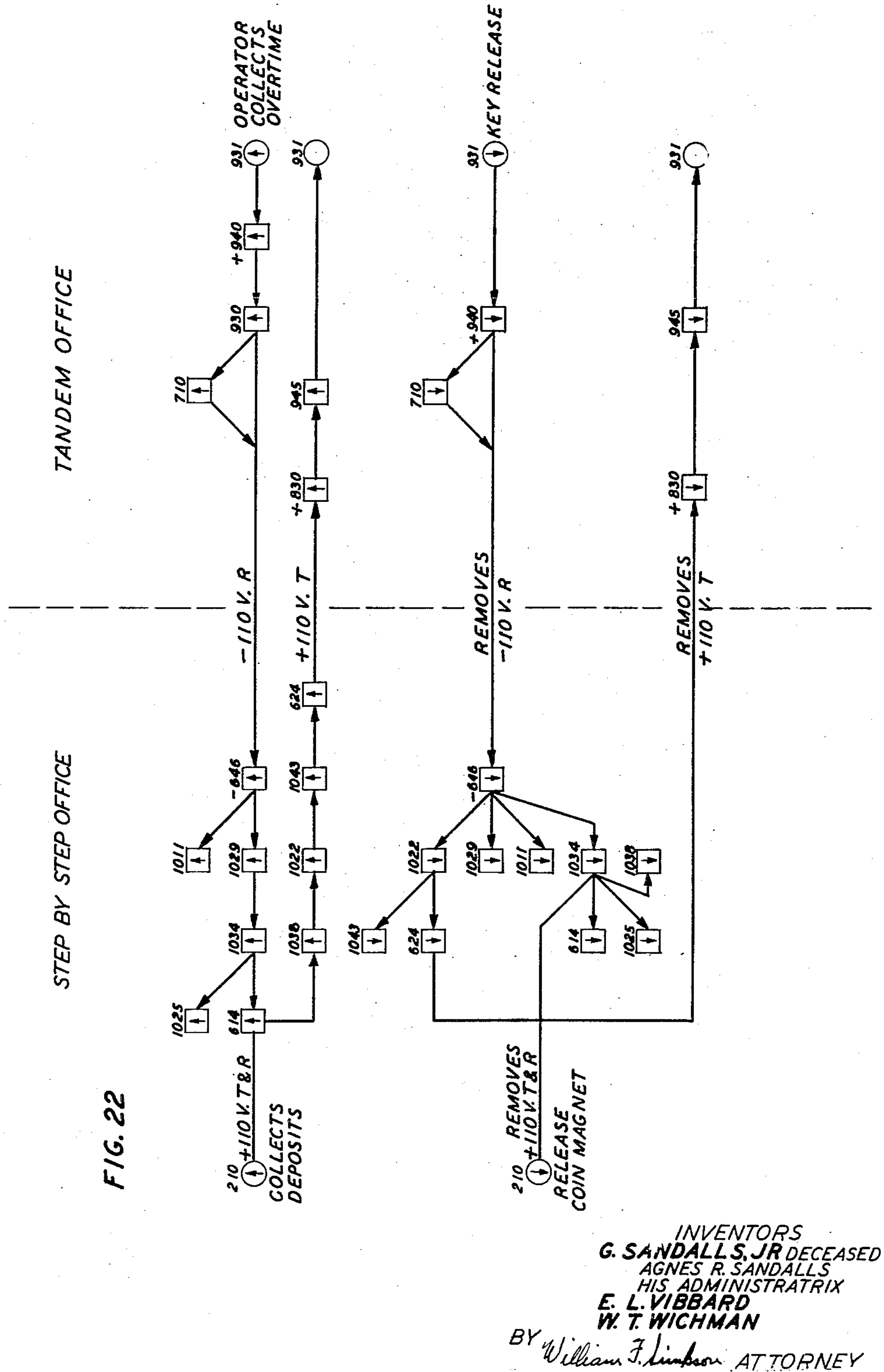
Figure 23:
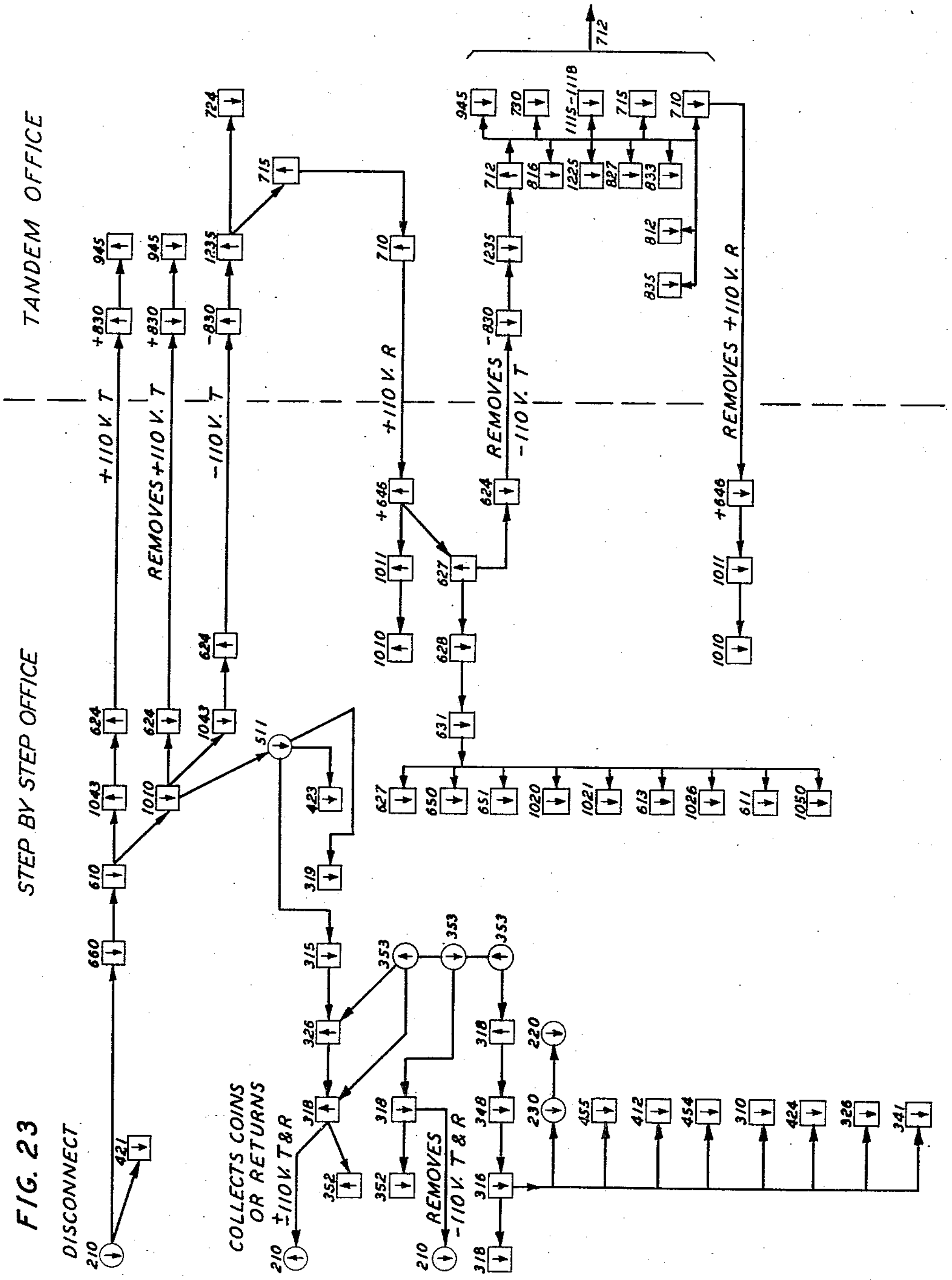

Fig. 16 illustrating the operations that occur when the calling subscriber deposits a coin after dial tone has been received;

Fig. 17 illustrating the operations that occur when the calling subscribed dials after depositing a coin;

Fig. 18 illustrating the operations that occur when the coin operator answers;

Fig. 18A illustrating the operations that occur when the operator removes the plug from the answering jack;

Fig. 19 illustrating the operations that occur in timing the initial period and collecting the initial period deposit;

Fig. 20 illustrating the sequence of operations that occur when the called subscriber answers;

Fig. 21 illustrating the sequence of operations that occur when the operator plugs in for overtime;

Fig. 22 illustrating the operations that occur when the overtime coins are collected by the operator; and Fig. 23 illustrating the operations that occur when the calling subscriber disconnects.

GENERAL DESCRIPTION

Figure 1:
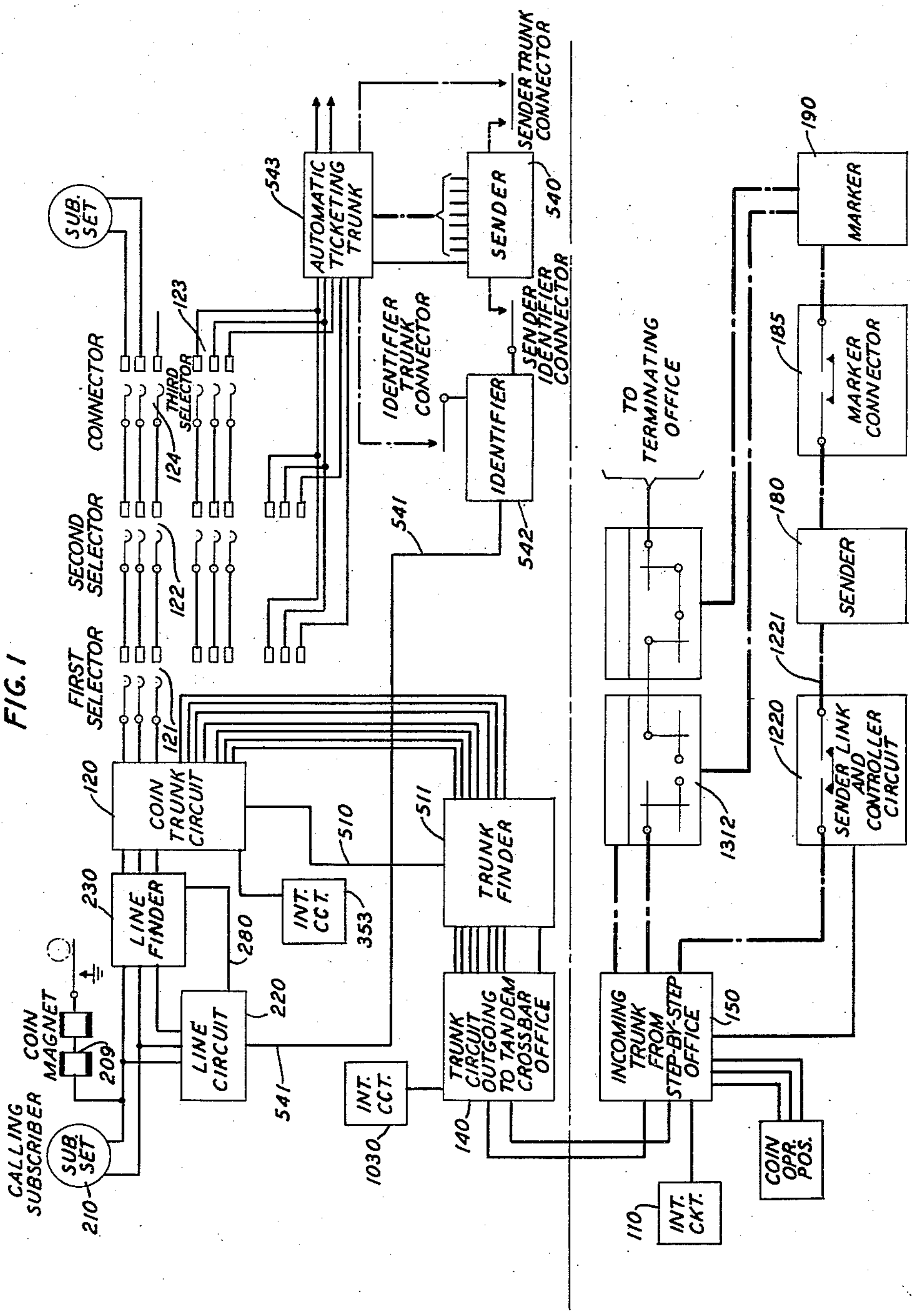
Fig. 1 is a diagrammatic representation of the telephone system of the present invention.

Referring to Fig. 1, which shows the telephone system of the present invention in diagrammatic form, a call may be initiated from the coin box or subset 210. When the receiver is lifted in subset 210 by the coin or calling subscriber, a line circuit 220 functions over lead 280 to start the line finder 230 hunting for the calling line. The line finder 230 is connected to the coin trunk circuit 120. The line finder 230, in starting its hunting function, also causes the trunk finder 511 to start hunting for the coin trunk circuit 120. The line finder circuit 230 initiates this early operating start of the trunk finder 511, even before the line finder seizes the calling line, by connecting an initiating path through the coin trunk circuit 120 and control lead 510 to the trunk finder 511. The line finder 230, line circuit 220, coin trunk circuit 120 and an outgoing trunk circuit 140, are all located in the step-by-step office.

The line circuit 220 may be of a type, well known in the art, exemplified by the Patents 2,294,500 which issued to H. Hovland on September 1, 1942, 1,799,654 which issued to R. L. Stokely on April 7, 1931, and 2,210,068 which issued to T. L. Dimond on August 6, 1940. These patents also disclose line finder and trunk finder circuits, which are thus similarly well known in the art, and such descriptions are to be incorporated herein as part of the disclosure. Reference may also be had to pages 53 to 65, inclusive, of the second edition of "Automatic Telephony" by Smith and Campbell for a description of step-by-step switches and their operation when used as selectors and connectors. When the line finder 230 seizes the calling line, it starts the coin trunk circuit 120 operating. The coin trunk circuit 120 prepares a path for the transmission of dial tone, starts timing the operation, and closes operating loops to the trunk finder 511 towards tandem, and also to the first selector 121 towards the local area.

When the trunk finder 511 seizes the coin trunk circuit 120, it extends the loop to the outgoing trunk circuit 140, which is partially controlled by the interrupter circuit 1030. The outgoing trunk circuit 140, in turn, closes a loop to the cross bar tandem office incoming trunk circuit 150, which is partially controlled by the interrupter circuit 110, and sends a +110 volt start signal thereto on the ring lead. The distance from the step-by-step office to the tandem office may be great so that the ohmic losses require such high signaling potentials. Throughout the sequence of operations that occur in making a tandem or local call, as is hereinafter described, until dial tone is supplied from the tandem office, only plus or minus 110-volt signals are utilized between the outgoing trunk circuit 140 and incoming trunk circuit 150.

When the start signal is received at the tandem office, the incoming trunk 150 functions to return a −110 volt check signal to the outgoing trunk 140 on the tip lead and to associate itself with sender 180. Upon receiving the check signal, the outgoing trunk 140 removes the start signal. Responsive to the removal of the start signal, the incoming trunk 140 removes the check signal, causing the outgoing trunk 140 to be set to receive signals from the tandem sender 180 over the tip and ring leads. The cross bar tandem office equipment, except for the incoming trunk 150, is not described herein in detail being generally old in the art exemplified by the Patents 2,235,803 to W. W. Carpenter which issued on March 18, 1941, and 2,559,312 to J. B. Newsom which issued on July 3, 1951. When the start signal is received from the outgoing trunk 140, the incoming trunk 150 connects through the sender link 1220 and lead 1221 to select a tandem sender 180. When connection to sender 180 is established, it returns a −48 volt signal on the tip lead through the sender link 1220 and incoming trunk 150 to the step-by-step office outgoing trunk 140, which thereupon functions to hold the sender 180. After approximately 150 milliseconds, the sender 180 transfers the −48 volt battery from the tip to the ring and closes dial tone over the tip and ring through the sender link 1220, incoming trunk 150, outgoing trunk 140, trunk finder circuit 511, coin trunk circuit 120, line finder circuit 230 to the coin subscriber of subset 210. Transfer of the −48 volt signal from the tip to the ring causes outgoing trunk 140 to prepare itself for dialing, and to send a signal to coin trunk circuit 120, as an indication that dial tone is being supplied to the subscriber from the tandem sender 180.

If dial tone is not received from the distant tandem office within a prescribed time following seizure of the coin trunk circuit 120, the coin trunk circuit 120 transfers the transmission path from the trunk finder 511 to the first selector 121 and dial tone is thereafter supplied to the subscriber through the first selector 121. The coin trunk circuit 120 at the same time releases the outgoing trunk 140 and trunk finder 511, so that deposit of a coin by the calling subscriber closing a path for the coin magnet 209 which is actually part of the subset 210, will now prepare the circuit for dialing over the local train.

A modification of the coin trunk circuit 120, hereinafter described in detail, provides that the dial-tone transmission path to the calling subscriber is not closed until after the coin has been deposited.

When dial tone is supplied from the tandem office and the coin has been deposited, the dial pulses from subset 210 are repeated in coin trunk 120 simultaneously to the local train consisting of the first selector 121, second selector 122, third selector 123 and connector 124 and also to the outgoing trunk 140 where they are again repeated to the sender 180 in the tandem office. As soon as the sender 180 receives the office code, it associates itself with the marker 190 through a marker connector circuit 185. The sender 180, under this condition, transfers the called office code to the marker 190. With this information and also the calling subscriber zone information, the marker 190 disconnects itself from the sender 180 and determines if the call is a local call or an extended zone call. If the call is a local call, the marker passes this information to the incoming trunk 150 which signals the outgoing trunk 140 in the step-by-step office. The outgoing trunk 140 thereupon prepares to release, and signals coin trunk 120 to release the connection toward the tandem office and to set itself for local train operation. The call thereafter proceeds through the coin trunk 120 to the called subscriber, directly through the selectors 121, 122, etc.

If, however, the indication in the marker 190 is for a zone call, the marker 190 proceeds to connect the incoming trunk 150 through the trunk link 1312 to an outgoing trunk, not shown, to the proper office, also not shown, setting the incoming trunk 150, to indicate to the operator the proper zone charge. Thereafter the marker 190 disconnects from the trunk link and connector 1312.

During the time that the marker 190 is busy with the above functions, the tandem sender 180 receives the balance of the dialed number, and proceeds to make an outgoing selection as soon as the marker 190 completes the connection to an outgoing trunk through connector 1312. When all the digits have been received the sender 180 signals the coin supervisory operator.

When the coin operator plugs in, responsive to the signal from the sender 180, incoming trunk 150 sends a signal to the step-by-step office which causes coin trunk 120 to release the local train, and outgoing trunk 140 to automatically refund the coin subscriber's initial deposit. The coin supervisory operator then requests the deposit of the required charge, and when audible indications are received that the coin subscriber has deposited the correct charge, the operator disconnects from the circuit. When the operator disconnects, the tandem sender 180 is signaled to proceed to control the completion of the connection to the wanted line in accordance with the digit information registered therein.

When the called subscriber answers, the timing of the call is initiated and after four and one-half minutes the deposited coins are collected automatically. After five minutes the proper charge rate lamp is flashed to indicate to the operator that an overtime interval has been reached. The operator again plugs a cord circuit into the jack associated with the flashing lamp and directs the calling person to signal at completion or to deposit additional coins. In most cases the subscriber will elect to terminate the conversation at once. If not, however, the operator leaves the plug of the cord circuit in the trunk jack, writes a ticket and handles the call in the manner hereinbefore described. It is thus apparent that unless the conversation extends beyond the initial period, the services of the coin operator are required but for a very brief interval. For a call in which the conversation extends beyond the initial period, which calls constitute only about ten percent of the short haul toll traffic from coin box lines, the continued supervision of the operator will be required only for that portion of the overtime period during which the conversation is continued.

Figure 15:
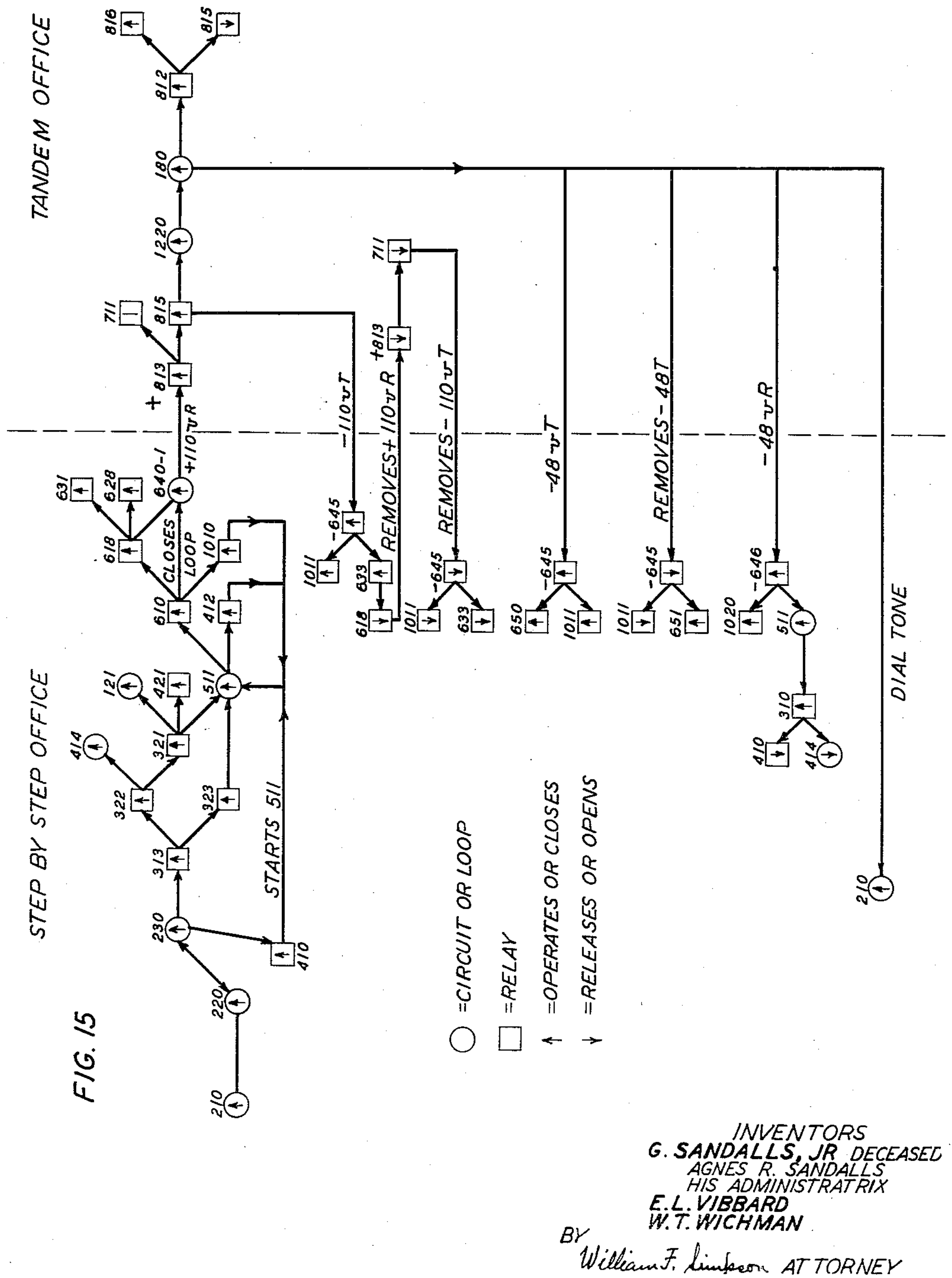
Figs. 15 through 23 are a series of sequence charts which illustrate the operation of the circuitry of the present invention in placing a toll call; with Fig. 15 illustrating the seizure operations that occur when the receiver of the calling subscriber is lifted.

*Seizure—Sequence chart Fig. 15*

Figures 2, 14:
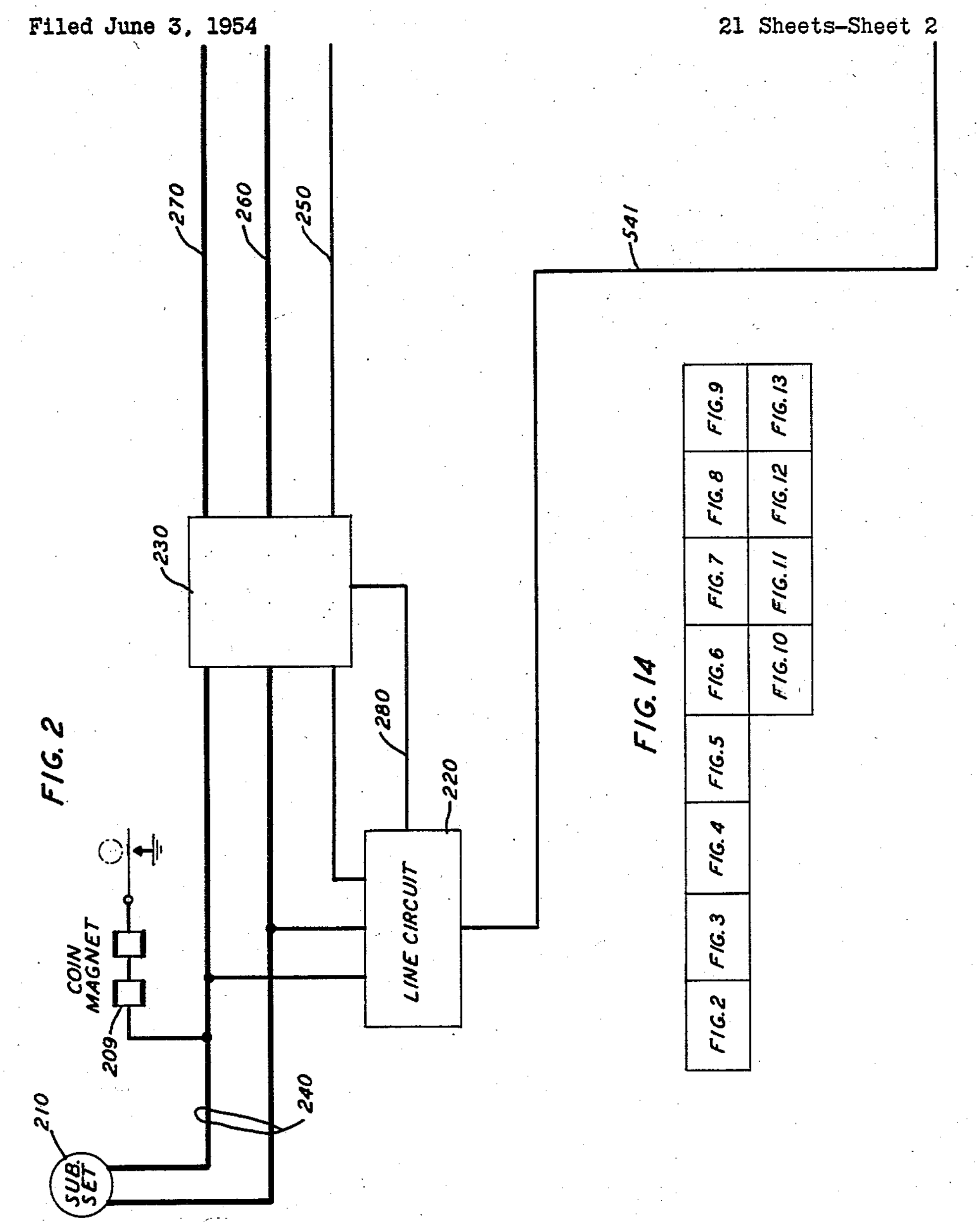
Figs. 2 through 13 are circuit diagrams of the telephone system of the present invention.
Fig. 14 is a chart showing how the several Figs. 2 through 13 of the drawings should be arranged.

In the following description the thousandth and hundredth place digits of the numbers designating the various circuit elements in Figs. 2 through 13, generally indicate the figures in which they appear. For example, the component 1110 appears in Fig. 11. Fig. 14 illustrates the arrangement of Figs. 2 through 13.

When a subscriber wishes to place a call, from the subset 210 to a subscriber associated with a tandem cross bar office, the operation of the circuit of the present invention as shown in Figs. 2 through 13 proceeds in accordance with the sequence charts of Figs. 15 through 23.

Referring briefly to the sequence charts of Figs. 15 through 23, each circle indicates a circuit or a loop; each square indicates a relay; the arrows inside the squares or circles refer to the condition of the circuits, loops or relays with an arrow pointing upward signifying the closure or operation thereof and an arrow pointing downward illustating the opening or release thereof; the numbers over the circles and squares signify the designation of the circuit, loop or relay which is shown specifically in the Figs. 2 through 13; and the arrows that connect the circles and squares illustrate the cause and the effect with the arrow pointing towards the circuit, loop or relay that is effected, from the circuit, loop or relay that is the cause. For example, referring to Figs. 2 and 15, the circuit 210 closes loop 240 causing the circuit 220 to operate which then causes circuit 230 to operate. The circuit 230, in turn, causes relays 410 and 313 to operate and the operation of relay 313 causes the operation of relays 322 and 323. The sequence of operations proceeds in this manner until at the bottom of the chart, shown in Fig. 15, dial tone is sent to the circuit 210.

When the receiver is removed from the hook at the coin station 210 the sequence of operations that occurs proceeds, therefore, according to the sequence chart of Fig. 15. Referring then to Figs. 2 through 13 and to Fig. 15, the line circuit 220 operates, responsive to the lifting of the receiver at coin station 210, to place ground on the start lead 280 to line finder 230. The line finder 230 thereupon places ground on the sleeve lead 250 to the associated coin trunk circuit 120, and simultaneously commences hunting for the calling line 240 which is associated with the calling subscriber subset 210. The sleeve lead 250 is connected through the winding of relay 410, to battery 411 through the normally closed contact of jack 312, contact 4 of relay 311 normal and contact 3 of relay 310 normal so that when the line finder circuit 230 grounds the sleeve lead 250, relay 410 operates. The operation of relay 410 closes ground to the control lead 510 towards the trunk finder 511 over a path through contact 1 of relay 412 normal and contact 1 of relay 410 operated. The connection of ground to the control lead 510 starts the trunk finder 511 hunting for the coin trunk 120, as described above, in reference to Fig. 1, even before the line finder 230 seizes the line 240. The operation of relay 410 also connects battery through relay 412 normal and contact 2 of relay 410 operated to the sleeve 520 to mark the terminals of trunk 120 ready for seizure by the trunk finder 511. The operation of relay 410 in this manner facilitates the connection to the outgoing trunk 140, hereinafter described in detail.

When the line finder 230 seizes the calling line 240, relay 313 operates over the calling subscriber loop with the operating path being from negative battery 314 through contact 2 of relay 315 normal, contact 5 of relay 316 normal, resistor 317, contact 5 of relay 321 normal, through the lower coil of relay 313, contact 3 of relay 318 normal, contact 3 of relay 319 normal to the ring lead 260 through line finder 230 and the subscriber set 210, back through the line finder 230 to the tip lead 270 through contact 2 of relay 319 normal, contact 2 of relay 318 normal, coil 320, the top winding of relay 313, contact 4 of relay 321 normal, to ground. The operation of relay 313 closes conductive paths through the windings of relays 322 and 323, with relay 322 operating over a path from negative battery 324 through contact 3 of relay 316 normal, the winding of relay 322, the contact of relay 313 operated, to ground, and relay 323 operating over a path from negative battery 325 through the contact 1 of relay 326 normal, the winding of relay 323, the contact of relay 413 normal, contact 3 of relay 321 normal and the contact of relay 313 operated, to ground. The operation of relay 323 grounds the line finder sleeve 250 over a path through the closed contact of jack 312, contact 3 of relay 323 operated, to ground, and in addition, as is hereinafter described, prepares a path for dial tone, and removes the short circuits across the retard coils 334 and 335. A path is prepared for dial tone from the ring lead 260 of the line finder 230 through contact 3 of relay 319 normal, capacitor 327, contact 2 of relay 323 operated, resistor 328, and contact 6 of relay 311 normal to the ring lead 330 to the trunk finder 511, and also from the tip lead 270 from the line finder 230 through contact 2 of relay 319 normal, capacitor 331, contact 4 of relay 323 operated, resistor 332, contact 3 of relay 311 normal to the tip lead 333 to the trunk finder 511. Dial tone is supplied, as is hereinafter described, to the calling subscriber at subset 210 over these ring and tip circuits. The short circuits across the retard coils 334 and 335, described above, are removed when relay 323 operates by opening the contacts 1 and 5 thereof.

The operation of relay 322, described above, removes a —48 volt battery 336 from the gas tube timing circuit 414, which is hereinafter described, to permit the 8.56 to 8.72-microfarad capacitor 415 to begin charging towards +110 volts. The circuit that is broken by the opening of the upper contact of relay 322 is from negative battery 336 through the upper contact of relay 322 operated, through resistor 416 to the start anode of the gas tube 417. The capacitor 415 is connected to the +110 volt source 460 through the resistor 416 and the resistor 461. When the capacitor 415 becomes fully charged the tube 417 ionizes across the starting gap. The cathode of tube 417 is connected to ground through resistor 462 and the main anode, to which the ionization is transferred, is connected to the +110 volt potential source 433, and to ground through capacitor 464.

The operation of relay 322, described above, also closes an operating path through relay 321 causing the operation thereof. The operating path for relay 321 is from negative battery 324 through contact 3 of relay 316 normal, the winding of relay 321 through the lower contact of relay 322 operated, to ground. The operation of relay 321 causes the transfer of the ring side 260 of the line through the lower winding of relay 418, and the tip side 270 of the line from direct ground, to ground through the 6000-ohm upper winding of relay 418 normal. The ring 260 is connected through contact 3 of relay 319 normal, contact 3 of relay 318 normal, the lower coil of relay 313, contact 5 of relay 321 operated, the lower winding of relay 418 normal, the winding of marginal relay 347, contact 5 of relay 316 normal, and contact 2 of relay 315 normal to negative battery 314. The tip 270 is transferred to a conductive path through contact 2 of relay 319 normal, contact 2 of relay 318 normal, coil 320, the upper coil of relay 313 and through the upper winding of relay 418 to ground, instead of through contact 4 of relay 321 to ground. The operation of relay 321 also closes a loop through the 300-ohm resistor 420 across the tip and ring leads 521 and 522 towards the first selector switch 121 to operate relay 421, and also closes another loop through the 300-ohm resistor 340 across the tip and ring leads 333 and 330 towards the trunk finder 511 as a seizure loop for the outgoing trunk 140 to tandem. The loop closed through the 300-ohm resistor 420 is over a path from the ring lead 522 at the first selector 121 through the middle contact of jack 422, contact 5 of relay 423 normal, contact 4 of relay 424 normal, through the winding of relay 421, contact 2 of relay 321 operated, resistor 420, contact 3 of relay 341 normal, coil 334, contact 2 of marginal relay 342 normal, the winding of relay 425, contact 1 of relay 424 normal, contact 3 of relay 423 normal, through the top contact of jack 422 normal to the tip lead 521 of the first selector 121. Relay 425 does not, however, operate at this time but operates, in a manner hereinafter described, when the called subscriber picks up his receiver. The loop closed through the 300-ohm resistor 340 is from the ring lead 330 of the trunk finder 511 through contact 6 of relay 321 operated, resistor 340, contact 2 of relay 311 normal, coil 335, to the tip lead 333 of the trunk finder 511.

Figure 3:
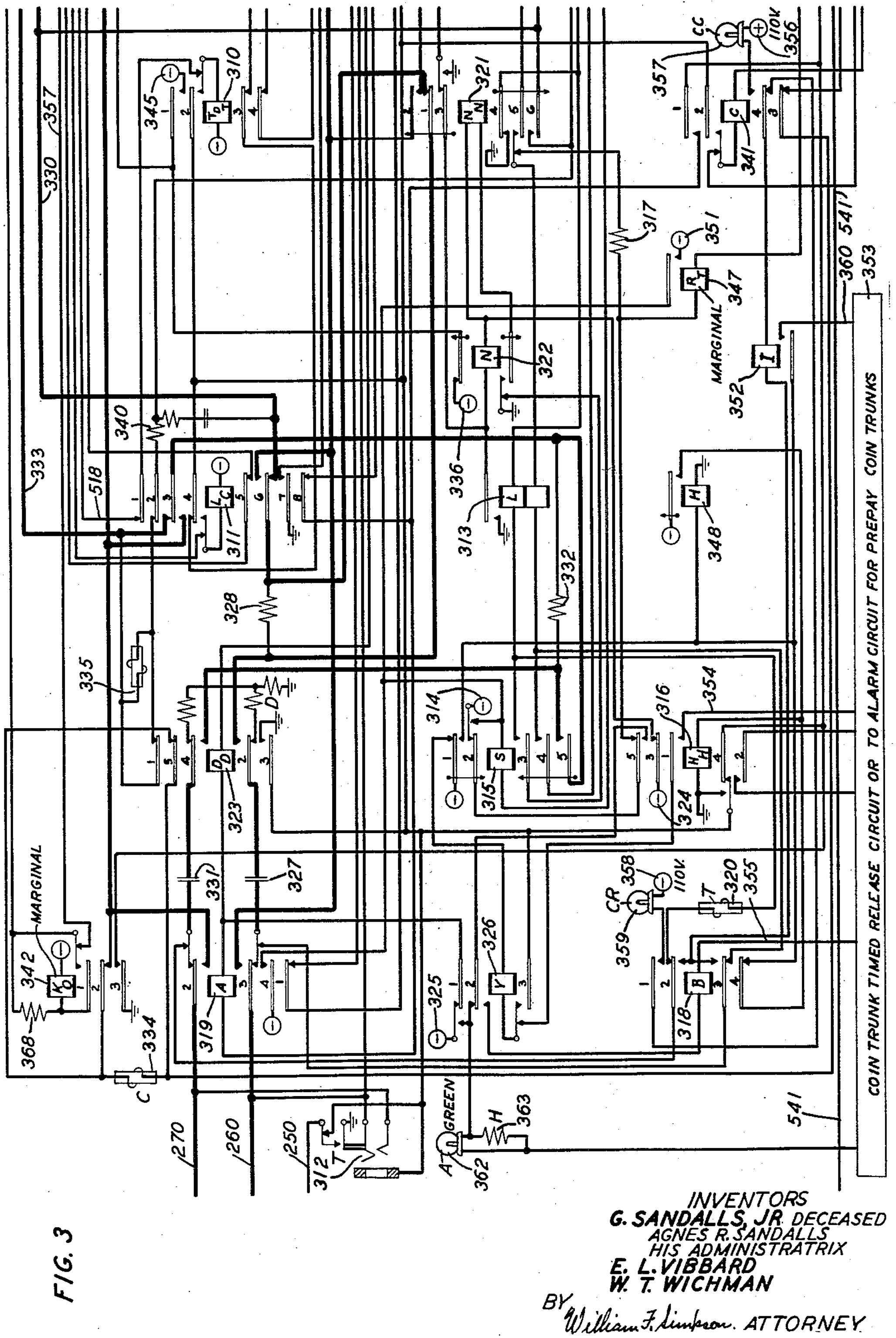
Figure 4:
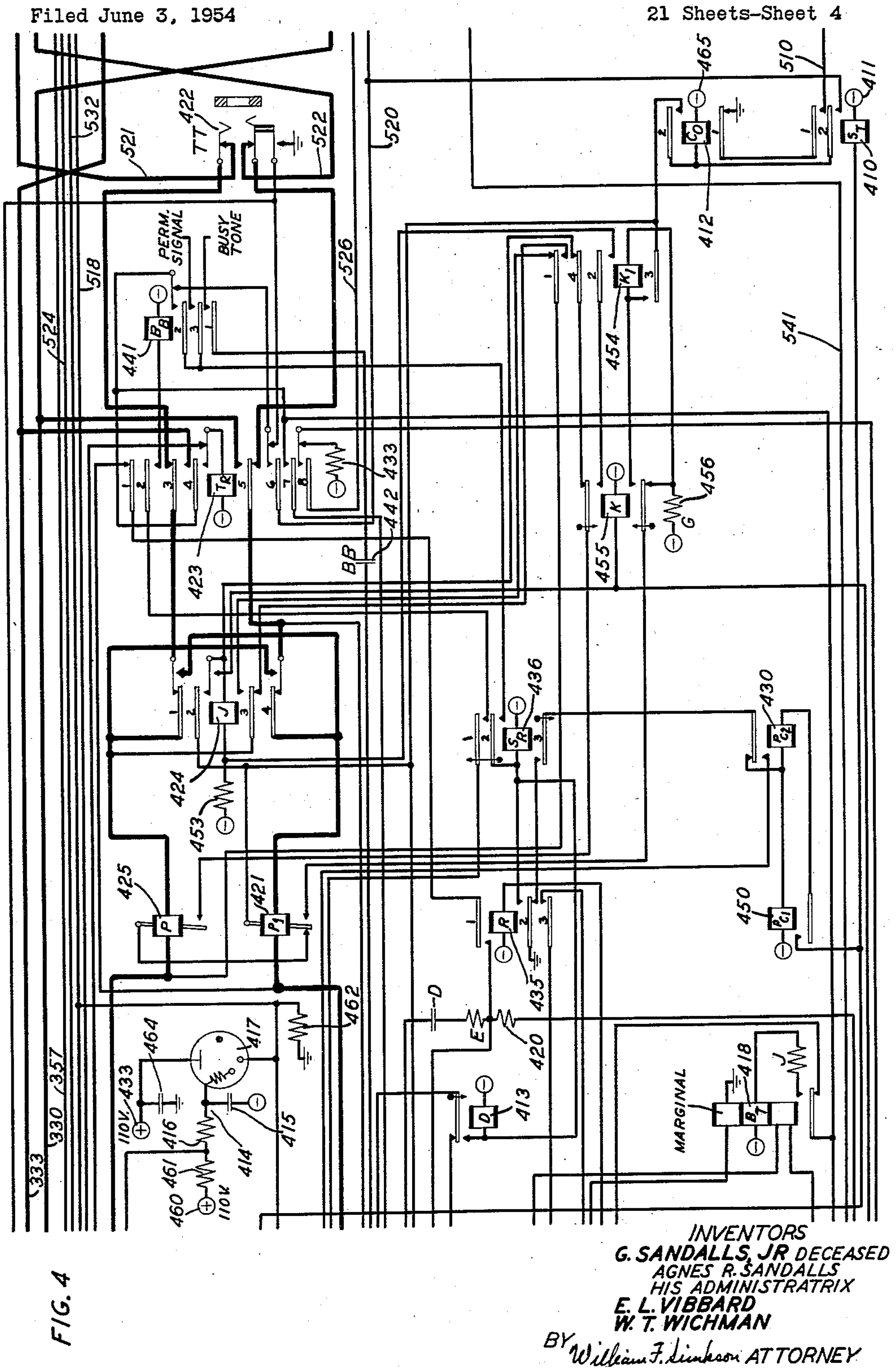
Figure 5:
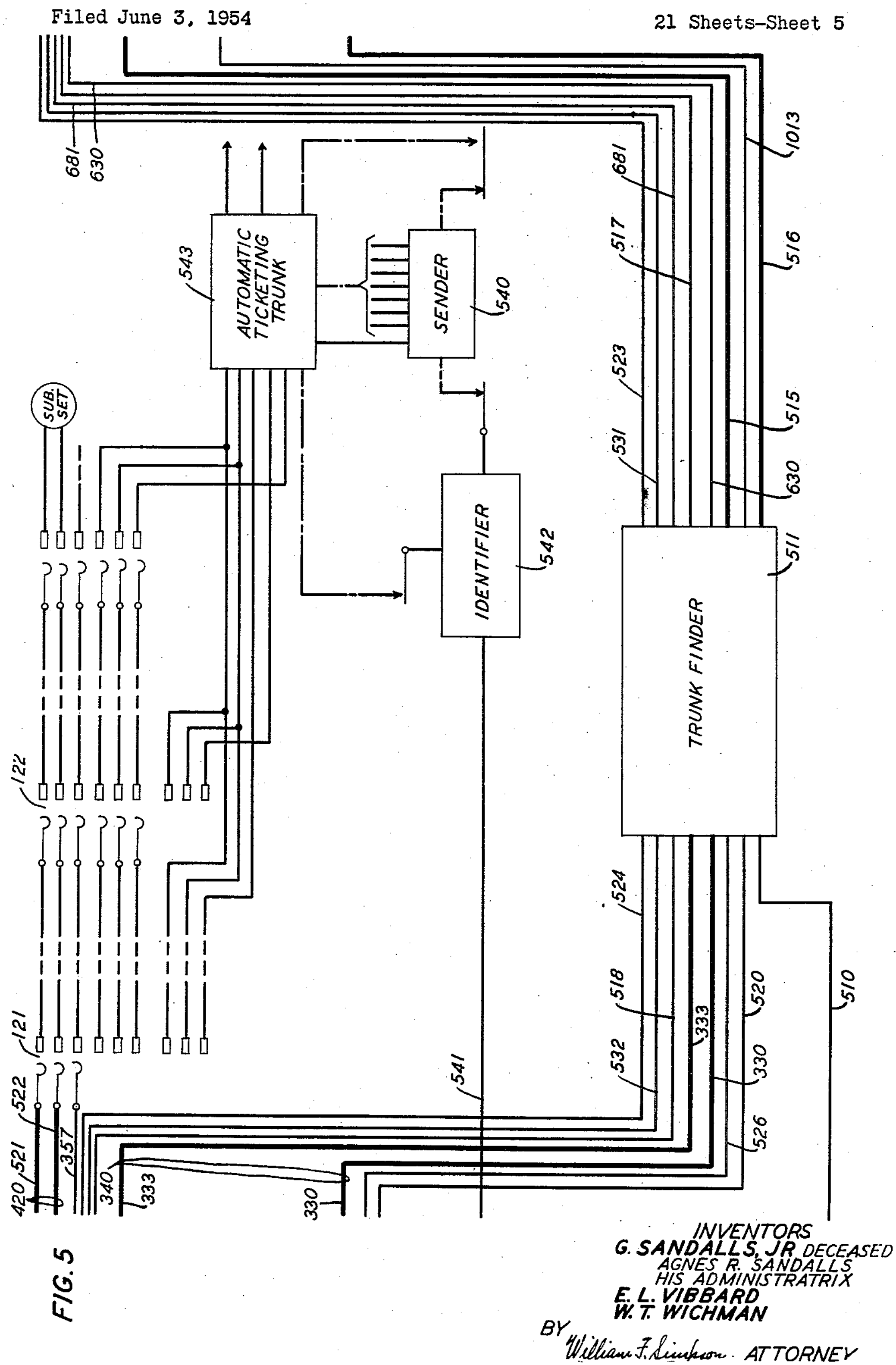
Figure 6:
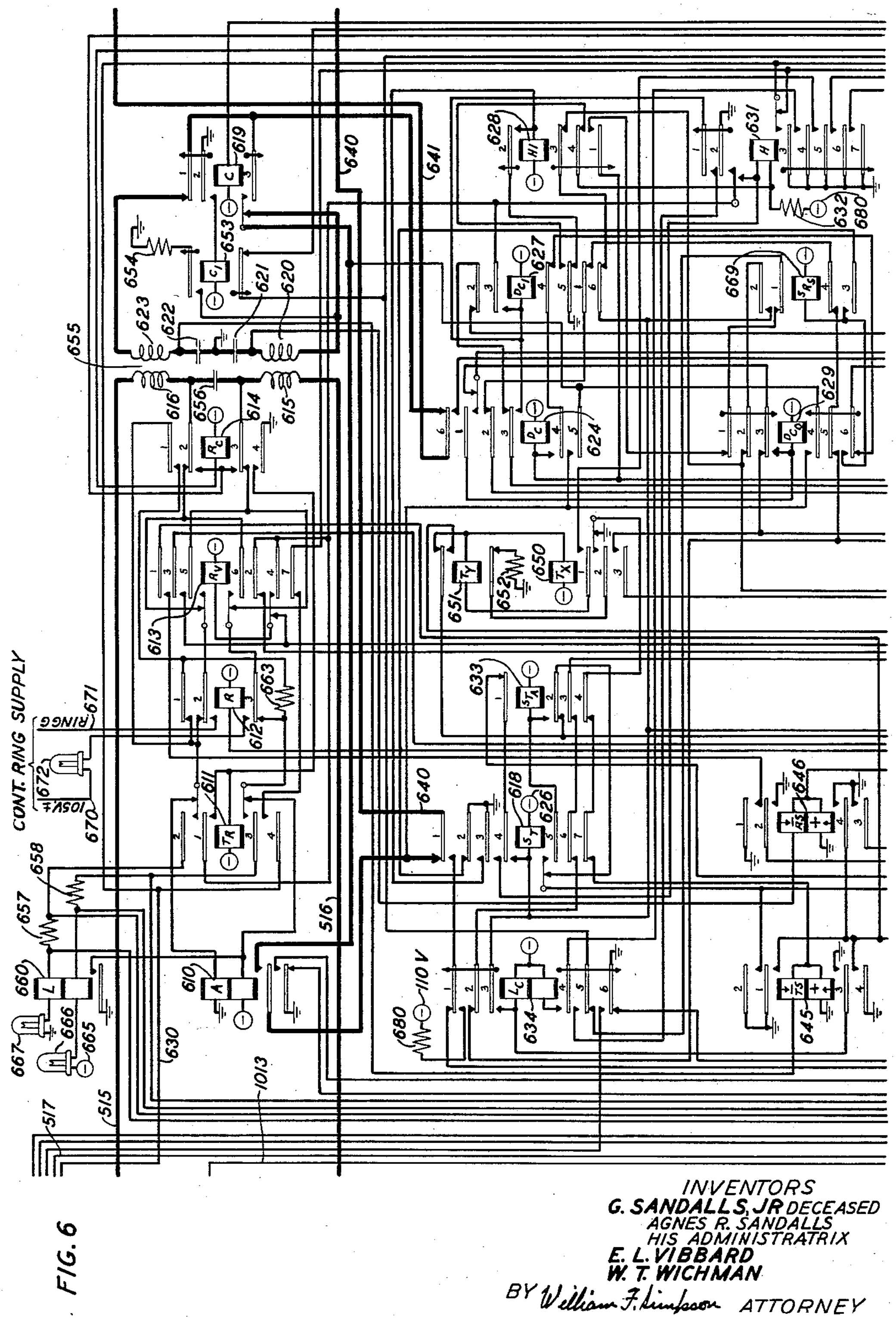
Figure 7:
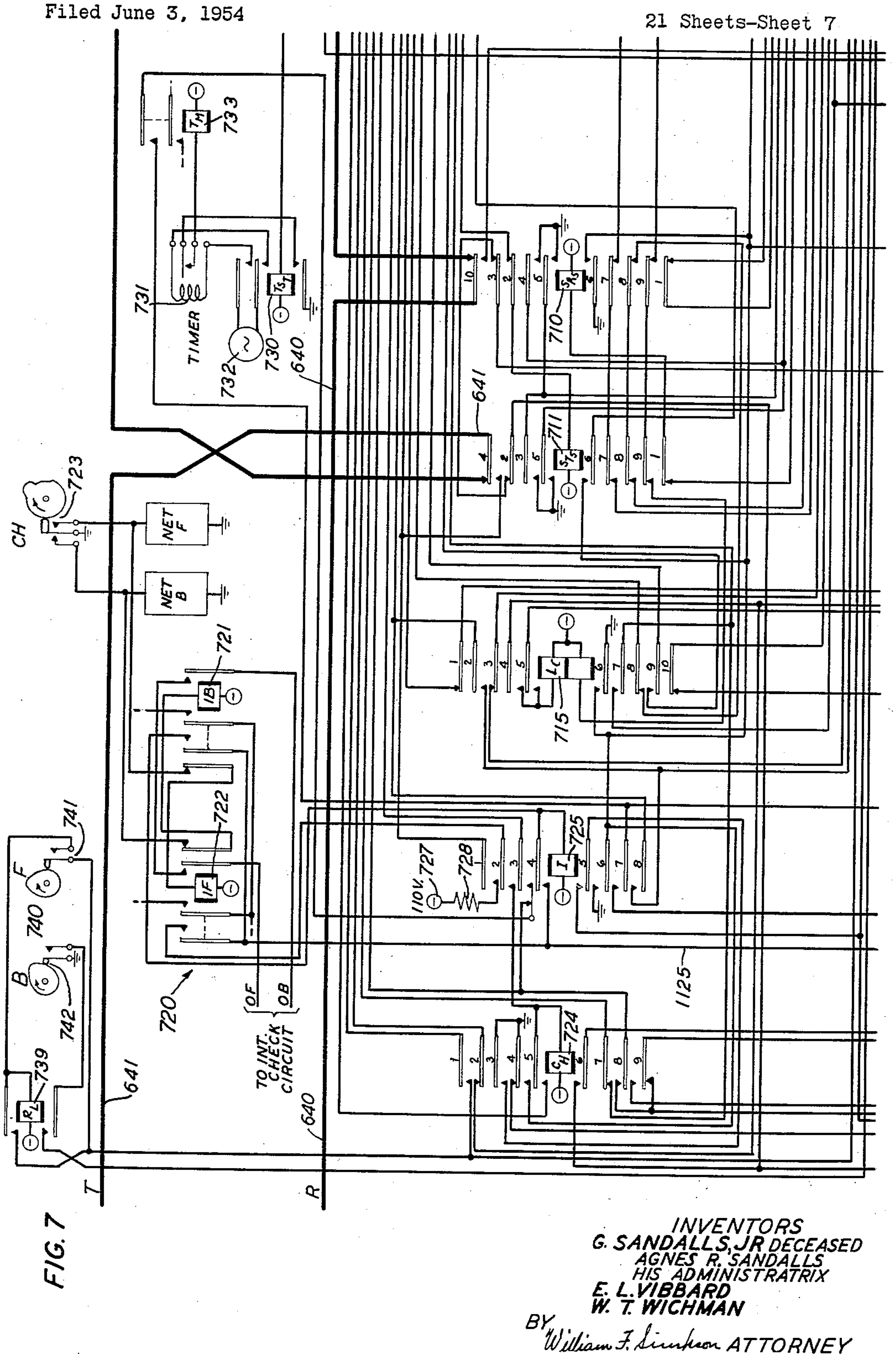
Figure 8:
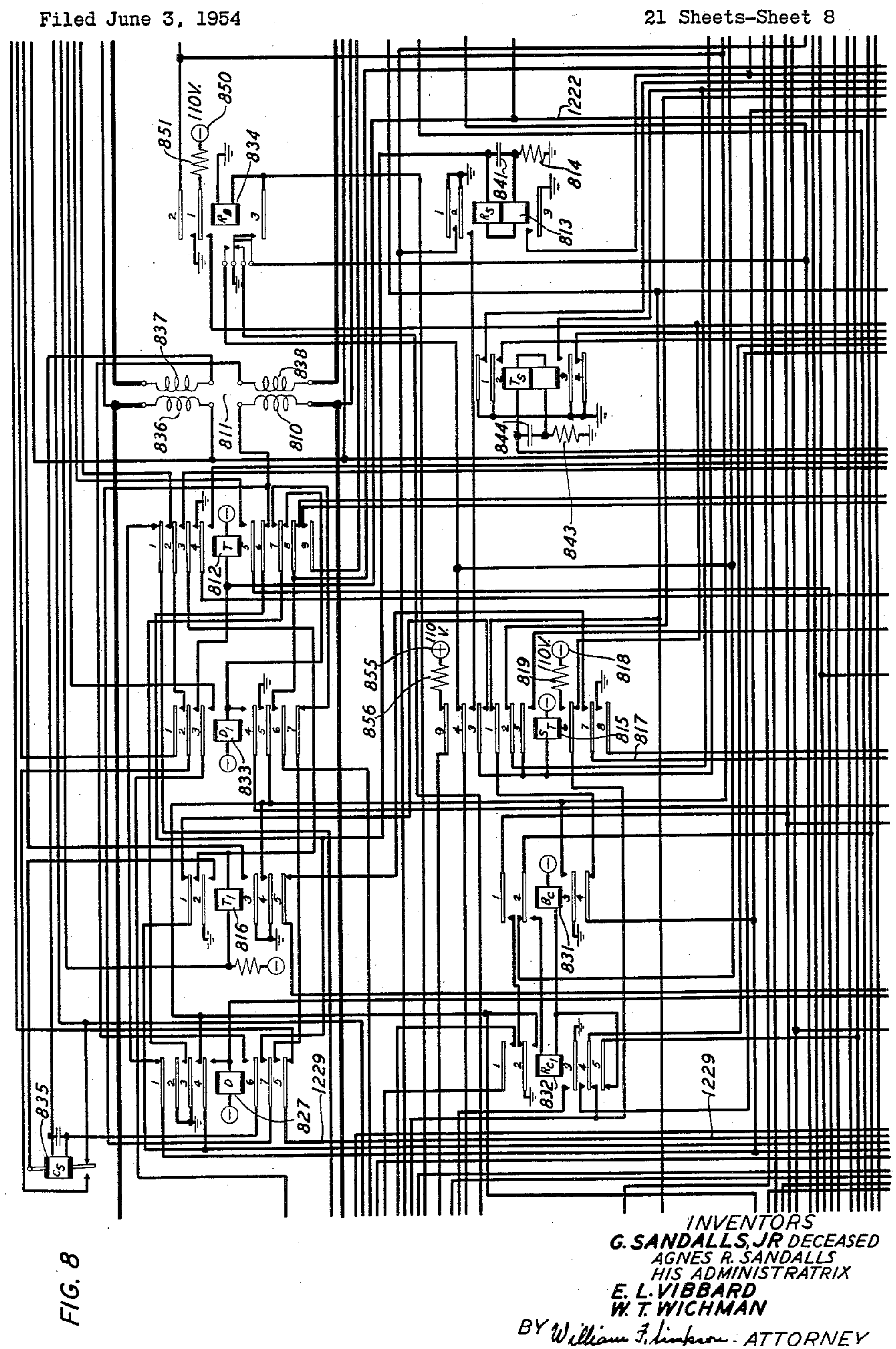
Figure 9:
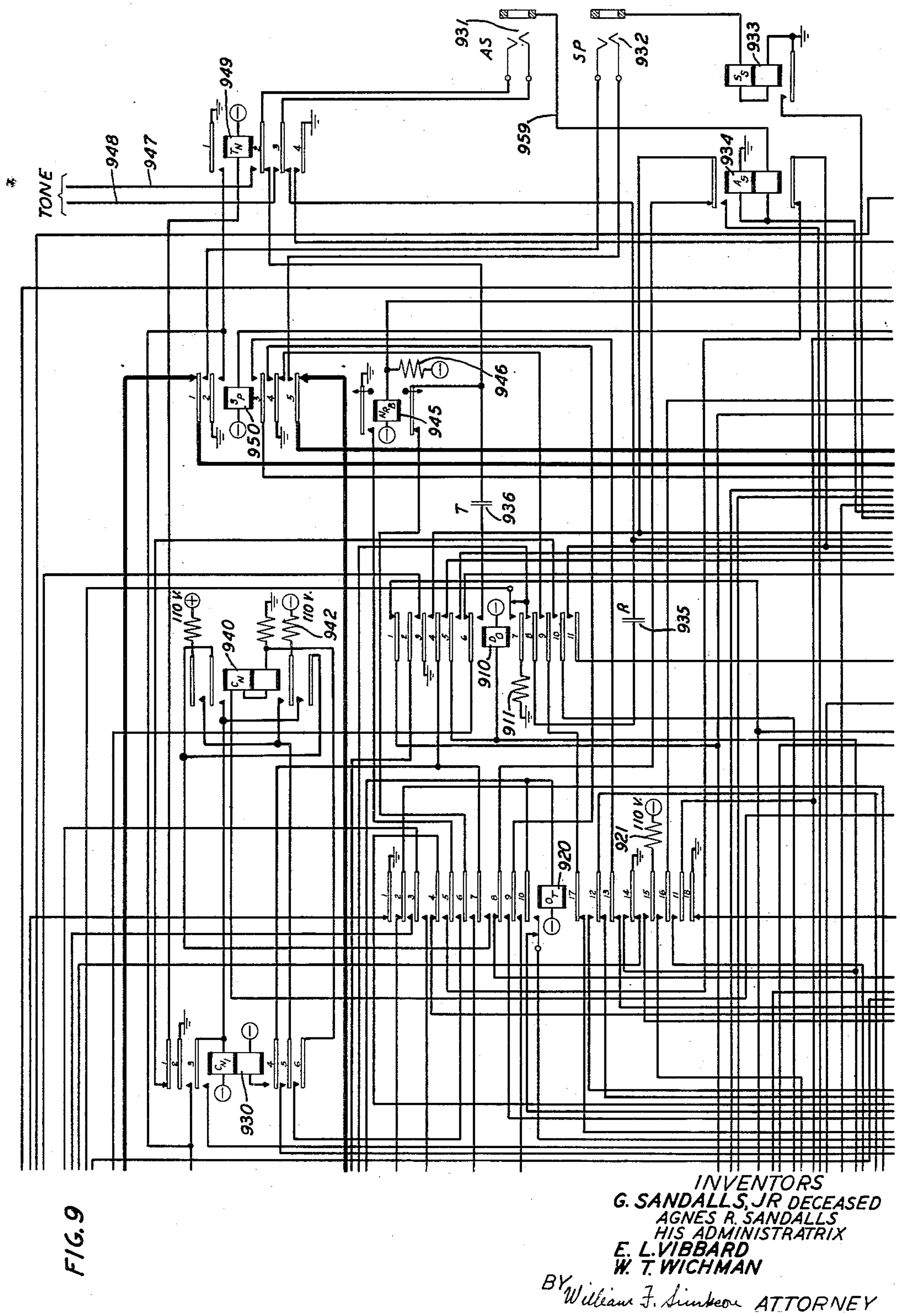
Figure 10:
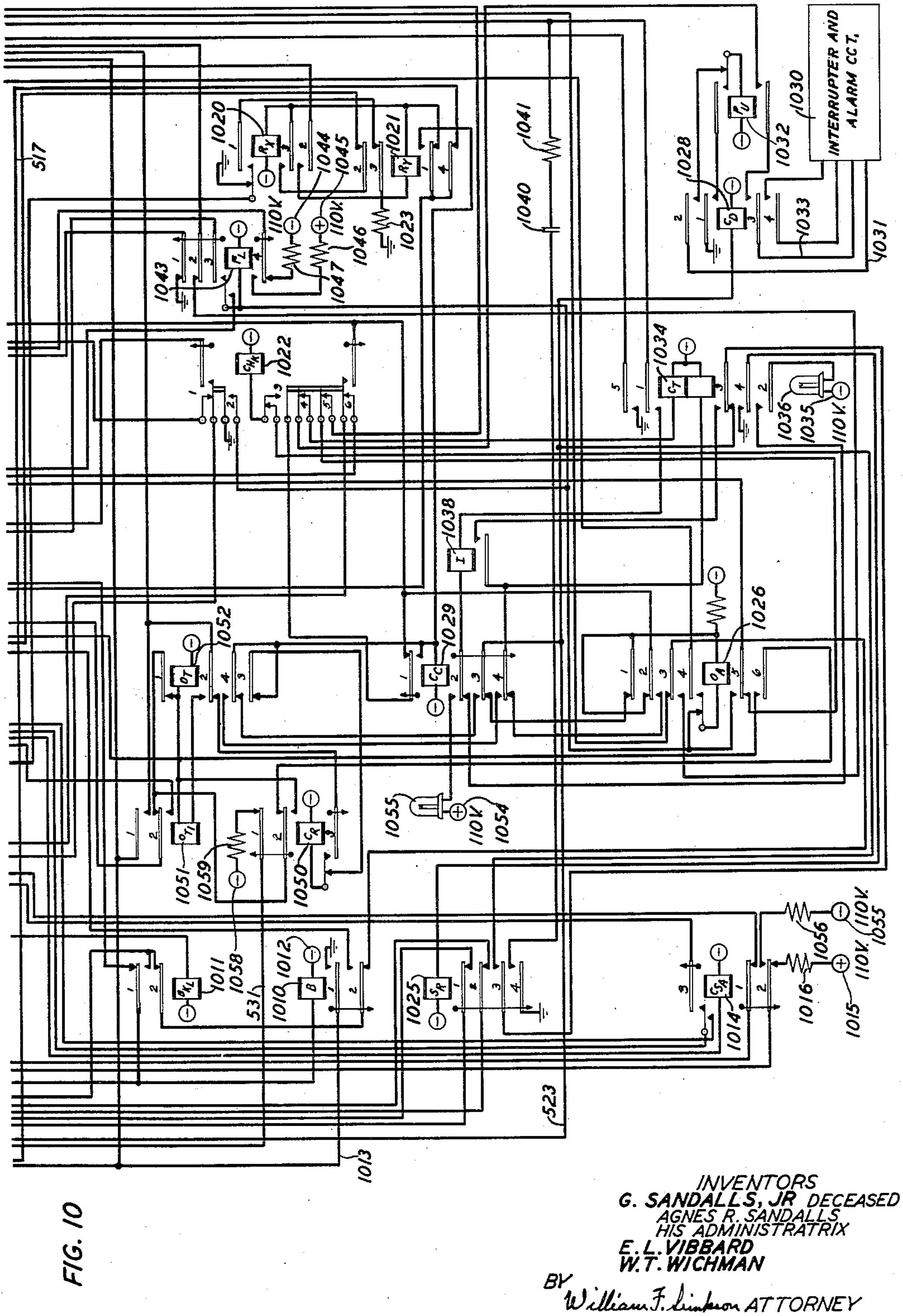
Figure 11:
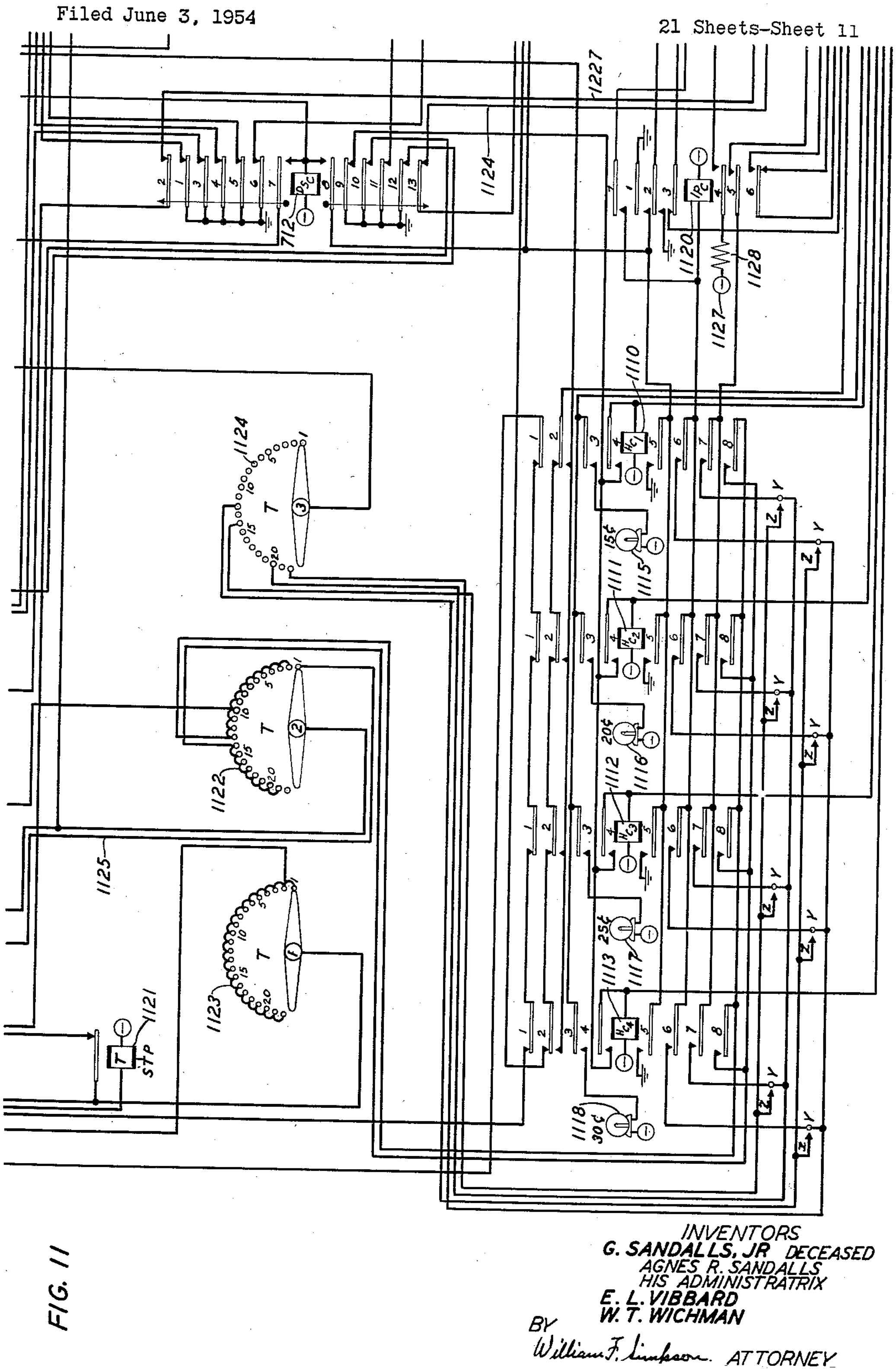
Figure 12:
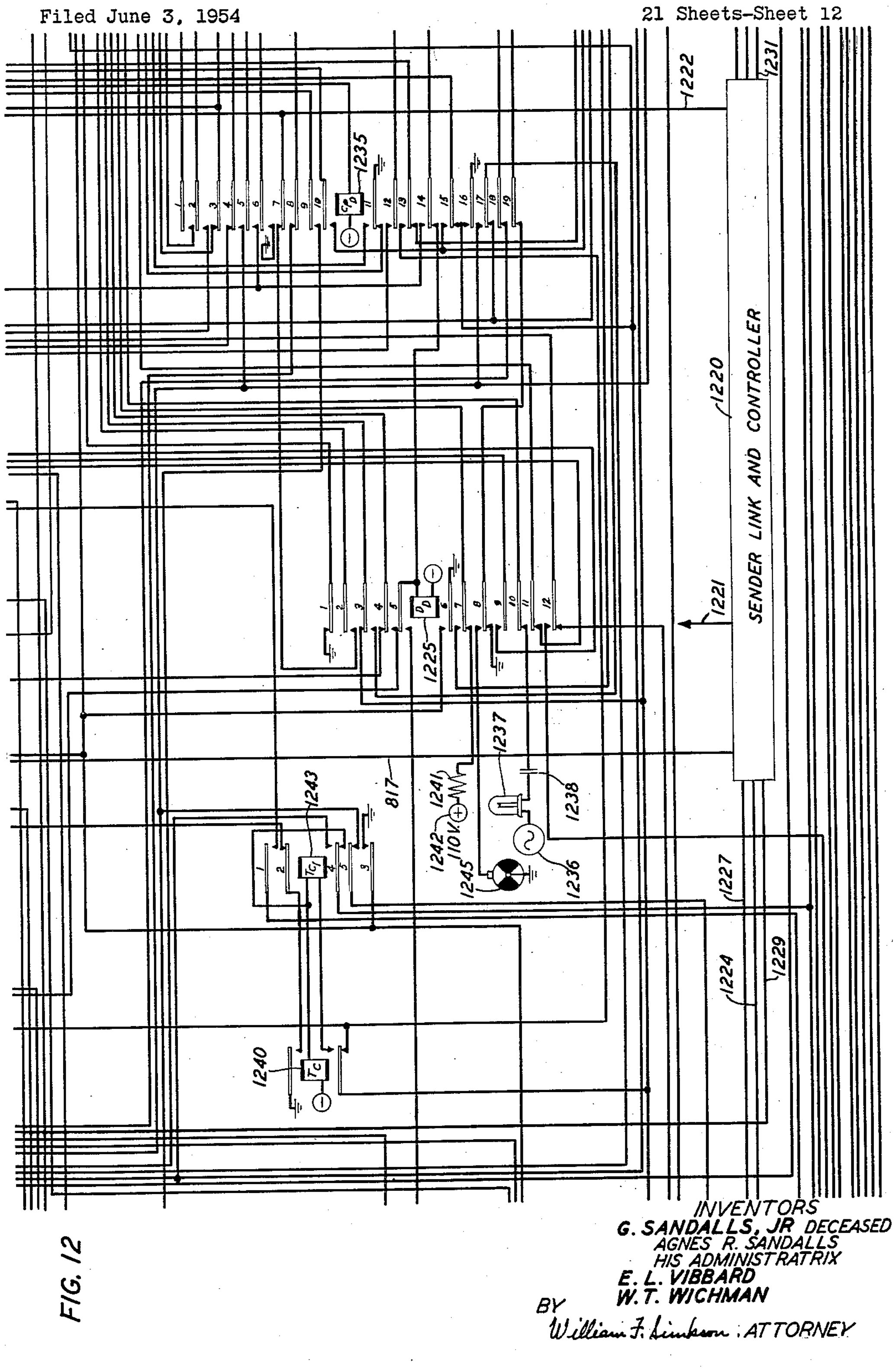
Figure 13:
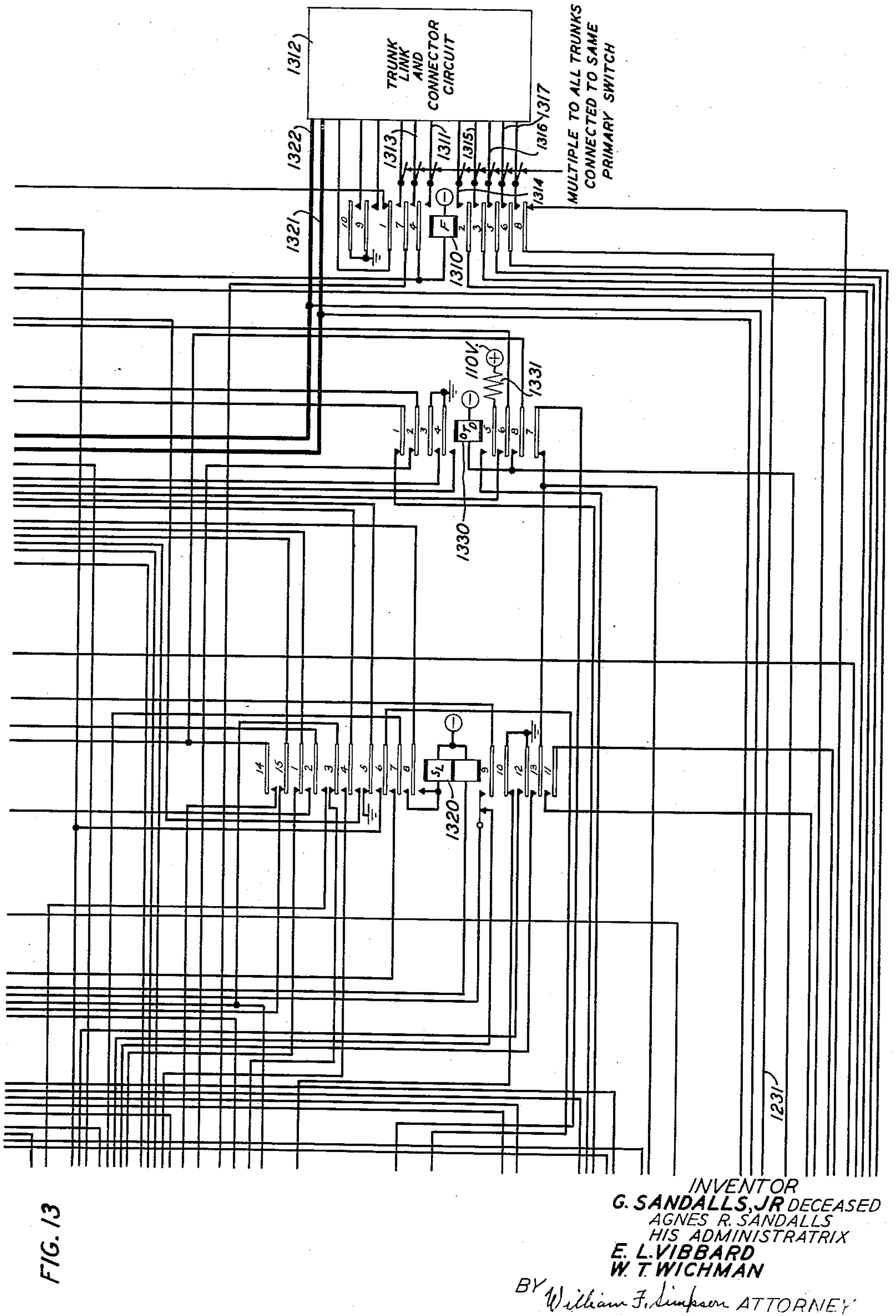

When the trunk finder 511 seizes the coin trunk circuit 120, shown in Figs. 3 and 4, resistance ground is connected through the sleeve lead 520 of the trunk finder 511, through contact 2 of relay 410 operated and the winding of relay 412, to negative battery 465, operating relay 412. When relay 412 operates, it locks to ground on the line finder sleeve 250 over a path from the line finder sleeve 250, through the contact of jacfl 312, contact 2 of relay 412 operated, and the winding of relay 412, to negative battery. The operation of relay 412 also closes ground on the line finder sleeve 250 to the trunk finder sleeve lead 520 to mark this trunk busy to other trunk finders, and removes ground from the control lead 510. Ground on the line finder sleeve 250 is closed to the trunk finder sleeve 520 through the contact of jack 312, contact 2 of relay 412 operated and contact 2 of relay 410 operated, and ground is removed from the lead 510 by the opening of contact 1 of relay 412, which thus breaks the path through contact 1 of relay 410 operated.

The trunk finder 511 upon seizing the coin trunk circuit 120, closes a loop through the tip and ring leads 515 and 516 to operate relay 610 in the outgoing trunk circuit 140. The path or loop is from negative battery through the lower winding of relay 610, contact 3 of relay 611 normal, contact 3 of relay 612 normal, contact 6 of relay 613 normal, contact 3 of relay 614 normal, coil 615, to the ring lead 516 of the trunk finder 511 and thence through the trunk finder 511 to the ring lead 330 of coin trunk 120, contact 6 of relay 321 operated, resistor 340, contact 2 of relay 311 normal, retard coil 335, and back on tip lead 333 through the trunk finder 511 along the tip lead 515 to coil 616, contact 2 of relay 614 normal, contact 5 of relay 613 normal, contact 2 of relay 612 normal (contact 1 thereof is a preliminary make contact), contact 2 of relay 611 normal, through the top winding of relay 610, to ground. Relay 610 operates and closes thereby a loop 640, 641 towards the incoming trunk 150 of the tandem office along a path from the ring lead 640, contact 1 of relay 618 normal to the upper contacts of relay 610 operated, and therefrom through contact 3 of relay 619 normal, coil 620, capacitors 621 and 622, coil 623, contact 1 of coil 619 normal and contact 6 of coil 624 normal, to the tip lead 641. A loop is extended, in this manner, from the trunk finder 511 through the repeat coils 615, 616, 620 and 623 in the outgoing trunk circuit 140, to the incoming trunk circuit 150.

The operation of relay 610, in the outgoing trunk circuit 140, also causes the operation of relays 1010 and 618, with relay 618 operating along a path from negative battery 626, through the winding of relay 618, contact 6 of relay 627 normal, contact 3 of relay 628 normal, contact 1 of relay 1011 normal, and the lower contact of relay 610 operated, to ground, and with relay 1010 operating over a path from negative battery 1012, through the winding of relay 1010 and the lower contact of relay 610 operated, to ground. The operation of relay 1010 grounds the leads 630 and 1013 to the trunk finder 511 to hold the circuits therein. Ground is applied to the lead 1013 through contact 1 of relay 1010 operated, and to the lead 630 through contact 1 of relay 1010 operated and contact 3 of relay 631 normal.

The operation of relay 618, in the manner described above, due to the operation of relay 610, causes the operation, in turn, of relay 631 over a path from negative battery 680, through resistor 632, the winding of relay 631 and contact 3 of relay 618 operated, to ground. The operation of relay 618 additionally self-locks to ground under the control of relay 633 along the path from negative battery 626, through the winding of relay 618, preliminary make contact 4 of relay 618 operated, contact 1 of relay 633 normal, contact 1 of relay 1014 normal, and contact 6 of relay 634 normal, to ground, and also prepares, by closing contact 5, an operating path for relay 633. Relay 618, in operating, also causes the operation of relay 628 along the path from negative battery, through the winding of relay 628 and contact 2 of relay 618 operated, to ground, and in addition causes the application of +110 volts to the ring 640 of the loop towards tandem as a start signal for the incoming trunk 150, as is hereinafter described. The start signal is supplied by the +110 volt source 1015 which is connected through the resistor 1016, contact 2 of relay 1014 normal, contact 1 of relay 634 normal and contact 1 of relay 618 operated, to the ring lead 640. The operation of relay 628 self-locks through its own contact 2 and contact 5 of relay 627 normal to ground, and causes, by opening its contact 3, the opening of the original, but now unnecessary, operating path through the winding of relay 618. The contact 3 originally connected the winding of relay 618 to ground through the contact 1 of relay 1011 normal and the lower contact of relay 610 operated, as described above. The operation of relay 631 causes itself to lock through its contact 2 to ground, and in addition, separates the leads 630 and 1013 maintaining ground on the lead 630 through its contact 3, while relay 1010, described above, continues to maintain ground connection through its contact 1 to the lead 1013.

The incoming tandem trunk 150 is seized by the outgoing trunk 140 in the step-by-step office, as described above, by the connection of +110 volt battery 1015 to the ring 640 of the line as the start signal. This +110 volt signal is closed in the incoming trunk 150, through contact 10 of relay 710 normal, the ring winding 810 of the repeating coil 811, through contact 6 of relay 812 normal, the winding of the relay 813 and compensating resistance 814 to ground. The relay 813 is a double polar relay, and the application of +110 volts thereto causes its armature on the positive side of the relay to operate. The operation of the positive side of a double polar relay will be hereinafter designated by a plus (+) sign appearing before the relay designation, and the operation of the negative side will be designated by a minus (−) sign appearing before the relay designation. The operation of relay +813 closes ground through 'ts contact 1, and through contact 1 of relay 910 normal, to the winding of relay 815, and thence to negative battery 860, causing relay 815 to operate. Relay +813 also closes ground through its contact 2, contact 4 of relay 815 operated, contact 2 of relay 710 normal, to the winding of relay 711 and thence to negative battery, causing relay 711 to operate. The operation of relay 815 causes itself to lock through its contact 3, contact 1 of relay 816 normal, and contact 11 of relay 712 normal, to ground. Relay 815 also connects ground to the sender link start lead 817 along the path from ground, through contact 1 of relay 712 normal, contact 5 of relay 816 normal, and contact 7 of relay 815 operated, to lead 817 and finally closes the −110 volt battery 818 through resistor 819, its contact 6 and contact 4 of the operated relay 711, over the tip 641 of the trunk to the step-by-step outgoing trunk 140 as a return check signal.

The −110 volts applied to the tip lead 641 as a check signal causes the operation of relay −645 in the outgoing trunk 140 over a path from the tip lead 641, contact 6 of relay 624 normal, contact 1 of relay 619 normal, coil 623, through the winding of relay −645 to ground. The operation of relay −645, which is the negative portion of the double polar relay 645 as described above, operates in turn relays 1011 and 633, with relay 1011 operating over a path from negative battery through the winding of relay 1011, contact 1 of relay −645 operated, to ground, and with relay 633 operating over a path from negative battery, the winding of relay 633, contact 5 of relay 618 operated and through contact 2 of relay −645 operated, to ground. The operation of relay 1011 prevents the operation of relays 619 and 624, and provides for holding relay 1010 operated from both the front and back contatcs of relay 610, in the event the calling subscriber should flash or abandon the call during the transmisison of the start and check signals. Relays 619 and 624 are prevented from operating, in this event, by the ground path from the lower contact of relay 610, released, being opened at contact 2 of relay 1011, operated, Relay 1010 is held operated, in the event of flashing or abandonment, along the path fromnegative battery 1012, through the winding of relay 1010 and the lower operated contact of relay 610 to ground when relay 610 is in its operated condition, or along a path from negative battery 1012, through the windings of relay 1010, contact 1 of relay 1011 operated, and the lower unoperated contact of relay 610 to ground when relay 610 is released. Relay 1011 can also be operated under the control of relay +645 and relay 646 so as to block the sending of start, flashing, or disconnect signals to the tandem office during the transmission of other signals, as is hereinafter described.

Relay 633 operates, responsive to the operation of relay −645, as described above, and releases relay 618 at contact 1 of the operated relay 633, and locks to ground over a path through its preliminary transfer contact 2, the contact 5 of the released relay 618, through contact 2 of relay −645 operated, to ground. Relay 618 is released as its holding path through its preliminary make contact 4, contact 1 of relay 633 released, contact 1 of relay 1014 normal and contact 6 of relay 634 normal to ground is broken, as described above, when relay 633 operates. When relay 618 releases, the +110 volts from battery 1015 are removed from the ring lead 640 towards tandem by breaking the path at contact 1 of the relay 618. This removal of the +110 volts from the ring lead 640 causes relay −813 in the incoming trunk 150 to release, since, as described above, the relay −813 was operated along the path, through contact 6 of relay 812 normal and the ring winding 810 of the repeater coil 811 to the ring 640 leading to the outgoing trunk 140. When relay −813 releases, it in turn opens at its contact 2 the operating path for relay 711. Relay 711, in turn, upon releasing, opens the return check signal, described above, through its contact 4 to the tip 641 of the trunk causing the outgoing trunk 140 to be set to receive signals from the tandem sender 180, described above in reference to Fig. 1, over the tip and ring leads 641 and 640.

The outgoing trunk 140 is set to receive signals when the relay −645 releases upon the removal of the −110 volts on the tip lead 641 of the incoming trunk 150. When relay −645 releases, it in turn opens the operating paths, described above, for the relays 1011 and 633, permitting them to release. After the start and check signals, described above, have been transmitted, only relays 610, 1010, 631 and 628 remain operated in the outgoing trunk 140 and only relay 815 remains operated in the incoming tandem trunk 150. When relay 815 in the incoming tandem trunk 150 operated, as described above, it grounded through its contact 5 and the contact 1 of relay 712, the lead 817, to the sender link 1220 causing it to function in a manner well known in the art to select a tandem sender 180. A tandem sender 180 is connected thereto through lead 1221 after a minimum interval of two-tenths of a second, and therethrough to the trunk circuit 150 closing a ground connection over the lead 1222 to operate relay 812. At the same time, a line relay, not shown in the sender 180, is operated in a local circuit and —48 volt battery is connected therethrough and through the sender link 1220 to the lead 1224, and thence through contact 13 of relay 712, contact 4 of the trunk relay 812 operated, contact 11 of relay 1225 normal, contact 6 of relay 910 normal, and contact 4 of relay 711 normal, to the tip 641 of the trunk. When trunk relay 812 operates, it in turn operates through its contact 3 of the relay 816 which locks through contact 11 of relay 712 normal, and by opening its contact 1 releases relay 815. The release of relay 815 causes the opening of the lead 817 to the sender link 1220 which is now locked to the sender 180, as described above, in the above-referred to patents to W. W. Carpenter and J. B. Newsom. The battery connected to the tip 641 of the trunk 150 from the sender 180 applies —48 volts to the step-by-step outgoing trunk 140 which checks the presence of the —48 volt battery on the tip lead 641 and holds the sender line relay (not shown) over the tip lead 641. The —48 volts connected to the step-by-step outgoing trunk circuit 140 operates the relay —645 over a path from the tip lead 641, contact 6 of relay 624 normal, contact 1 of relay 619 normal, coil 623, through the winding of relay —645 to ground. The operation of relay —645 in turn closes an operating path to the relay 650, from ground through its contact 2, contact 5 of relay 618 normal, contact 2 of relay 633 normal, the upper contact of relay 651 normal, through the winding of relay 650 to negative battery. Relay 650, in operating, prepares a locking path for itself in series with the winding of relay 651, under the control of relay 631, through contact 1 of relay 650 operated, and contact 5 of relay 631 operated, to ground. Relay 650, in operating, also replaces the short circuit across the winding of relay +645 with a resistance shunt 652, and prepares a future operating path for relay 1020. The short circuit across relay +645 was from ground through the lower winding of relay 645, contact 7 of relay 618 normal, contact 4 of relay 633 normal, contact 2 of relay 650 normal, to ground. The operation of relay 650 disconnects the path just described, on a continuity basis, from ground and connects it through its contact 2 and the lower contact of relay 651, which is normal, as is hereinafter described, through resistor 652 to ground. Relay 651 at this time is held shunted down by the same ground, over the path described above, that operated relay 650. The operation of relay —645 also causes the operation of relay 1011 by connecting ground through its contact 1 to the winding thereof. The operation of relay 1011 blocks the sending of any signals to the tandem office, in the manner described above in connection with sending the start signal, in the event the calling subscriber should flash, abandon, or dial at this time.

The sender 180 after approximately 150 milliseconds removes the —48 volts from the tip lead 641 and connects it to the ring lead 640 through the link 1220, ring lead 1227, contact 2 of relay 712, contact 5, trunk relay 812 operated, contact 7 of relay 910, and contact 10 of relay 710. This reversal of battery in the sender 180 at the tandem office, permits the relay —645 to release, as its energizing potential from the tip 641 is removed, which in turn releases relay 1011 by breaking its operating path at the opened contact 1 of relay —645. Relay —645 in releasing also removes the ground connection, as described above, through its contact 2, from across the winding of relay 651, permitting relay 651 to operate over a path through the winding of relays 650 and 651, contact 1 of relay 650 operated, through contact 5 of relay 631 to ground. The operation of relay 651 removes the resistance shunt 652 from across the winding of relay +645, and advances the control lead from contact 2 of relay —645 as is hereinafter described. The —48 volts on the ring lead 640 now operates relay —646 over a path from ring lead 640, through contact 1 of relay 618, the upper contact of relay 610, contact 3 of relay 619, coil 620, through the winding of relay —646 to ground. The operation of relay —646 in turn operates relay 1020 and applies ground to lead 517 towards the trunk finder 511. The operating path for relay 1020 is from negative battery, through the winding of relay 1020, contact 1 of relay 1021 normal, contact 3 of relay 650 operated, contact 3 of relay 629 normal, contact 1 of relay 624 normal, contact 1 of relay 1022 normal, through contact 2 of relay —646 now operated, to ground. Ground is applied to lead 517 through contact 2 of relay —646, contact 1 of relay 1022, contact 1 of relay 624, contact 3 of relay 629, contact 3 of relay 650, and contact 4 of relay 1021. The ground potential on lead 517 is connected by the trunk finder 511 to lead 518, to the coin trunk circuit 120. Ground on lead 518 to the coin trunk circuit 120 is a signal that dial tone is being supplied from the tandem office. Relay 1020, in operating, prepares a locking path for itself in series with the winding of relay 1021, through its own contact 3, to ground under the control of contact 6 of relay 631, but relay 1021 is held shunted down at this time by ground through its contact 1 from relay —646 over the same path as operated relay 1020. Relay 1020 at its contact 1 removes a short circuit from across the winding of relay +646 replacing it, through contact 3 of relay 1021, with a resistance shunt 1023, and closes ground under the control of contact 3 of relay 1020 operated, contact 2 of relay 1021 normal, contact 2 of relay 613 normal, and contact 2 of relay 631 operated, to keep relay 1021 shunted down even after relay —646 releases.

Dial tone is normally supplied to the calling subscriber from the distant tandem office, through the outgoing trunk 140, trunk finder 511 and coin trunk 120 when the sender 180 is attached, as described above, and ready to receive dial pulses. When dial tone is supplied, ground is closed also to the leads 517 and 518, as described above, in the associated outgoing trunk circuit 140 and coin trunk circuit 120, to operate relay 310. Ground is connected to relay 310 over a path from lead 518 through contact 1 of relay 311, and contact 2 of relay 310. The relay 310, in operating, locks to the grounded line finder sleeve 250 over a path through its contact 2 and the contact of jack 312; recloses —48 volts from battery 345 through contact 1 of relay 310 to the gas tube timing circuit 414 to stop its timing; releases relay 410, and by opening its contact 4 opens a possible operating path for relay 311 from the lower contact of relay 430. Dial tone is connected from the sender 180 along the various tip and ring leads to the subscriber 210 as described above.

The dial-tone path from the sender 180 is through lead 1221, sender link 1220, ring lead 1227, contact 2 of relay 712, contact 10 of relay 715, contact 5 of relay 812, contact 7 of relay 910, contact 10 of relay 710, ring lead 640, contact 1 of relay 618, the upper contact of relay 610, contact 3 of relay 619, coil 620 and capacitor 621, through capacitor 622, coil 623, contact 1 of relay 619, contact 6 of relay 624, tip lead 641, contact 4 of relay 711, contact 6 of relay 910, contact 11 of relay 1225, contact 4 of relay 812, contact 13 of relay 712, lead 1224, to sender link 1220, and lead 1221 to the sender 180. The coils 623 and 620 are coupled in the repeater 655 to coils 615 and 616, which are joined by capacitor 656, so that the dial tone is coupled thereacross. The dial-tone path therefore is continued from coil 616, to lead 515, through the trunk finder 511, to tip lead 333, contact 3 of relay 311, resistor 332, contact 4 of relay 323, capacitor 331, contact 2 of relay 319, tip lead 270, line finder 230, through subset 210 back to line finder 230, ring lead 260, contact 3 of relay 319, capacitor 327, contact 2 of relay 323, resistor 328, contact 6 of relay 311, to ring lead 330, trunk finder 511, ring lead 516, to coil 615 completing the path. Dial tone is, in this manner, supplied from the sender 180 through the sender link 1220, incoming trunk 150, outgoing trunk 140, trunk finder 511, coin trunk 120, and line finder 230, to subset 210. At this time when dial tone is supplied, as described above, from the sender 180 the following relays are operated: 310, 313, 321, 322, 323, 412, 421, 610, 628, 631, —646, 650, 651, 711, 812, 816, 1010 and 1020.

If dial tone is not received from the distant tandem office and relay 310 is therefore not operated before the gas tube timing circuit 414 completes its operation, or in approximately four to seven seconds, the tube 417 ionizes and closes an operating path for relay 311. This sequence of operation is not shown in Figs. 15 through 23 as these figures only show the sequence of operation of the various relays and circuits when a call from the subset 210 is placed to a subscriber associated with a distant office reached through the tandem office. The operating path for relay 311 is from negative battery, the winding of relay 311, contact 4 thereof, through gas tube 417 to the +110 volt battery 433. Relay 311, upon operating, locks to the line finder sleeve 250, which is grounded by relay 323, as described above. The locking path is from negative battery through the winding of relay 311, contact 4 thereof to lead 250. The operation of relay 311 transfers the calling subscriber's transmission path, via tip and ring leads 270 and 260, from the trunk finder tip and ring leads 333 and 330 to the first selector tip and ring 521 and 522, and dial tone is then supplied to the subscriber from the first selector 121 in a manner well known in the art as exemplified by the patent to H. Hovland identified above. Contact 3 of relay 311 operated, transfers the tip path to a path from tip lead 270 to tip lead 521, through the winding of relay 425, contact 1 of relay 424 normal, contact 3 of relay 423 normal, and through the upper contact of jack 422. Contact 6 of relay 311 operated transfers the ring path to a path from ring lead 260 to ring lead 522, through the winding of relay 421, contact 4 of relay 424 normal, contact 5 of relay 423 normal, and through the lower contact of jack 422. Relay 311, in operating, also opens the operating path for relay 310 by opening its contact 1, releases relay 410 by opening its contact 4, opens the operating path for relay 423 by opening its contact 5, and opens the loop closure across the tip and ring leads to the trunk finder 511 by opening its contact 2. This loop path was from tip lead 333, through retard coil 335, contact 2 of relay 311 now operated, resistor 340, contact 6 of relay 321 operated, to ring lead 330. This open loop causes outgoing trunk circuit 140 to release, in turn releasing trunk finder 511, as hereinafter described.

*Coin before dial tone*

If it is desired that the dial-tone transmission path to the calling subscriber should not be closed until after the coin has been deposited, the circuitry of the present invention can be modified by omitting the resistors 328 and 332 in coin trunk circuit 120. With this modification, even though dial tone may be supplied by the tandem sender 180 or the first selector 121, the transmission path for this tone is incomplete due to the absence of resistors 328 and 332 in the path previously described. The deposit of a coin in this instance not only prepares the circuit for dialing but also closes the dial-tone path. When the subscriber deposits a coin, relay 347 operates over a path from the ground connection established through the coin magnet 209 by the coin, through the subset 210, through line finder 230, along the ring lead 260, contact 3 of relay 319 normal, contact 3 of relay 318 normal, through the lower coil of line relay 313, contact 5 of relay 321 operated, the lower coil of relay 418, through the winding of marginal relay 347, contact 5 of relay 316 normal and contact 2 of relay 315 normal, to negative battery 314. When relay 347 operates, it in turn operates relay 315 over a path from negative battery 351, the operated contact of relay 347 through the winding of relay 315, the contact of relay 418 normal, contact 4 of relay 316 normal, and contact 3 of relay 323 operated, to ground. The operation of relay 315 closes a path for dial tone, as is hereinafter described in detail, through the coin trunk circuit 120, closes the winding of relay 435 to the ring lead 260, operates relays 348 and 316, releases relay 347, and closes negative battery 314 at contact 2 to its own winding, to supplement the battery supplied by the operation of relay 347. The dial-tone path on the tip is closed when the contacts of relay 315 operate as they close a path from the tip lead 333 through contact 3 of relay 311 normal, contact 5 of relay 315 operated, since resistor 332 is now an open circuit, contact 4 of relay 323 operated, capacitor 331, and contact 2 of relay 319 normal, to the tip lead 270. Relay 435 is operated when contact 4 of relay 315 closes over an operating path from negative battery through the winding of relay 435, contact 4 of relay 315 operated, contact 3 of relay 318 normal and contact 3 of relay 319 normal, to the ring lead 260 which was grounded through subset 210 and the coin magnet 209 when the coin was deposited. Relays 348 and 316 are operated upon the operation of the transfer contact 1 of relay 314, which connects negative battery therethrough and through the winding of relay 348 to ground, causing relay 348 to operate, and also through contact 4 of relay 318 normal and the winding of relay 316 to ground, causing relay 316 to operate. Relay 348 closes negative battery through its operated contact to the winding of relay 316 to supplement the potential supplied by relay 314 as described above. When relay 316 operates, it separates the selector sleeve 357 from the line finder sleeve 250 and grounds the line finder sleeve 250 by moving its transfer contact 4, and releases relays 321 and 322 by opening its contact 3. Relay 322, upon releasing, essentially short-circuits the upper winding of relay 313, causing it to release by closing direct ground through its lower contact and contact 3 of relay 315 operated, coil 320, contact 2 of relay 318 normal, and contact 2 of relay 319 normal, to the tip lead 270, and also recloses the —48 volt battery 336 to the timing circuit 414 causing it to stop its timing if it has not already stopped by the operation of relay 310, described above. The purpose of stopping the gas tube timing circuit 414 is to prevent the possibility of a partial dial into the tandem sender 180, as is hereinafter described, which would occur if the subscriber should dial prematurely, that is, before dial tone is received.

The release of relay 321, described above, closes a path for dial tone on the ring lead 260, from the trunk finder 511 along the path from ring lead 330 through contact 6 of relay 311 normal, to contact 1 of relay 321 normal (since resistor 328 is an open circuit in this modification), to contact 2 of relay 323 operated, capacitor 327 and contact 3 of relay 319 normal, to the ring lead 260. The release of relay 321 also opens the resistive loops through the resistors 420 and 340, described above in reference to the operation of relay 321, across the first selector tip and ring leads 521 and 522, and the trunk finder tip and ring leads 333 and 330, now held closed by the operated relay 435, described above. Relay 435 operates relays 436 and 413 by providing a ground connection through its contact 2, and also holds relay 323 through its contact 2 and the operated contact of relay 413. The operation of relay 436 in turn prepares an operating path for relay 450 which will close as is hereinafter described when relay 435 releases. The circuitry thereafter waits for dialing by the subscriber.

*Coin deposit—Sequence chart Fig. 16*

Returning now to the preferred embodiment of the present invention, wherein dial tone may be received before the subscriber deposits a coin, in the manner described above with reference to the sequence operating chart of Fig. 15, when the subscriber deposits a coin, the coin trunk 120 is prepared for dialing by a ground connection through the coin magnet 209 placed on the tip lead 270 thereby, and also upon the ring lead 260 through the subset, since the subscriber of subset 210 has the receiver off the hook. Upon the deposit of a coin the sequence of operations occurs as shown in Fig. 16. The ground connection placed on ring lead 260 causes the operation of relay 347, since the ring lead 260 is connected to the winding of relay 347 through contact 3 of relay 319 normal, contact 3 of relay 318 normal, through the lower winding of relay 313, contact 5 of relay 321 operated and the lower winding of relay 418. The other side of the winding of relay 347 is connected to negative battery 314 through contact 5 of relay 316 normal and contact 2 of relay 315 normal.

As shown in the operating sequence chart of Fig. 16, the operation of relay 347 initiates the operation of relay 315 over the same operating path, as described above. The operation of relay 315 closes the winding of relay 435 to the ring lead 260, operates relays 348 and 316, releases the marginal relay 347 in a similar manner as described above, and in addition short-circuits resistor 332. The circuit being described provides for dial tone before the deposit of the coin, with resistors 328 and 332 present. The short-circuiting of resistor 332 at contact 5 of relay 315 is for the purpose of improving the circuit for the subsequent transmission of conversation. When relay 316 operates, it separates the selector and line finder sleeves 357 and 250, grounds the line finder sleeve 250 and releases relays 321 and 322, also in the same manner as described above. When relay 322 releases, it closes ground to the tip lead 270 to short-circuit relay 313, causing it also to release and closes the —48 volt battery to the gas tube timing circuit 414 to stop its timing, if not already stopped as described before by the operation of relay 310. When relay 321 releases, it opens the loops across the first selector and trunk finder tip and ring leads 521, 522, 333 and 330, now held closed by the operated relay 435, and short-circuits resistor 328 at its contact 1 to improve subsequent transmission. Relay 435 holds or maintains operated relay 323, operates relay 413, holds the loops to the first selector 121 and trunk finder 511 closed, and operates relay 436. Finally, relay 436 upon operating prepares the operating path for the relay 450, all similar to the operation with coin before dial tone described above except that the dial-tone paths have already been established.

*Dialing—Sequence chart Fig. 17*

When dial tone is supplied from the tandem office so that relay 310 is operated and relay 311 is normal, and the coin has been deposited at the subset 210, the pulsing relay 435 as described above maintains loop closures across the tip and ring leads to both the local first selector 121 and the outgoing trunk circuit 140. When the subscriber dials, the operating path of the pulsing relay 435 is alternately opened and closed causing relay 435 to follow the dial pulses, repeating them simultaneously to the local train and to the outgoing trunk 140 by alternately opening and closing the loop closures across the tip and ring leads to those circuits. When relay 435 releases on the first pulse, relays 323 and 413 also release, and due to the slow operate characteristic of relay 413 they remain released during the pulsing of the entire digit. Relay 323, upon releasing, short-circuits at its contacts 1 and 5 the retard coils 334 and 335 to improve the loop pulsing condition. At the end of each digit, both relays 413 and 323 reoperate in sequence as shown in the sequence chart of Fig. 17. When the loops in the coin trunk circuit 120 are alternately opened and closed by the pulsing of relay 435, the first selector circuit 121 and succeeding switches in the local train are actuated in a manner well known in the art, and at the same time relay 610 in the outgoing trunk 140 alternately releases and operates. Relay 610, in turn, repeats these pulses towards the tandem office by opening and closing the loop path between the tip and ring leads 641 and 640 which passes through its upper contact. On the release of relay 610 on the first pulse, relay 619 operates from the back lower contact of relay 610 through contact 2 of relay 1010 operated. The operation of relay 619 disconnects the tip and ring leads from the repeat coil 655 and the relays 645 and 646 by opening its break contacts 1 and 3, closes a direct loop closure path across the tip and ring leads 640 and 641 through the pulsing contact of relay 610 by closing its make contact 3, to improve pulsing and, in addition, causes the operation of relay 653 along an operating path through its contact 2. The operation of relay 653 connects through its upper contact a surge protection resistance 654 to the ring side of coil 620. During pulsing, relays 1010, 619 and 653 hold or remain operated but after the last pulse of each digit has been transmitted, relay 610 reoperates and after an interval, the relays 619 and 653 release in sequence. The release of relay 619 removes the direct loop closure path, described above, through its contact 3 across the tip and ring 641 and 640, reclosing them to the repeat coil 655 and polar relay circuit consisting of the relays 645 and 646. When relay 653 releases a short time later, the surge protecting resistance 654 is removed from the ring side of coil 620.

The pulses are in this manner transmitted over the 641—640 loop into the tandem sender 180. As soon as the sender 180 receives the office code it associates itself with the marker 190 through a marker connector circuit 185 as described above in reference to Fig. 1. The sender 180 under this condition transfers the called office code to the marker 190. The sender 180, marker connector 185 and marker 190 are not shown in the Figs. 2 through 13 but are shown in the box diagram in Fig. 1 described above, and are connected to sender link 1220 through lead 1221. The marker 190 thereupon closes a ground connection through the sender 180 and sender link 1220, over the lead 1229, through contact 5 of relay 827, to operate the trunk frame relay 1310. With the trunk frame relay 1310 operated, the same ground is closed over the lead 1311 through contact 4 of relay 1310, to the trunk link and connector circuit 1312, to operate a multicontact relay, not shown therein, which associated the trunk with the marker 190. The marker 190 holds the trunk relay 1310 through the trunk link connector 1312 and continues to receive information from the sender 180 regarding the calling subscriber zone. With this information and the called subscriber office code, the marker 190 disconnects itself from the sender 180, and determines if the call is a local code call or a zone call. If the call is a local call, the marker grounds the lead 1313 through the trunk link and connector circuit 1312 to set the trunk for local train operation as is hereinafter described under local call. If, however, the indication, as in the present example, is for a zone call, the marker 190 proceeds to connect the incoming trunk 150 through to an outgoing terminating trunk, not shown, to the proper office and also to ground one of the leads 1314 through 1317 in order to set the tandem trunk 150 for the proper zone charge. The leads 1314, 1315, 1316 and 1317 are connected respectively through contacts 2, 3, 5 and 6 of the operated relay 1310 to the winding of relays 1110, 1111, 1112 and 1113, respectively, so that one of the relays 1110, 1111, 1112 or 1113 operates.

The operated relay of the relays 1110 through 1113 locks through its contact 4 under control of contact 9 of relay 712 normal, and this locking ground, passed back to the marker 190, is a signal that the charge is set. The marker 190, having associated the tandem incoming trunk 140 with a trunk to the terminating office, releases, and in turn releases relay 1310 therewith.

When the sender 180 receives all of the digits of the called number, it grounds through the link 1220, the lead 1231 to the tandem trunk 150. Ground on lead 1231 is closed through contact 8 of relay 1310 now normal, through contact 2 of the operated one of the relays 1110 through 1113, contact 1 of relay 812 operated through contact 9 of relay 1320, contact 4 of relay 1225, and contact 3 of relay 715, all normal to the winding of relay 910, causing it to operate. Relay 910, as is hereinafter described, when operated, transfers the tip and ring leads 640 and 641 from the step-by-step end of the tandem incoming trunk 150 to the coin operator's answering jack circuit 931, holds the sender line relay, not shown, over the ring lead 1227 and closes ground to the corresponding of the zone charge lamps 1115 through 1118 at the coin operator's position, which is associated with the relays 1110 through 1113. The dial-tone ring path, as described above from the sender 180 is through lead 1221, sender link 1220, ring lead 1227, contact 2 of relay 712, contact 10 of relay 715, contact 5 of relay 812, contact 7 of relay 910, contact 10 of relay 710, to the ring lead 640 and thence to the outgoing trunk 140 of the step-by-step office. When relay 910 operates, opening its contact 7, and breaking off the connection to the step-by-step office, it connects, by closing its contact 8, the portion of the above dial-tone ring path from contact 10 of relay 710 to capacitor 935, and contact 3 of relay 949 to the answering jack 932, so that the ring lead 640 is connected thereto. The dial-tone tip path, also described above from the sender 180, is through lead 1221, sender link 1220, lead 1224, contact 13 of relay 712, contact 4 of relay 812, contact 11 of relay 1225, contact 6 of relay 910, and contact 4 of relay 711, to the tip lead 641. When relay 910 operates its transfer contact 6, the path is transferred from contact 4 of relay 711 and the tip lead 641, to the answering jack 932, through capacitor 936, and contact 2 of relay 949, so that the tip lead 641 is connected thereto. The operation of relay 910 maintains a ground connection through its contact 7 on to the ring lead 1227 through a path from ground, to resistor 911, contact 7 of relay 910, operated, contact 5 of relay 812, contact 10 of relay 715, contact 2 of relay 712 to ring lead 1227, so that the line relay, not shown in the sender 180, is maintained operated. The operation of relay 910, as described above, closes ground to operate one of the zone lamps 1115 through 1118. The path of operation is from ground through contact 8 of relay 1225 normal, contact 19 of relay 1235, contact 4 of relay 920 normal, contact 15 of relay 1320 normal, contact 11 of relay 910 operated, and contact 3 of the operated one of relays 1110 through 1113, to the corresponding of the lamps 1115 through 1118, providing an indication to the operator. The operation of relay 910 also closes audible ringing from the generator 1236 through lamp 1237, capacitor 1238, contact 10 of relay 1225 normal, contact 1 of relay 1320 normal, contact 8 of relay 910 and contact 10 of relay 710, to the ring 640 of the trunk to the step-by-step outgoing trunk 140.

Briefly recapitulating, when the marker 190 receives a return ground on the grounded leads 1314 through 1317 and has found an idle trunk to the proper office, it disconnects from the trunk link and connector circuit 1312 which in turn allows the relay 1310 to release. The tandem sender 180, during this interval that the marker is performing the above functions, receives the balance of the dialed number, and proceeds to make an outgoing selection as soon as the marker 190 completes the connection to an outgoing trunk. The sender 180, when all digits are dialed, connects ground to the lead 1231 to signal the coin supervisory operator. The sender 180, however, holds up the tens and units out selection until the coin supervisory operator has received indications that the coin subscriber has deposited the correct amount of coins and is disconnected from the connection.

*Stuck sender before operator answers*

If the sender 180 becomes stuck, in performing the above-described functions, it immediately sends a flashing audible tone through the sender link 1220, the lead 1227, contact 2 of relay 712, contact 10 of relay 715, contact 5 of relay 812, contact 7 of relay 910, contact 10 of relay 710 to the ring lead 640, and over lead 1224 through contact 13 of relay 712, contact 4 of relay 812, contact 11 of relay 1225, contact 6 of relay 910, contact 4 of relay 711 to the tip lead 641. Thence, the tone is transmitted over the tip and ring leads 515 and 516 of the outgoing trunk 140, trunk finder 511, coin trunk circuit 120 and line circuit 220 to the coin subscriber 210. This sequence of operations is not shown in the sequence charts of Figs. 15 through 23. The coin subscriber 210 should hang up upon receipt of the flashing tone and try his call again. However, if the coin subscriber 210 does not hang up, the tandem sender 180 will complete its time-out period and open the lead 1222 and ground the lead 1231. If this condition occurs while the marker 190 is connected, it awaits the completion of the marker function. If the time out occurs before the marker has operated one of the relays 1110, 1111, 1112 or 1113, the ground on the lead 1231 is closed through contact 8 of relay 1310 normal, contact 2 of all the relays 1110, 1111, 1112 and 1113 normal, contact 4 of relay 831 normal, contact 1 of relay 815 normal, contact 9 of relay 710 normal and contact 9 of relay 711 normal to the primary winding of relay 715 causing it to operate. If one of the relays 1110 through 1113 is operated, the ground on the lead 1231 is closed through contact 8 of relay 1310 normal, contact 2 of the operated relay 1110, 1111, 1112 or 1113, contact 1 of relay 812 normal, contact 1 of relay 827 normal, contact 4 of relay 831 normal, contact 1 of relay 815 normal, contact 9 of relay 710 normal and contact 9 of relay 711 normal to the primary winding of relay 715 causing it to operate. The balance of the operation is as hereinafter explained in reference to a local call condition. Briefly, if the sender 180 in the tandem office should become stuck and be unable to complete the tandem connection before the operator is signaled the operation of relay 715 causes the sender 180 to release which in turn operates thereby, relay 711 and returns a +110 volt signal to the circuit 140 on the tip 641 from tandem. This is the same signal as used for "local code" and causes the trunk 140 to function, as is hereinafter described, under local call, including the sending of ground on the lead 681 to the coin trunk 120. The coin trunk 120 will then function to open the tip and ring 515 and 516 to the circuit 140 in order to release the tandem connection, and busy tone will be supplied to the calling subscriber from the local train.

More specifically the ground connected to the lead 681 in the outgoing trunk 140 passes through trunk finder 511 to coin trunk 120 on lead 532, where it operates relay 311. Relay 311, in operating, locks to the line finder sleeve 250 and transfers, at its contacts 3 and 6, the calling subscriber's transmission path via tip and ring leads 270 and 260 from the trunk finder tip and ring leads 333 and 330 to the first selector tip and ring leads 521 and 522. The operation of relay 311 also opens the loop closure across the tip and ring leads through the trunk finder 511 at its contact 2, causing outgoing trunk 140 to release and in turn to release the incoming tandem trunk 150 and the trunk finder 511. Since the number dialed was that for a tandem call, the local step-by-step train will function to return an all-trunks-busy tone to the calling subscriber.

*All trunks busy*

If the marker 190, in performing the above-described features, is unable to find an idle outgoing trunk to the desired destination, it will signal the sender 180 that no out-pulsing will be required and the sender 180 can release. The marker 190 also connects the incoming tandem trunk 150 to an overflow trunk which returns an audible flashing tone to the coin subscriber 210 via the tip and ring leads of the tandem trunk 150. This sequence of operations is not shown in the sequence charts of Figs. 15 through 23. The sender 180, meanwhile has proceeded to release by opening lead 1222 and grounding lead 1231. Ground on lead 1231 is closed through contact 8 of relay 1310 normal, contact 2 of the operated relay 1110, 1111, 1112 or 1113, contact 1 of relay 812 normal, contact 1 of relay 827 normal, contact 4 of relay 831 normal, contact 1 of relay 815 normal, contact 9 of relay 710 normal, and contact 9 of relay 711 normal to the primary winding of relay 715, causing it to operate. The coin subscriber 210 may disconnect immediately upon hearing the overflow tone, but if not, the balance of the operation is as hereinafter explained in reference to a local call condition.

*Premature dialing*

If the subscriber after having deposited a coin fails to wait for dial tone, with thus neither relay 310 nor relay 311 operated, but dials prematurely, the circuit is arranged to count two pulses and on the second of these to operate relay 311 as is hereinafter described. The sequence of operations that occur during premature dialing is not shown in the sequence charts of Figs. 15 through 23. The operation of relay 311 will cause the release of the tandem connection to prevent a possible partial dial into the sender 180 as the two pulses transmitted are disposed of as preliminary pulses. The call is thereafter routed only through the local train.

When relay 435 releases on the first pulse, relay 450 operates over a path through the contact of relay 430 normal, contact 3 of relay 436 which holds operated over dial pulses and contact 2 of relay 435 normal. When relay 450 operates, it closes a locking path for itself through the winding of relay 430, the operated contact of relay 450, contact 3 of relay 310 normal, contact 4 of relay 311 normal, to the line finder sleeve 250. Relay 430, however, remains shunted down through contact 2 of relay 435 normal until relay 435 reoperates. When relay 435 reoperates, relay 430 operates in series with relay 450, and prepares an operating path for relay 311 through its operated contact. On the second release of relay 435, relay 311 operates over a path through its contact 4 and contact 4 of relay 310 performing the functions hereinafter described in reference to a local call and releasing relays 430 and 450. The call is then completed locally if a local number is dialed, or an all-trunks-busy signal is supplied to the calling subscriber if a tandem number is dialed.

*Operator answers—Sequence chart Fig. 18*

If a tandem call is dialed, as described above, and the coin operator has received a zone charge signal on one of the lamps 1115 through 1118, the operator inserts a cord into the answering jack 931 of the trunk associated with the lighted lamps 1115 through 1118, and a sequence of operations occur in accordance with the chart on Fig. 18. When the plug is inserted into the jack 931 battery is applied on the sleeve lead 959 causing the answer relay 934 to operate. The operation of relay 934 in turn operates the relay 1320 on its primary or lower winding, from ground through contact 3 of relay 910 operated, the upper contact of relay 934, contact 7 of relay 711, contact 7 of relay 710, both normal to the winding of relay 1320. When relay 1320 operates, as is hereinafter described, it locks on its secondary winding, causes relay 710 to operate, and changes the operating circuit of relay 910 to by-pass the contacts of relay 1225. Relay 1320 locks through its secondary or upper winding to ground through contact 8 of relay 1320 operated and contact 3 of relay 910 operated. Relay 710 operates along a path from its locking ground through contact 3 of relay 910, contact 8 of relay 1320, contact 7 of relay 1320, contact 3 of relay 1225 normal, the lower contact of relay 1240 normal, contact 1 of relay 711, to the winding of relay 710, to battery. The operating circuit of relay 910 is changed when relay 1320 operates. The path of operation for relay 910, as described above, was from ground on lead 1231, to contact 8 of relay 1310 normal, contact 2 of the operated one of the relays 1110 through 1113, contact 1 of relay 812 operated, contact 9 of relay 1320 normal, contact 4 of relay 1225 normal and contact 3 of relay 715 normal through the winding of relay 910 to negative battery. When relay 1320 operates, the operating path for relay 910 instead of proceeding from contact 9 of relay 1320 normal to contact 4 of relay 1225 operated, now passes through contact 9 of relay 1320 operated to contact 3 of relay 715 normal, thus by-passing relay 1225. When relay 710 operates, it operates, as is hereinafter described, the relay 949 to send tone to the coin operator, lights the operator cord lamp, and closes +110 volts to the ring 640 of the trunk to the step-by-step office. Relay 949 operates over a path from negative battery through the winding of relay 949, contact 1 of relay 930 normal, contact 10 of relay 910 operated and contact 4 of relay 710 now operated to ground. The coin operator plugged in to the answering jack 931 receives tone over the ring 948, through contact 3 of relay 949 and over the tip 947 through contact 2 of relay 949, lighting the operator's cord lamp, not shown.

When relay 710 operates, as described above, it also closes a +110 volt potential to the ring lead 640. The path from ring lead 640 is through contact 10 of relay 710 now operated, contact 13 of relay 1320 operated, contact 7 of relay 1225 normal, through resistor 1241 to the +110 volt battery 1242. If a local call was being placed by the subscriber of subset 210, as is hereinafter described, a +110 volt battery would be applied to the tip lead 641 instead of to the ring lead 640.

Returning to the tandem call the +110 volt signal when received at the step-by-step office causes, as is hereinafter described, the coin box trunk 120 associated with the calling subscriber at subset 210 to refund the coin in the coin box, and also causes a return check signal of +110 volts to be sent over the tip lead 641 to tandem.

The +110 volts on the ring lead 640 from the tandem office operates relay +646 over a path through contact 1 of relay 618 normal, the upper contact of relay 610 operated, contact 3 of relay 619 normal, through coil 620 and through the windings of relay 646 to ground. The operation of relay +646 in turn causes the operation of relay 1011 through contact 4 of relay +646 and, as hereinafter described, connects ground to lead 523 towards the trunk finder 511, causes the operation of relay 1028 and holds relay 1026 shunted down. The relay 1026 is shunted to ground through contact 3 of relay +646 now operated, contact 6 of relay 1022 normal, contact 3 of relay 624, contact 2 of relay 627, contact 2 of relay 1026, to the battery side of the winding of relay 1026. The ground potential at the winding of relay 1026 is also connected through contact 1 of relay 1026 and contact 3 of relay 1029 to the winding of relay 1028, and also to lead 523 toward trunk finder 511. Ground on the lead 523 is connected through the trunk finder 511 to lead 524 and causes the coin trunk 120, as is hereinafter described, to function to cut through a metallic connection and to release the local train. Relay 1028, upon operating, closes a circuit connection through its contact 4, to start the interrupter and alarm circuit 1030, and closes the lead 1031 from the circuit 1030 to the winding of the relay 1032. The interrupter and alarm circuit 1030 is simply a means for periodically supplying ground and battery potentials, as is well known in the art. A half second ground closure is applied to the lead 1031 in the interrupter and alarm circuit 1030, causing relay 1032 to operate, and lock through its upper contact to relay 1028. After the half second interval, ground closure is transferred from lead 1031 to lead 1033 for another half second, causing relay 1034 to operate over a path from ground on lead 1033, through contact 3 of relay 1028, the lower contact of relay 1032 and contact 4 of relay 1022 to the winding of relay 1034. Relay 1034 operates in turn, over paths hereinafter described, the relays 1025 and 614 and closes —110 volt coin return potential to the contacts of relay 614. The operating path for relay 1025 is from negative battery through the winding of relay 1025, through contact 4 of relay 1034 now operated to ground and the operating path for relay 614 is from negative battery through the winding of relay 614 and contact 5 of relay 1034 operated to ground. The —110 volt source 1035 is connected through resistance lamp 1036 to the contacts 2 and 3 of relay 614 through contact 2 of relay 1034 operated, contact 2 of relay 1029 normal, the winding of relay 1038 and contact 1 of relay 1034 operated. When relay 1025 operates it closes, as is hereinafter described, contact protection for the contacts 2 and 3 of relay 614, prepares a path for the operation of relay 1022 through contact 3 of relay 1025 and removes short circuits across the resistors 657 and 658 in series with the windings of relay 660 by opening the contacts 1 and 2 of relay 1025. Contact protection is provided for contacts 2 and 3 of relay 614 by the connection thereto of capacitor 1040 and resistor 1041 from ground through contact 4 of relay 1025. Relay 614, in operating, closes coin return potential to the tip and ring leads 515 and 516 toward the calling subscriber to return the initial deposit, holds relay 610 operated and operates relay 611 which locks under control of relay 631. The coin return potential source 1035 is connected to the tip and ring leads 515 and 516 to the trunk finder 511, through lamp 1036, contact 2 of relay 1034 operated, contact 2 of relay 1029 normal, relay 1038, contact 1 of relay 1034 operated, and contacts 2 and 3 of relay 614 operated. The negative potential on the tip and ring leads 515 and 516 returns the initial deposit of the calling subscriber since the tip and ring leads 515 and 516 are connected to the subset 210 through the trunk finder 511, leads 330 and 333 to the coin trunk circuit 120, and thence to leads 260 and 270 and the line finder 230. The coin magnet 209 at subset 210 functions thereupon in a manner well known in the art to return the initial deposit. Relay 610 is held operated, when the contacts 2 and 3 of relay 614 break the original path, along a path from negative battery through the lower winding of relay 610, contact 3 of relay 611 normal, resistor 663, preliminary make contact 1 of relay 614 operated, contact 1 of relay 611 normal, to ground through the upper winding of relay 610. Relay 611 is operated over a path from negative battery through contact 4 of relay 614 operated, to ground. When relay 611 operates, it locks to ground through its contact 1 and through contact 2 of relay 631 operated. Relay 611, in operating, also connects together at its contact 4 the leads 630 and 1013, described above, to hold the trunk finder 511 under control of ground on the sleeve lead 630, and transfers by its transfer contacts 2 and 3 the tip and ring leads 515 and 516 from the windings of relay 610 to the windings of relay 660 in order to supply toll grade battery 665. The operating path for line relay 660 at this time is from negative battery 665 to lamp 666, the lower winding of relay 660, resistor 658, contact 3 of relay 611 now operated, resistor 663, contact 1 of relay 614 operated, contact 2 of relay 611 operated, resistor 657, the upper winding of relay 660 and lamp 667 to ground. The relay 660, in operating, in turn holds relay 610 which would otherwise release to the opening of its operating path by relay 611.

When ground is closed to the lead 523, as described above, by relay +646 to the outgoing trunk circuit 511, it causes the operation of relay 423 over a path from ground on lead 524, through contact 5 of relay 311 normal, contact 4 of relay 423, and the winding of relay 423 to battery. When relay 423 operates, it locks through its operated contact 4, contact 2 of relay 441 normal, contact 6 of relay 423 operated, to the sleeve lead 520 grounded, as described above. When relay 423 operates it transfers the tip and ring leads 333 and 330 of the tandem connection from the bridged impedance to the direct path through this circuit, opens the loop to the first selector 121 to release the local train, transfers the forward sleeve lead from the first selector 121 to the outgoing trunk 511, removes battery in this circuit from the winding of relay 341, substitutes battery on the lead 526 from the outgoing trunk 140 and operates relay 319, as is hereinafter described in detail. The tip lead 333 is transferred through contact 3 of relay 423 operated, to contact 1 of relay 424 normal, relay 425, to contact 2 of relay 319 which when operated as is hereinafter described responsive to the operation of relay 423, connects therethrough to tip lead 270, and thence through the line finder 230 to the subset 210. The ring lead 330 is transferred through contact 5 of relay 423 operated, to contact 4 of relay 424 normal, relay 421, to contact 3 of relay 319, which connects therethrough upon its operation, to ring lead 260, and thence through the line finder 230 to the subset 210. The loop from subset 210 to the local train, or to leads 521 and 522, is broken at contacts 3 and 5 of relay 423 upon the operation thereof so that the path to the local train is broken. The forward sleeve lead, to which relays 315 and 423 are held, is transferred at contact 6 of relay 423, when it operates, away from the first selector sleeve lead 357 and closed to the sleeve lead 520 to trunk finder 511. The operation of contact 8 of relay 423 causes the winding of relay 341 to be transferred away from battery through resistor 433, and closed to lead 526, which has battery connected thereto along a path through trunk finder 511, lead 531, contact 1 of relay 1050 normal, and resistor 1059 in outgoing trunk 140. Relay 319 is operated when relay 423 operates, along a path from battery 325 to contact 1 of relay 326 normal, the winding of relay 319, contact 8 of relay 311 normal, contact 7 of relay 423 operated, contact 2 of relay 441 normal, contact 6 of relay 423 operated, to sleeve lead 520 which is grounded through the trunk finder 511 by outgoing trunk 140. When relay 319 operates, it cuts the tip and ring leads 330 and 333 through to the calling line 240, as described above, by closing its contacts 2 and 3 and, as hereinafter described, releases relay 435. The operating path for relay 435 was from its winding through contact 4 of relay 315 operated, contact 3 of relay 318 normal and contact 3 of relay 319 normal, so that when relay 319 operates the path is broken and relay 435 releases. The release of relay 435 in turn causes the release of relays 413, 323 and 436, the operating path for each of these relays being through contact 2 of the operated relay 435, and also opens at its contact 3, the pulsing loop across tip and ring leads 333 and 330 through resistor 340.

It is possible that the number dialed on a tandem call may be such as to establish a connection over the local train to an automatic ticketing trunk, even though the call is not to be completed via the automatic ticketing equipment. Automatic ticketing equipment is old in the art as exemplified by the Patents 2,300,829 to J. W. Gooderham which issued on November 3, 1942, and 2,447,533 to J. B. Retallack which issued on August 24, 1948. Normally the local connection is held as described above until relay 423 operates. Relay 423 does not operate until dialing is completed and the tandem operator has plugged into the connection. In order to minimize the holding time of automatic ticketing equipment in such instances, the marginal relay 342 is provided in coin trunk circuit 120 to permit immediate release of the local train without waiting for the operation of relay 423. This operation is not shown in the sequence charts of Figs. 15 through 23. When the automatic ticketing identifier 542 recognizes, over lead 541 from the line circuit 220, that the call is not to be completed via the automatic ticketing equipment, positive booster battery, not shown, is connected by the sender 540 on the sleeve lead back through the local train to sleeve lead 357 in coin trunk 120, through resistor 368, to the winding of relay 342, causing it to operate. When relay 342 operates, it short-circuits the resistance 368 in series with its winding so as to permit it to hold to ground, closes a holding path for itself to ground through its contact 3 under control of contact 6 of relay 423, and opens the loop through its contact 2 to the first selector 121 to release the local train. When relay 423 later operates and opens the holding path through contact 6, relay 342 releases.

Returning now to the interrupter circuit 1030 associated with outgoing trunk circuit 140, ground is removed from the lead 1033 after one-half second, causing relay 1034 to release since ground was applied thereto through contact 3 of relay 1028, the lower contact of relay 1032, and contact 4 of relay 1022. The release of relay 1034, in turn, releases relay 614 and the slow release relay 1025. The operating path for relay 614 was through contact 5 of relay 1034 operated, and the operating path for relay 1025 was through contact 4 of relay 1034 operated. The release of relay 1034 also removes the coin potential battery 1035 from the tip and ring leads 515 and 516 by breaking the path thereto, at its contacts 1 and 2. When relay 614 releases, it closes leads 515 and 516 to the winding of relay 660 through contacts 2 and 3 of relay 614, contacts 5 and 6 of relay 613 normal, contacts 2 and 3 of relay 612 normal, and contacts 2 and 3 of relay 611 operated. With relay 1034 released and relay 1025 still operated, relay 1022 operates to ground from its contact 3 through contact 3 of relay 1025 still operated, contact 3 of relay 1034 normal, contact 3 of relay 1029 normal, contact 1 of relay 1026 normal, contact 2 of relay 1026 normal, contact 2 of relay 627 normal, contact 3 of relay 624 normal, contact 6 of relay 1022 still normal, and contact 3 of relay +646 operated. Relay 1022, in operating, immediately locks over a path through the contact 3, contact 1 of relay 1029 normal, contact 6 of relay 1022 now operated, and contact 3 of relay +646 operated. When relay 1025 finally releases, it again short-circuits, through its contacts 1 and 2, the resistors 657 and 658 in series with the windings of relay 660. The operation of relay 1022 opens the path of operation through its contact 5 to the relay 619, which was already released at the completion of dialing, and operates relay 1043 through its contact 2. Relay 1043 opens the locking path through its contact 1 for the as yet unoperated relay 624, connects +110 volt battery 1045 through resistor 1046, contact 4 of relay 1043 operated, to the make contact 6 of relay 624 and operates relay 624 from ground through contact 2 of relay 1022 operated and contact 3 of relay 1043 operated. Relay 624, in operating, sends the +110 volts on its contact 6 from the battery 1045 to the tip 641, and thence to the tandem office as a check signal that the coin return operation has been completed.

When the +110 volt return check signal over the tip lead 641 is received at tandem, the relay +830 operates through coil 836, and contact 2 of relay 910 operated. When relay +830 operates, it supplements ground through its contact 1 and contact 15 of relay 1235 normal to hold the coin operator's cord lamp lighted, and operates relay 1240 by supplying ground through contact 2 of relay +830 operated, contact 12 of relay 1225 normal, contact 3 of relay 1120 normal, contact 11 of relay 1320 operated, and contact 4 of relay 1243 normal. When relay 1240 operates, it releases relay 710 by opening its operating path through the lower contact of relay 1240. When relay 710 releases and opens its contact 10, it removes +110 volts from the ring lead 640 to the step-by-step office.

The removal of +110 volts from the ring lead 640 will cause the step-by-step trunk 140, as is hereinafter described, to remove the +110 volts return check signal from the tip lead 641. When the tandem office removes the +110 volts from the ring 640, as described above, relay +646 releases since it was operated thereby. Relay +646, in releasing, opens its contact 4 to cause the release of relay 1011 and opens its contacts 3 to release the slow-to-release relay 1022 and relay 1028, and removes the shunt on relay 1026, permitting it to operate to ground through contact 2 of relay 1022, before that relay has released. When relay 1026 operates, it locks under control of relay 631 through contact 7 thereof so that the release of relay 1022 does not cause the release of relay 1026. The operation of relay 1026, by closing its contact 6, prepares a path for the future operation of relay 613, and by closing its contact 5, prepares a path for the future operation of relay 1043 from the back contact of relay 610. When relay 1022 releases, relays 624 and 1043 are released, having their operating paths broken at the contact 2. When relay 624 releases, it removes the +110 battery 1045 from the tip lead 641, thereby removing the check signal. The release of relay 1028 when relay +646 releases, in turn releases, by opening its contact 1, the relay 1032.

With the +110 volts removed from the tip lead 641, relay +830 releases and causes the shunted relay 1243 to operate and lock in series with relay 1240 to the locking ground at relay 1320. The operating path for relay 1243 is completed by ground on contact 3 of relay 910 operated, through contacts 8 and then 7, of relay 1320 operated, contact 3 of relay 1225 normal, lower contact on relay 1240 operated, winding of relay 1243, and winding of relay 1240 to negative battery. Relay 1243 operated releases relay 949 by opening its operating path at contact 2. Relay 949 released, removes tone from the tip and ring leads 641 and 640, extinguishes the coin operator's cord lamp by removing ground on its contact 4, to contact 5 of relay 934, and through the winding of relay 934 to the cord sleeve of the coin operator's cord, and cuts the coin operator through to the coin subscriber.

The coin operator requests the calling subscriber to deposit coins to cover the initial charge period, and determines, by listening to the bell or gong of the coin box, if the proper coins are deposited. During the remainder of the time the operator is plugged in, refund of coins manually can be made, and the operator can be signaled by a flash from the coin subscriber. The manual control of the coins at this time is the same as that hereinafter described in reference to coin control during overtime periods. Flashing of the operator is accomplished in the same manner as later described under Subscriber flashing.

*Operator removes plug—Sequence chart Fig. 18A*

Being satisfied that the proper coins have been deposited the operator removes the plug of the cord from the answering jack 931, causing the relay 934 to release, as shown in the sequence chart of Fig. 18A.

When the coin operator removes the plug of the cord from the answering jack 931 on the initial deposit condition, relay 934 releases. Relay 934 releases and closes thereby, through its upper contact, ground from contact 3 of relay 910 operated, to contact 8 of relay 920 normal, contact 6 of relay 1320 operated, and contact 14 of relay 1235 normal, to the winding of relay 1225, causing it to operate. When relay 1225 operates, it locks under control of contact 6 of relay 712, provides a lock to ground through its contact 6 (relay 1225) for relay 712 when it operates, and closes ground from contact 4 of relay 950 normal, through contact 9 of relay 910 operated, contact 17 of relay 920 normal, contact 2 of relay 1225 now operated, contact 7 of relay 1235 normal, lead 1222, and the sender link 1220, to the sender 180. This ground on the lead 1222 causes the sender 180 to operate causing ground to be removed from the lead 1231. Under this condition the trunk relay 910 releases, since the path of operation for relay 910 was from ground on lead 1231, to contact 8 of relay 1310 normal, contact 2 of the operated relays 1110 through 1113, contact 1 of relay 812 operated, contact 9 of relay 1320 operated, and contact 3 of relay 715 to the winding of relay 910. The release of relay 910 in turn releases relays 1320, 1243 and 1240 since their locking paths are held through contact 3 of relay 910. The sender 180 meanwhile proceeds to complete tens and units selection to the terminating office. The release of the relay 910 recloses the ring lead 640 of the trunk to the sender 180, to hold the line relay therein, not shown, and opens the advance ground signal from the lead 1222, by opening its contact 9. The ring path from the sender 180 is now through lead 1221, sender link 1220, ring lead 1227, contact 2 of relay 712, contact 10 of relay 715, contact 5 of relay 812, contact 7 of relay 910 normal, contact 10 of relay 710 to the ring lead 640. When relay 1225 operates, as described above, it opens at contact 11 the lead 1224 to the sender 180 and closes the windings of relay 830 to the trunk tip 641 through contact 9 of relay 1225 now operated and coil 836 of the repeating coil 811.

When the units selection is complete the sender 180 functions to connect ground to the lead 1231. This ground is closed through contact 8 of relay 1310 normal, contact 2 of the operated relays 1110 through 1113, through contact 1 of the relay 812 operated, contact 9 of the relay 1320 normal, contact 4 of relay 1225 operated, to the winding of relay 827 causing it to operate. When relay 827 operates, it locks through its contact 4 to contact 11 of relay 712 normal, and as hereinafter described, closes the winding of relay 835 across the outgoing tip and ring leads 1322 and 1321, closes the winding of relay 813 to the trunk ring lead 640 and closes ground to the sender lead 1229. The winding of relay 835 is closed across the outgoing tip and ring leads 1322 and 1321 over a path from ring lead 1321 to contact 1 of relay 950 normal, coil 837, through the winding of relay 835, contact 6 of relay 827 now operated, coil 838, contact 5 of relay 950 normal, to the tip lead 1322. The winding of relay 813 is connected to the ring lead 640 over a path through contact 7 of relay 827 operated, coil 810, and contact 10 of relay 710 normal. Ground is closed by the operation of relay 827 to the lead 1229 towards the sender 180 through a path from contact 2 of relay 827 operated, to contact 7 of relay 812 operated, contact 7 of relay 833 normal, and contact 5 of relay 827 operated. With ground on lead 1229, the sender 180 opens the lead 1222 removing the ground therefrom and thus causing relay 812 to release. When relay 812 releases, it closes ground from contact 2 of relay 827 operated, through contact 7 of relay 812 now normal, to the winding of relay 833 causing it to operate and open the lead 1229 at its contact 7. The operation of relay 833 prepares the circuit at its contact 3 so that when the called subscriber answers causing relay 835 to operate, as is hereinafter described, it will cause relay 812 to operate again. Relay 833 locks through its contact 4 to contact 4 of relay 712 normal and operates relay 730 by connecting ground on contact 14 of relay 920 normal, through contact 3 of relay 833, to the winding of relay 730, and, as hereinafter described, prepares for a two to four-second charge delay. When ground is removed from lead 1229 the sender 180 releases and, in turn, releases the sender link 1220.

*Stuck sender after operator answers*

If sender 180, in completing the tens and units selection following disconnect by the coin operator, should become stuck, it immediately sends a flashing audible tone over the ring lead 1227 to the coin subscriber 210. The sender 180 also proceeds with its stuck sender time-out interval, and when completed, opens lead 1222 and grounds lead 1231. The flashing audible tone on lead 1227 is connected to the ring lead 640 and thence to the coin subscriber 210 through the outgoing trunk 140, trunk finder 511, coin trunk 120, and line circuit 220, via contact 2 of relay 712 normal, contact 10 of relay 715 normal, contact 5 of relay 812 operated, contact 7 of relay 910 normal, and contact 10 of relay 710 normal. The coin subscriber 210, upon receipt of the tone from sender 180, should disconnect to restore the trunk circuits to normal, but if he does not disconnect the sender completes time-out to open lead 1222 and ground lead 1231. Relay 812 releases when lead 1222 is opened and opens the ring lead 1227 to the sender at its contact 5, opening the path that was provided flashing tone to the subscriber 210 as described above. The ground on lead 1231 is connected through contact 8 of relay 1310, contact 2 of operated relays 110 through 113, contact 1 of relay 812 normal, contact 1 of relay 827 normal, contact 4 of relay 831 normal, contact 1 of relay 815 normal, contact 9 of relay 710 normal, contact 9 of relay 711 normal, and the winding of relay 715, to battery. When relay 715 operates, it locks, through its own contact 5, to ground on contact 3 of relay 712. This same locking ground on contact 3 of relay 712 passes through contacts 5 and then 4 of relay 715 operated, contact 8 of relay 812, contact 13 of relay 1235, contact 12 of relay 920, contact 2 of relay 831, contact 4 of relay 815 and contact 2 of relay 710 to the winding of relay 711 causing operation thereof. Relay 711, in operating, closes a +110 volt signal on the tip lead 641, through resistance 856, contact 9 of relay 815, contact 9 of relay 715 operated, contact 17 of relay 1235, contact 6 of relay 815, contact 4 of relay 711 operated, to trunk circuit 140, causing it to function in the same manner, as hereinafter described under local call, including the sending of ground on lead 681 to the coin trunk circuit 120 to operate relay 311.

The operation of relay 311 at this time, by opening its contact 8, releases relay 319 which, in turn, opens the tip and ring leads 330 and 333 at contacts 2 and 3, to release the tandem connection, and causes the reoperation of relays 435, 413, 323 and 436. Relay 435 operates over a path through contact 4 of relay 315 operated, contact 3 of relay 318 normal, and contact 3 of relay 319, now normal, to the ring lead 260. When relay 435 operates, it closes ground through its contact 2 to the windings of relays 436 and 413, causing them to operate. When relay 413 operates, it closes its operate ground from contact 2 of relay 435 operated, to the winding of relay 323, causing it to operate. The pulsing loops across the tip and ring leads 330, 333, 521 and 522 are held open at this time by the operated relays 311 and 423. With relays 311, 436 and 423 operated, relay 441 operates through contact 2 of relay 423, contact 1 of relay 436 and contact 7 of relay 311, to close a busy-tone signal to the calling subscriber. The busy tone is connected to the subscriber through contact 1 of relay 441 operated, capacitor 442 and the ring lead 260. When the outgoing trunk 140 and trunk finder 511 release, ground is removed from the forward sleeve lead 520, to which relays 315 and 423 are held, but the operation of relay 441 maintains a holding ground for those relays from contact 2 of relay 435 operated, through contact 2 of relay 436 operated, and contact 2 of relay 441 operated, until the calling subscriber disconnects.

*Called line busy*

Should the call proceed satisfactorily at the tandem office, in that the coin operator has answered and disconnected, and the tandem sender 180 completed its function of outpulsing, the coin subscriber will await the answer of the called subscriber. Should the called subscriber's line be busy at the distant local office, line busy tones will be returned over the tip and ring leads from the distant local office back to the coin subscriber. These tones indicate to the coin subscriber that the line is busy and he should disconnect and try the call again later.

*Called party answers—Sequence chart Fig. 20*

When the called party answers battery and ground is applied through link 1312 to the leads 1322 and 1321 respectively, causing relay 835 to operate, and, in turn, cause the operation of relay 812 over a path from the winding of relay 812, through contact 2 of relay 833 operated, the left contact of relay 835 operated, and contact 2 of relay 816 operated, to ground. Relay 812 closes ground from contact 1 of relay 920 normal, through contact 1 of relay 833 operated, contact 2 of relay 812 operated, terminal 1, arc 2 of selector 1122, and over lead 1125, to the charge delay circuit 720. The charge delay circuit 720 has two relays, 721 and 722, which follow the interrupter 723. The relay 721 operates from the left contact and the relay 722 from the right contact of the interrupter 723. This operation, as is hereinafter described, provides a two to four-second delay before the charge relay 724 will be operated. When relay 721 operates, the ground on lead 1125 over the path described above from contact 1 of relay 920 is closed to the winding of the relay 725 causing it to operate. When relay 725 operates, it locks through its contact 4 to the lead 1125 by-passing the relay 721 and prepares, by closing its contact 2, the circuit to operate the relay 724. Approximately two seconds later, relay 722 operates, due to the action of the interrupter 723, and closes the ground on lead 1125 through contact 2 of relay 725 operated, to the winding of relay 724, causing it to operate. When relay 724 operates, it locks through its contact 6, under control of contact 18 of relay 1235 normal, contact 10 of relay 920 normal, and contact 5 of relay 712 normal. The operation of relay 724 in turn operates relay 711 from ground through contact 3 of relay 724 operated, contact 5 of relay 725 operated, contact 2 of relay 831 normal, contact 4 of relay 815 normal, contact 2 of relay 710 normal, to the winding of relay 711. When relay 711 operates, it closes —110 volts from battery 727 through resistor 728, contact 1 of relay 725 operated and contact 4 of relay 711 now operated over the tip lead 641 of the trunk to the step-by-step outgoing trunk 140.

As is hereinafter described in detail, the relay —645 operates under this condition of the —110 volt tip signal to indicate that the called party has answered and to set the circuitry in the step-by-step office for coin collect on disconnect. It also functions to send a —110 volt return check signal over the ring lead 640 to the tandem office.

When the called subscriber answers, as described above, —110 volts are applied to the tip lead 641 from the tandem office operating relay —645 over a path through contact 6 of relay 624 normal, contact 1 of relay 619 normal, coil 623, and the windings of relay 645, to ground. The operation of relay —645 operates relay 1011, and relay 613. The winding of relay 1011 is connected to ground through contact 1 of relay —645 operated, and the winding of relay 613 is operated through its contact 4, contact 6 of relay 1026 operated, contact 2 of relay 1050 normal, contact 2 of relay 1051 normal, the upper contact of relay 651 operated, contact 2 of relay 633 normal, contact 5 of relay 618 normal, and contact 2 of relay —645 now operated, to ground. When relay 613 operates, it locks through its contact 4 under control of contact 2 of relay 631, and reverses the battery and ground on the tip and ring leads 515 and 516 toward the coin trunk 120 as a signal for the coin trunk 120 to be arranged, as is hereinafter described, to "collect" when the subscriber disconnects. The path from tip lead 515 through coil 616, and contact 2 of relay 614 normal, instead of being through contact 5 of relay 613 normal, and thence through contact 2 of relay 612 normal, contact 2 of relay 611 operated, resistor 657, and the upper winding of relay 660 to ground through lamp 667, is now through contact 6 of relay 613 now operated, contact 3 of relay 612 normal, contact 3 of relay 611 operated, resistor 658, and the lower winding of relay 660, to the negative battery through lamp 666. The path from ring lead 516 through coil 615, and contact 3 of relay 614 normal, instead of being through contact 6 of relay 613 normal, and so to the negative battery at relay 660, it is now connected through contact 5 of relay 613 operated, and so to the ground at the relay 660. When relay 613 operates, it also separates the leads 1013 and 630 by opening its contact 7, and opens the path from ground at contact 2 of relay 631, through its own contact 2, now open, contact 2 of relay 1021 normal, and contact 3 of relay 1020 operated, to the winding of relay 1021, which has heretofore held relay 1021 shunted down, thereby permitting relay 1021 to operate in series with relay 1020. Relay 613, in operating, in addition advances the ground path from contact 2 of relay —645, over which relay 613 itself had operated, by closing it through its contact 3, to the winding of relay 1014, to operate relay 1014. When relay 1021 operates, it removes the resistance shunt 1023 from across relay +646 by opening its contact 3 and removes ground from the lead 517 by opening its contact 4. When relay 1014 operates, it connects —110 volts from battery 1055 through resistor 1056, through contact 1 of relay 634 normal, to the make contact 1 of the relay 618, opens at its contact 1 the locking path for relay 618 through contact 4 of relay 618 and contact 1 of relay 633, and operates relay 618 through its contact 3 and contact 2 of relay —645 operated. When relay 618 operates, it closes —110 volts, on its make contact 1, to the ring 640 as a check signal, and operates relay 633 which performs no useful function at this time.

When the called subscriber answered, the outgoing trunk circuit 140 functioned, as described above, to reverse battery and ground over the tip and ring leads 515 and 516 to the trunk finder 511. The trunk finder 511 has the leads 515 and 516 connected therethrough to the tip and ring leads 333 and 330, respectively. When battery is reversed on the leads 333 and 330 in this manner, relay 425 operates and relay 421, heretofore operated, now releases due to the reversal of the loop current through the windings of these polar relays. This loop path is traced from tip lead 333, contact 3 of relay 423 operated, contact 1 of relay 424 normal, the winding of relay 425, through contact 2 of relay 319 operated, to the tip lead 270, over the subscriber's loop 240, back on ring lead 260, through contact 3 of relay 319 operated, the winding of relay 421, contact 4 of relay 424 normal, contact 5 of relay 423 operated, to ring lead 330. With relay 421 released and relay 425 operated, relay 424 operates over a path from battery through resistor 453, the winding of relay 424, contact 4 of relay 454 normal, the upper contact of relay 455 normal, the contact of relay 425 operated, the contact of relay 421 normal, to ground through contact 4 of relay 316 operated. When relay 424 operates it in turn locks through its contact 2 to the ground through contact 4 of relay 316, operates relays 341 and 455, reverses the tip and ring leads 333 and 330 from the outgoing trunk 140 and short-circuits relay 425 which releases. The operating path for relay 341 is from battery on lead 526, through the winding of relay 341, contact 2 of relay 341 normal, contact 2 of relay 424 operated, to the locking ground of relay 424. Relay 455 operates over a path also through contact 2 of relay 424 operated, to the locking ground of relay 424. The ring and tip leads 333 and 330 are reversed at the contacts 1 and 4 of relay 424 as they proceed through the coin trunk circuit 120, as shown by the heavy lines in the drawing. Relay 425 is short-circuited when relay 424 operates as contact 3 of relay 424 closes a shorting path thereacross through contact 1 of relay 454 normal.

The reversal of the tip and ring lead connections by the operation of relay 424 causes relay 421 to operate once again, since the loop current is now flowing through the winding of relay 421 in its operate direction. With relays 455 and 421 operated, relay 454 operates over a path from battery through resistor 456, the winding of relay 454, the lower contact of relay 455, the right contact of relay 421, to ground through contact 4 of relay 316 operated. When relay 454 operates, it locks to ground through its contact 3 and contact 4 of relay 316, and removes the short circuit from relay 425 by opening its contact 1, relay 425 remaining released. When relay 341 operates, as described above, it locks through its contact 2, to ground, through contact 4 of relay 316 operated, and sets the circuit so as to collect coins, as is hereinafter described, when the calling subscriber disconnects. The reversal of the line by the operation of relay 424 is necessary to keep the tip side of the line, which is grounded at the station 210 as long as a coin is in the box, always connected through relay 425 to the side of the loop which is grounded in the outgoing trunk 140.

The —110 volt return check signal to the tandem office, which occurs as described above when relay 618 operates, is closed through lead 640 to contact 10 of relay 710 normal, through the repeating coil 810, contact 7 of relay 827 operated, to the windings of relay 813 which are connected by capacitor 841, causing relay —813 to operate. When relay —813 operates, it closes ground from its contact 1, through contact 8 of relay 725 operated, contact 5 of relay 832 normal, to the winding of relay 831 causing it to operate. When relay 831 operates, it locks to ground through the winding of relay 832, contact 5 of relay 725 operated and contact 3 of relay 724 operated, and releases relay 711 by opening at contact 2 of relay 831, the operate path for relay 711 described previously as ground through contact 3 of relay 724 operated, contact 5 of relay 725 operated, contact 2 of relay 831 normal, contact 4 of relay 815 normal, contact 2 of relay 710 normal, to the winding of relay 711. When relay 711 releases, it opens the —110 volt signal from battery 727, through resistor 728, and contact 1 of relay 725 operated, to the tip 641 of the trunk to the step-by-step office.

Upon receipt of the check signal, the tandem end, therefor, removes —110 volts from the tip 641 which releases relay —645 in the step-by-step office, since relay —645 was operated previously, as described above, over a path from the tip lead 641. When relay —645 releases, relays 1011, 1014, 618 and 633 all release, as is hereinafter described, removing the —110 volt check signal from the ring 640. When contact 1 of relay —645 opens, relay 1011 releases having its winding connected to ground therethrough, When contact 2 of relay —645 opens. removes ground from the path through contact 3 of relay 1014 operated, to the winding of relay 618 causing it to release, removes ground from the path through contact 5 of relay 618 operated, to the winding of relay 633 causing it to release, and removes ground from the path through contact 3 of relay 1014 operated, the upper contact of relay 651 operated, contact 2 of relay 1051 released, contact 2 of relay 1050 released, contact 6 of relay 1026 operated, contact 3 of relay 613 operated, to the winding of relay 1014 causing it to release.

The removal of the return check signal from the ring lead 640 causes relay —813, which is connected thereto through contact 10 of relay 710, coil 810 and contact 7 of relay 827, to release. When relay —813 releases, it removes the shunting ground from the winding of relay 832, through contact 5 of relay 832 normal, contact 8 of relay 725 operated to ground on contact 1 of relay —813. Relay 832 now operates in series with relay 831 through contact 2 of relay 831 operated, contact 5 of relay 725 operated and contact 3 of relay 724 operated, to ground.

*Timing of initial period—Sequence chart Fig. 19*

Returning to the sequence chart of Fig. 18A when relay 833 operated, as described above, when the operator removed the plug from jack 931, it connected ground from contact 14 of relay 920 normal, through contact 3 of relay 833 operated, to the winding of relay 730 to operate said relay if it were not already operated by another trunk. Relay 730 closes coil 731 of the fifteen-second timer, not shown, to the alternating-current source 732, causing the timer to operate. When the timer contact closes, it operates relay 733 shown in Fig. 19 of the sequence charts. Relay 733, which is connected to ground through the contact of relay 730, closes to the winding of the selector relay 1121 over a path from ground, through contact 1 of relay 920 normal, contact 1 of relay 833 operated, contact 2 of relay 812 operated (Fig. 20), contact 7 of relay 725 operated, through one of the contacts of relay 733 operated, to contact 3 of relay 725 operated, contact 1 of relay 832 operated, and contact 8 of relay 724 operated. When relay 733 releases, the selector 1122 steps to terminal 2. As the selector 1122 steps off terminal 1, it opens the lead 1125 and causes the relay 725, which is connected thereto through its contact 4, to release. The release of relay 725 in turn releases relays 831 and 832 by opening their operating path at contact 5 of relay 725. The release of the relay 725 by-passes the operating path of relay 1121 around the relay 832, so that its operating is now from the winding of the step relay 1121, to contact 8 of relay 724 operated, contact 3 of relay 725 normal, a closed contact of relay 733 operated, to the contact 10 of selector winding 1122. The relay 733 continues to operate and release on fifteen-second intervals, due to the action of the timer, not shown, closing ground from arc 2 of selector 1122 over a path from ground on contact 1 of relay 920 normal, contact 1 of relay 833 operated, contact 2 of relay 812 operated, arc 2 of selector 1122, contacts 2–13 of selector 1122, or contacts 14–22 of selector 1122 through contact 8 of relay 1110–13 operated, a closed contact of relay 733 operated, contact 3 of relay 725 normal, contact 8 of relay 724 operated to winding of step relay 1121.

This operation continues until the selectors 1122, 1123 and 1124 are stepped to terminal 12 or 20 depending upon the initial charge interval. Terminal 12 would mean an initial interval of three minutes and terminal 20 would be for five minutes. When the selectors 1122, 1123 and 1124 reach terminal 12 or 20, ground is connected from contact 10 of relay 712 normal, through contact 6 of relay 724 operated, contact 2 of relay 711 normal, contact 3 of relay 710 normal, terminal 20 of selector 1124, through one of the links Y after four and one-half minutes of a five-minute initial interval and through a link Z after two and one-half minutes of a three-minute initial interval, through contact 6 of the operated one of relay 1110, 1111, 1112 or 1113 to the winding of relay 1120, the initial period charge relay, causing it to operate. When relay 1120 operates, it locks by-passed around the relays 710 and 711 over a path from ground on contact 18 of relay 920 normal. Relay 1120, upon its operation, also causes the operation of relay 710 by applying ground from contact 2 of relay 1120 through the lower contact of relay 1240 normal and contact 1 of relay 711 normal and closes —110 volts from battery 1127 through resistor 1128, contact 4 of relay 1120, contact 5 of relay 1243 normal, through contact 10 of relay 710 operated, to the ring 640 of the trunk, to the step-by-step office.

Returning now to the description of the operation of the circuit as shown in Fig. 19, the −110 volt signal on the ring 640 of the trunk in the step-by-step office, in general, causes the coin to be collected at the coin station 210, sends a +110 volt return check signal to tandem over the tip 641 of the trunk, and sets the coin trunk circuit 120 to refund on disconnect. The −110 volts from the ring 640 are connected through contact 1 of relay 618 normal, the upper contact of relay 610 operated, contact 3 of relay 619 normal, coil 620, to the winding of relay −646. When relay −646 operates, it connects ground to operate relays 1011, 1029 and 1050. The operation path for relay 1011 is through contact 1 of relay 613 operated and contact 1 of relay −646 to ground. The winding of relay 1029 is connected to the winding of relay 1050 through contact 3 of relay 1052 normal, and contact 3 of relay 1050 normal so that they both operate when ground is connected thereto from contact 2 of relay −646 through contact 1 of relay 1022 normal, contact 1 of relay 624 normal, contact 3 of relay 629 normal, contact 3 of relay 650 operated, and contact 1 of relay 1021 operated. The operation of relay 1029 closes +110 volts of battery 1054, through lamp 1055, contact 2 of relay 1029 operated, through the winding of relay 1038, contact 1 of relay 1034 when operated as described hereinafter, to the contacts 2 and 3 of relay 614. Relay 1029 also prepares a path for locking relay 1022, when it operates subsequently, through contact 3 of relay 1022 and contact 1 of relay 1029 to ground at the winding of relay 1029, and operates relay 1028 from this same ground through contact 3 of relay 1029 and contact 4 of relay 1052 normal. Relay 1028 operates and the circuit functions to apply coin collect potential to the subscriber's line 240 in the same manner, as described above, when the operator plugged in to jack 931, as shown in the sequence chart of Fig. 18, except that relays 611 and 660 are already operated, and +110 volt battery rather than −110 volt battery is closed to the tip and ring leads. Relay 1028, upon operating, closes a circuit connection through its contact 4 to start the interrupter and alarm circuit 1030, and closes the lead 1031 from the circuit 1030 to the winding of the relay 1032. A half second ground closure is applied to the lead 1031 in the interrupter and alarm circuit 1030 causing relay 1032 to operate, and lock through its upper contact to relay 1028. After the half second interval ground closure is transferred from lead 1031 to lead 1033 for another half second causing relay 1034 to operate over a path from ground on lead 1033, through contact 3 of relay 1028, the lower contact of relay 1032 and contact 4 of relay 1022 to the winding of relay 1034. Relay 1034 operates in turn, over paths hereinafter described, the relays 1025 and 614 and closes +110 volt coin collect potential to the contacts of relay 614. The operating path for relay 1025 is from negative battery through the winding of relay 1025, through contact 4 of relay 1034 now operated, to ground and the operating path for relay 614 is from negative battery through the winding of relay 614 and contact 5 of relay 1034 operated, to ground. The +110 volt source 1054 is connected to the contacts 2 and 3 of relay 614 as described above in connection with relay 1029. When relay 1025 operates, it closes contact protection for the contacts 2 and 3 of relay 614, prepares a path for the operation of relay 1022 through contact 3 of relay 1025, and removes short circuits across the resistors 657 and 658 in series with the windings of relay 660, by opening the contacts 1 and 2 of relay 1025. Contact protection is provided for contacts 2 and 3 of relay 614 by the connection thereto of capacitor 1040 and resistor 1041 from ground, through contact 4 of relay 1025. Relay 614, in operating, closes coin collect potential to the tip and ring leads 515 and 516 toward the calling subscriber to collect the deposit for the initial talking period and holds relay 660 operated through its preliminary make contact 1. The coin collect potential source 1054 is connected to the tip and ring leads 515 and 516 to the trunk finder 511, through lamp 1055, contact 2 of relay 1029 operated, relay 1038, contact 1 of relay 1034 operated, and contacts 2 and 3 of relay 614 operated. The positive potential on the tip and ring leads 515 and 516 collects the initial deposit of the calling subscriber, since the tip and ring leads 515 and 516 are connected to the subset 210 through the trunk finder 511, leads 330 and 333 to the coin trunk circuit 120, and thence to leads 260 and 270 and the line finder 230. The coin magnet at subset 210 functions thereupon in a manner well known in the art to collect the initial period deposit.

Returning now to the interrupter circuit 1030, ground is removed from the lead 1033 after one-half second causing relay 1034 to release since ground was applied thereto through contact 3 of relay 1028, the lower contact of relay 1032, and contact 4 of relay 1022. The release of relay 1034 in turn releases relay 614, and the slow release relay 1025. The operating path for relay 614 was through contact 5 of relay 1034 operated, and the operating path for relay 1025 was through contact 4 of relay 1034 operated. The release of relay 1034 also removes the coin potential battery 1054 from the tip and ring leads 515 and 516 by breaking the path thereto at its contact 1. When relay 614 releases, it recloses leads 515 and 516 to the winding of relay 660 through contacts 2 and 3 of relay 614. With relay 1034 released and relay 1025 still operated, relay 1022 operates to ground from its contact 3 through contact 3 of relay 1025 still operated, contact 3 of relay 1034 normal, contact 3 of relay 1029 operated, and contact 4 of relay 1052 normal, to the operating ground for relay 1029, which is through contact 1 of relay 1021 operated, contact 3 of relay 650 operated, contact 3 of relay 629 normal, contact 1 of relay 624 normal, contact 1 of relay 1022 still normal, and contact 2 of relay −646 operated. Relay 1022 locks to ground through its contact 3, contact 1 of relay 1029 operated, contact 1 of relay 1021 operated, contact 3 of relay 650 operated, contact 1 of relay 1022 operated, and contact 2 of relay −646 operated. When relay 1025 finally releases it again short-circuits, through its contacts 1 and 2, the resistors 657 and 658 in series with the windings of relay 660. The operation of relay 1022 also operates relay 1043 through its contact 2. Relay 1043 opens the locking path through its contact 1 for the as yet unoperated relay 624, connects +110 volt battery 1045 through resistor 1046, contact 4 of relay 1043 operated, to the make contact 6 of relay 624, and operates relay 624 from ground through contact 2 of relay 1022 operated, and contact 3 of relay 1043 operated. Relay 624, in operating, sends the +110 volts on its contact 6 from the battery 1045 to the tip 641, to the tandem office as a check signal that the coin collect operation has been completed.

Returning to the operation of relay 1050, when it operates as described above it locks to the sleeve lead 630 under control of contact 2 of relay 1052, prepares through its contact 2 a future operating path for relay 1052, and removes battery 1058 through resistor 1059 and contact 1 of relay 1050 from the lead 531 to the trunk finder 511 in order to set the coin trunk circuit 120 for "coin return" in case the calling subscriber should deposit additional coins between four and one-half and five minutes and then disconnect during that interval. The lead 531 is connected to lead 526 through the trunk finder 511. When battery is removed from lead 531 to the trunk finder 511 it removes the connection therethrough to lead 526 to the coin trunk 120 thereby releasing relay 341. Lead 526 is connected to the winding of relay 341 through contact 8 of relay 423. When relay 341 releases, the coin trunk circuit 120 is set to refund any coins subsequently deposited if the calling subscriber disconnects between four and one-half and five minutes.

The +110 volt return check signal on the tip 641, described above, causes the relay +830 in the tandem incoming trunk to operate through coil 836, contact 9 of relay 1225 operated, to the windings of relay +830 and resistor 843 to ground. The windings of relay +830 are bridged by the capacitor 844. When relay +830 operates, it closes ground, from its contact 2, to contact 12 of relay 1225 operated, contact 6 of relay 1120 operated, and contact 4 of relay 1243 normal, to the winding of relay 1240, causing it to operate. When relay 1240 operates, it releases the relay 710 which was connected to ground through contact 1 of relay 711 normal, the lower contact of relay 1240 normal, and contact 2 of relay 1120 operated. When relay 710 releases, it removes −110 volt signal from the ring 640 of the trunk to the step-by-step office by opening its contact 10.

When the −110 volts are removed from the ring 640 the step-by-step outgoing trunk 140 functions, as is hereinafter described, to open the +110 volt return check signal on the tip lead 641 to tandem. When tandem removes −110 volts from the ring, relay −646 releases being connected thereto through coil 620, contact 3 of relay 619 normal, the upper contact of relay 610 operated, and contact 1 of relay 618 normal. When relay −646 releases, it in turn releases the relays 1011, 1029 and 1022. Relay 1011 was connected to ground through contact 1 of relay −646, and relays 1029 and 1022 were connected through contact 1 of relay 1021 operated, contact 3 of relay 650 operated, contact 1 of relay 1022 operated, through contact 2 of relay −646 to ground. When relay 1029 releases, it brakes, at its contact 3, the operating path for relay 1028 which released when its operating path therethrough to contact 2 of relay −646 opened. When relay 1028 releases, it opens at its contact 1 the operating path for relay 1032 which thus also releases. When relay 1022 releases and opens its contact 2, relays 624 and 1043 release, removing the +110 volt check signal from the tip.

When the +110 volt check signal on lead 641 is removed, it causes relay +830 to release again which in turn allows the relay 1243 which was shunted by ground from contact 2 of relay 830, through contact 12 of relay 1225 operated, contact 6 of relay 1120 operated, contact 4 of relay 1243 normal to the winding of relay 1243, thereby to operate in series with relay 1240, by ground on contact 2 of relay 1120 operated, and the lower contact of relay 1240 operated, to the winding of relay 1243. When relay 1243 operates, it prepares the circuit from the selector 1124, to the winding of the overtime relay 920, by closing its contact 1. The path is from the winding of relay 920, contact 9 of relay 812, contact 1 of relay 1243 operated, contact 5 of relay 1120 normal, contact 7 of the operated one of relays 1110 through 1113, the Y or Z connection depending upon the initial interval, as described above, to a terminal of selector 1124. The selectors 1122 through 1124 continue to step if the subscribers continued to talk.

When the selector 1124 reaches it terminal 22 approximately thirty seconds after the coin was collected for the initial talking period, as described above, a ground from contact 10 of relay 712 normal is closed through contact 6 of relay 724 operated, contact 2 of relay 711 normal, contact 3 of relay 710 normal, through terminal 22 of selector 1124 and contact 7 of the operated one of relays 1111 through 1113, contact 5 of relay 1120 operated, contact 1 of relay 1243 operated, and contact 9 of relay 812 operated, to the winding of relay 920 causing it to operate. When relay 920 operates, it locks under control of contact 5 of relay 712 normal and operates relay 910 to ground through contact 14 of relay 920 and releases relay 1120 by opening the locking path at contact 13 of relay 920. Relay 1120 released in turn releases relays 1240 and 1243 by opening the locking path through the lower contact of relay 1240 operated to ground on contact 2 of relay 1120. With relay 910 operated, ground through the interrupter 1245 is closed through contact 8 of relay 1225 operated, contact 19 of relay 1235 normal, contact 4 of relay 920 operated, the lower contact of relay 934 normal, contact 11 of relay 910 operated, through contact 3 of the operated one of relays 1111 through 1113, to the associated lamps 1115 through 1118 to flash at the coin operator's position. This flashing signal is an indication to the coin operator that supervision is required for an overtime connection. The operation of the circuitry of Figs. 2 through 13 when the operator answers this overtime flashing is hereinafter described in reference to the operating sequence chart of Figs. 21 and 22.

*Disconnect by the calling subscriber during initial period—Sequence chart Fig. 23*

If the calling subscriber disconnects during the initial five-minute period the tip and ring loop will open but the line finder 230 is held operated by ground at contact 4 of relay 316 operated. The line 240 from the subset 210 will be opened breaking the operating path for relays 660 and 421 through line finder 230, tip lead 270, contact 2 of relay 319 operated, the winding of relay 425, contact 4 of relay 424 operated, contact 5 of relay 423 operated, to the ring lead 330, trunk finder 511, ring lead 516, coil 615, contact 3 of relay 614 normal, contact 5 of relay 613 operated, contact 2 of relay 612 normal, contact 2 of relay 611 operated and resistor 657 to the upper winding of relay 660 and thence to ground through lamp 667. Disconnect at subset 210 also opens the ring path through the ring lead 260, contact 3 of relay 319 operated, the winding of relay 421, contact 1 of relay 424 operated, contact 3 of relay 423 operated, the tip lead 333, trunk finder 511, tip lead 515, coil 616, contact 2 of relay 614 normal, contact 6 of relay 613 operated, contact 3 of relay 612 normal, contact 3 of relay 611 operated, through resistor 658 and the lower winding of relay 660 to battery 665 through the lamp 666. When relay 660 releases in this manner, it opens the operating path through its contact for the lower winding of relay 610 causing it in turn to release. The release of relay 610 will cause the relays 1043 and 624, as is hereinafter described, to operate to transmit a momentary +110 volt flash signal to the tandem office on the tip lead 641. Relay 1043 operates over a path from ground at the lower contact of relay 610 normal, through contact 2 of relay 1011 normal, contact 2 of relay 1010 operated, contact 3 of relay 633 normal, contact 6 of relay 618 normal, contact 2 of relay 634 normal, contact 5 of relay 629 normal, contact 4 of relay 669 normal, contact 1 of relay 627 normal, contact 2 of relay 624 normal and contact 5 of relay 1026 operated, to the winding of relay 1043. When relay 1043 operates, it locks to ground through its own contact 3, through contact 2 of relay 634 normal, contact 6 of relay 618 normal, contact 3 of relay 633 normal, contact 2 of relay 1010 operated and contact 2 of relay 1011 normal, to the back contact of relay 610. The operation of relay 1043 causes relay 624 to operate by connecting its winding through contact 3 of relay 1043 now operated to the operating ground, described above, for relay 1043. When relay 1043 operates, it also connects a +110 volt battery 1045 to the make contact 6 of relay 624 so that the operation of relay 624 closes this +110 volts to the tandem office on tip lead 641.

The +110 volts on the tip lead 641 cause the relay +830 to operate as the lead 641 is connected thereto through contact 4 of relay 711 normal, coil 836 and contact 9 of relay 1225 operated. When relay +830 operates, it closes ground through contact 12 of relay 1225 operated and contact 6 of relay 1120 normal, to the winding of relay 945 causing relay 945 to operate. The operation, however, of relay 945 at this time performs no useful function.

When relay 610 releases, as described above, it removes ground from its lower make contact which allows the slow-to-release relay 1010 to release an interval of time after the operation of relays 1043 and 624. When relay 1010 releases, it opens its contact 2 and causes the relays 624 and 1043 to release to remove the +110 volt flash signal from the tip lead 641, and by removing ground from lead 1013 at its contact 1 it allows the trunk finder 511 to release. When relay 624 releases, it removes the +110 volts from the tip 641 allowing the relay +830 to release which in turn releases relay 945. The operating paths for these relays were described above in reference to their operation. Relay 1043 is a slow-to-release relay and thus releases after the removal of the +110 volts from the tip lead 641. When relay 1043 finally releases, it causes the relay 624 to reoperate over a path through contact 1 of relay 628 operated, contact 1 of relay 629 normal, contact 1 of relay 669 normal, contact 5 of relay 634 normal, contact 2 of relay 1043 normal, contact 3 of relay 1026 operated, contact 2 of relay 1010 normal, contact 2 of relay 1011 normal and the lower contact of relay 610 normal. When relay 624 operates, it locks to ground through its contact 4, contact 4 of relay 627 normal, contact 6 of relay 629 normal and contact 1 of relay 1043 normal. The operation of relay 624 at this time also short-circuits the pulsing contacts of relay 610 to keep the ring side of the loop toward tandem closed, and closes −110 volts on the tip 641 as a disconnect signal to tandem. The ring side of the loop to tandem is normally maintained closed by the upper contacts of relay 610 operated, but upon the release of relay 610 and the operation of relay 624, as described above, this path is closed from ring lead 640, through contact 1 of relay 618 normal, contact 5 of relay 624 operated, contact 3 of relay 619 normal, coil 620, through the windings of relay 646, to ground. The −110 volts on the tip lead 641 is connected from battery 1044 through resistor 1047, contact 4 of relay 1043 normal and contact 6 of relay 624 operated. The operation of the circuitry in the tandem office that occurs when the disconnect −110 volts are received on the tip lead 641 will be hereinafter described after the following description of the sequence of operations that occur in the step-by-step office when the trunk finder 511 releases, as described above.

Trunk finder 511 releases, as described above, when relay 1010 releases and opens its contact 1. When trunk finder 511 releases it opens all leads between the coin trunk 120 and the outgoing trunk 140, including the sleeve lead 520—630, and in turn releases the relays 423, 319 and 315 which were held operated to the sleeve lead 520. The relay 423 was connected to ground on lead 520 from the trunk finder 511 through contact 4 of relay 423 operated, contact 2 of relay 441 normal and contact 6 of relay 423 operated.

When relay 423 releases, it opens further the operating paths for relays 319 and 315. The path for relay 319 was from battery 325 through contact 1 of relay 326 normal, contact 8 of relay 311 normal, contact 7 of relay 423 operated, contact 2 of relay 441 normal, and contact 6 of relay 423 operated, to ground on sleeve lead 520. When relay 319 releases, it transfers the tip and ring leads 270 and 260 away from the transmission path through the circuit, and closes them to contacts 2 and 3 of relay 318 in preparation for disposal of coins at subset 210. The operate path for relay 315 was from battery 314 through its contact 2, through the winding of relay 315, the contact of relay 418 normal, contact 2 of relay 441 normal, and contact 6 of relay 423 operated, to ground on sleeve lead 520. When relay 315 releases, it causes the operation of relay 326 under control of the ground interruption lead 354 from the coin trunk time release circuit or alarm circuit for prepay coin trunks. The operating path for relay 326 would be from the intermittent ground connection on lead 354 through the contact 1 of relay 316 operated, contact 3 of relay 326 normal, the winding of relay 326 and contact 1 of relay 315 normal, to negative battery. The ground connection from the circuit 353 is intermittently and alternately connected to the leads 354 and 355 for an interval of one-half second duration each.

When relay 326 operates, it locks to ground through its contact 3 and contact 4 of relay 316 operated and connects battery 314 through contact 2 of relay 315 normal, contact 5 of relay 316 operated, contact 2 of relay 326 operated, through the winding of relay 318 to lead 355 so that when the ground connection is applied to lead 355, relay 318 operates. When relay 326 operates, it also connects the battery 325 through its contact 1 to lamp 362 and resistor 363 to the circuit 353 providing battery thereto. When relay 318 operates, it connects, as is hereinafter described, 110 volts positive or negative to the line 240 to dispose of the coin in the coin box at subset 210. If the coin is to be collected at this time, the 110-volt positive battery 356 is connected through the coin collect lamp 357, contact 4 of relay 341, which will be operated at this time, through the winding of relay 352 and contacts 2 and 3 of relay 318 operated, contacts 2 and 3 of relay 319 normal, to the tip and ring leads 270 and 260, a ground connection through the coin magnet being present on the tip due to the coin at the subset 210. If the coin is to be returned at this time, relay 341 would be released and the 110-volt negative battery 358 would be connected through the coin return lamp 359, contact 1 of relay 318 operated, contact 4 of relay 341 normal, the winding of relay 352, the contacts 2 and 3 of relay 318 operated and thence through contacts 2 and 3 of relay 319 normal, to the grounded tip and ring leads 270 and 260. Relay 352 therefore operates, both on coin return and coin collect, in series with the coin magnet and remains operated during the time that battery is connected to the line. Battery through the coin magnet should cause disposal of the coin but this magnet will hold ground on the tip 270 as long as it remains operated. When relay 352 operates, it connects battery through its operated contact from lead 360 of the circuit 353 to the winding of relay 348 to hold that relay operated, since the operating circuit for relay 348 was opened at contact 4 of relay 318 when relay 318 operated. The operation of relay 348 therefore remains undisturbed when its original operating path is opened.

When the circuit 353 removes the ground connection from lead 355, relay 318 releases and removes the coin collect or coin return potential from the line 240, releases relay 352 and recloses the operating path through its contact 4 for relay 348, maintaining this relay operated when the contact of relay 352 opens. At the next closure of ground to lead 355 by the circuit 353, relay 318 again operates and again connects coin disposal battery to the line 240. The coin should have been disposed of on the first application of the potential and the coin magnet restored to normal so that no current now flows through the winding of relay 352 upon this subsequent application of coin potential. Relay 352, therefore, does not operate and since the operated path for relay 348 has been opened at contact 4 of relay 318 operated, and no holding path is applied through the contact of relay 352, relay 348 releases. The release of relay 348 opens the operating path for the relay 316 causing it in turn to release. The release of relay 316 removes the ground connection from its contact 4 to the sleeve lead 250 and thereby removes ground potential from the following relays causing them to release. These released relays are 455, 412, 454, 310, 424, 326 and 341. The operating paths for these relays are described above when they were operated. The removal of ground connection from the sleeve 250 allows the line finder 230 and the line circuit 220 to release. When relay 316 releases, it also opens the operating path at contact 5 for the relay 318 causing it in turn to release and the coin trunk circuit 120 is thus restored to normal.

Returning now to the sequence of operations, as shown also in Fig. 23, that occur when the step-by-step outgoing trunk circuit 140 sends a −110 volt disconnect signal on the tip lead 641 to tandem, the −110 volt disconnect signal was applied to the tip lead 641 when the relays 1010 and 1043 released and relay 624 reoperated. The −110 volts on the tip lead 641 are connected through contact 4 of relay 711 normal, through the repeat coil 836, contact 9 of relay 1225 operated, to the winding of relay 830 causing it to operate on its negative side. When relay −830 operates, it connects ground to the winding of relay 1235 through contact 3 of relay −830 operated, causing the relay 1235 to operate. When relay 1235 operates, it locks through contact 2 of relay 815 normal, contact 9 of relay 1235 operated, contact 1 of relay 715 normal and contact 12 of relay 712 normal to ground. Relay 1235 is not dependent upon its locking circuit at this time, however, because the relay −830 remains operated until the −110 volt disconnect signal is removed at the step-by-step office. When relay 1235 operates, it also closes ground through contact 6 of relay 1235 operated, contact 3 of relay 1320 normal, contact 5 of relay 1235 operated, contact 9 of relay 710 normal and contact 9 of relay 711 normal, to the primary winding of relay 715 causing it to operate. The operation of relay 1235 also releases relay 724 which operated over a path through its locking contact 6 and contact 18 of relay 1235 normal, contact 10 of relay 920 normal, to ground at contact 5 of relay 712 normal. The release of relay 724 opens at its contact 8, the circuit which thereby stops the timing operation. When relay 715 operates, it locks through its contact 5 to ground at contact 3 of relay 712 normal and closes its locking ground through its contact 4, contact 2 of relay 724 normal, contact 6 of relay 833 operated, contact 13 of relay 1235 operated and contact 1 of relay 711 normal, to the winding of relay 710 causing it to operate. When relay 710 operates, it closes the +110 volt battery 855 through resistor 856, contact 9 of relay 815 normal, contact 9 of relay 715 operated, contact 17 of relay 1235 operated and contact 10 of relay 710 operated, to the ring lead 640 to the step-by-step office as a return check signal.

The +110 volts on the ring lead 640 is connected through contact 1 of relay 618 normal, contact 5 of relay 624 operated, contact 3 of relay 619 normal, coil 620 and through the winding of relay 646, causing relay +646 to operate. When relay +646 operates, it connects ground through its contact 4 to the winding of relay 1011 causing it to operate, and it also connects ground from its contact 3, through contact 6 of relay 1022 normal, and contact 3 of relay 624 operated, to the winding of relay 627 causing it to operate. When relay 1011 operates, it connects the winding of relay 1010 through its contact 1 to ground at the lower contact of relay 610 normal, causing the relay 1010 to operate, and also opens the operating path of relay 624 at its contact 2. When relay 627 operates, it locks to ground through its contact 3, and contact 2 of relay 631 operated, breaks the locking path at its contact 4 for relay 624, and at its contact 5 for relay 628. The release of relay 624 removes the −110 volt disconnect signal through its contact 6 from the tip lead 641 causing the incoming trunk 150 to release, as is hereinafter described. The release of relay 628 closes the shunting path from contact 5 of relay 627 operated and contact 4 of relay 628 now normal, to the battery side of the winding of relay 631. When ground is closed thereby to relay 631, it causes the relay 631 to release. The release of relay 631 opens the operating circuits for all the relays in the outgoing trunk circuit that are operated at this time except for the relays 1010, 1011 and +646 which are released by the incoming trunk circuit 150, as is hereinafter described. The relays that are released at this time are relays 627, 650, 651, 613, 611, 1050, 1020, 1021 and 1026. The operating paths for these relays were described above in reference to their operation.

Returning now to the removal of the −110 volt disconnect signal by the outgoing trunk 140 from the tip lead 641 to the incoming trunk circuit 150, relay −830 upon this removal releases. When relay −830 releases, it opens the operating path for relay 1235 at its contact 3, since the locking circuit for relay 1235 through contact 1 of relay 715 normal was opened when relay 715 operated, as described above. The release of relay 1235 closes ground at contact 10 of relay 1320 normal, through contact 8 of relay 1235 normal, contact 7 of relay 724 normal, contact 7 of relay 715 operated, to the winding of the disconnect relay 712 causing it to operate. When relay 712 operates, it locks through its contacts 7 and 8 to all the relays in the incoming trunk circuit 150 that are operated at this time and causes all these relays to release. When all the incoming trunk relays are released, relay 712 in turn releases. The relays that were operated at this time are relays 710, 715, one of the relays 1115 through 1118, 945, 730, 816, 1225, 827, 833, 835, and 812. When relay 710 releases, it removes the +110 volts at its contact 10 from the ring lead 640 allowing the relay +646 in outgoing trunk 140 to release which in turn releases the two remaining operated relays in the outgoing trunk 140, namely the relays 1011 and 1010. No relays in any of the circuits remain operated at this time.

*Disconnect by the called subscriber during initial period*

If the called party disconnects and the coin subscriber maintains or holds connection during the initial talking period, relay 835 in the incoming trunk releases since its operating path or loop through the trunk link and connector circuit 1312 is from the tip lead 1322 through contact 5 of relay 950 normal, coil 838, contact 6 of relay 827 operated, the winding of relay 835, back through coil 837 and contact 1 of relay 950 normal, to the ring lead 1321. When relay 835 releases, it closes ground to relay 739 over a path from contact 2 of relay 816 operated, the right contact of relay 835 normal, contact 1 of relay 724 operated, to the interrupter contact 741 and to the winding of relay 739. When the interrupter 740 causes the interrupter contact 741 to close, relay 739 is operated. The release of relay 835 also causes the release of the trunk relay 812 which is connected to the left contact of relay 835 through contact 2 of relay 833 operated. When relay 739 operates, it locks to ground through its upper contact and when the interrupter contact 742 is closed, ground is connected therethrough and through the lower contact of relay 739 operated, to contact 2 of relay 920 normal, contact 9 of relay 710 normal, contact 9 of relay 711 normal, to the primary winding of relay 715 causing it to operate. The time release provided by the interrupter 740 may be a minimum of sixty or one hundred and twenty seconds whichever is desirable. When relay 715 operates, it locks to ground through its contact 5 and contact 3 of relay 712 and closes its locking ground through its contact 4, contact 8 of relay 812 normal, contact 13 of relay 1235 normal, contact 12 of relay 920 normal, contact 2 of relay 831 normal, contact 4 of relay 815 normal and contact 2 of relay 710 normal, to the winding of relay 711 causing it to operate. When relay 711 operates, it closes +110 volts from battery 855 through resistor 856, contact 9 of relay 815 normal, contact 9 of relay 715 operated, contact 17 of relay 1235 normal, contact 6 of relay 815 normal and contact 4 of relay 711 operated, to the tip lead 641 to the step-by-step office. This signal causes the coin subscriber to be disconnected from the outgoing trunk 140, as is hereinafter described under Local Call, with the trunk held busy and provides a return check signal of −110 volts on the ring lead 640 to the tandem office.

The −110 volt signal on the ring lead 640 causes the relay −813 to operate which in turn closes ground from its contact 1 through contact 2 of relay 715 operated and contact 5 of relay 832 normal to the winding of relay 831 causing it to operate. When relay 831 operates, it releases the relay 711 which was operated through contact 2 of relay 831 normal, as described above, and thus terminates the disconnect signal to the step-by-step office. Under this condition the step-by-step outgoing trunk 140 removes, as is hereinafter described, the —110 volt return check signal from the ring lead 640 to the tandem office.

When the —110 volt return check signal is removed from the ring lead 640, relay —813 releases and allows the shunted relay 832 to operate. The operating path for relay 832 is from the winding of relay 831 through the winding of relay 832, contact 2 of relay 831 operated, contact 12 of relay 920 normal, contact 13 of relay 1235 normal, contact 8 of relay 812, contacts 4 and 5 of relay 715 operated, to ground on contact 3 of relay 712. When relay 832 operates, it closes ground from its contact 3 through contact 7 of relay 715 operated to the winding of the disconnect relay 712 causing it to operate. When the disconnect relay 712 operates, it locks to all the relays that are operated in the trunk circuit 150 and causes all these relays to release in a similar manner, as described above, in reference to disconnect by the calling subscriber, thus restoring the circuit to normal.

*Operator answers overtime flashing—Sequence chart Fig. 21*

If neither subscriber disconnects during the initial five-minute period and the circuit is timed to its full five minutes, an overtime flashing signal is sent, as described above to the coin operator.

As shown in Fig. 21, when the coin operator answers the overtime flashing signal by plugging in at jack 931, relay 934 operates, and operates in turn relay 1320, over a path from ground through contact 3 of relay 910 operated, the upper contact of relay 934 operated, contact 7 of relay 711 normal and contact 7 of relay 710 normal, to the winding of relay 1320. The operation of relay 934 also extinguishes the flashing overtime signal by breaking the operating path therefor through the lower contact. When relay 1320 operates, it locks to ground through its contact 8 and contact 3 of relay 910 operated and closes its locking ground at contact 8 through contact 7 of relay 1320 operated, contact 3 of relay 1225 operated, contact 12 of relay 920 operated, contact 2 of relay 831 normal, contact 4 of relay 815 normal, and contact 2 of relay 710 normal, to the winding of relay 711 causing it to operate. When relay 711 operates, it closes —110 volts through resistor 921 and contact 15 of relay 920 operated, contact 4 of relay 1235 normal, contact 4 of relay 831 normal, contact 4 of relay 711 operated, out on the tip 641 of trunk to the step-by-step office. Relay 711 also operates relay 949 which closes tone to the coin operator. The operating path for relay 949 is through contact 1 of relay 930 normal, contact 10 of relay 910 operated, and contact 5 of relay 711 operated, to ground.

The —110 volts from trunk circuit 150 is transmitted to the outgoing circuit 140 on the tip 641, operating relay —645 over a path through contact 6 of relay 624 normal, contact 1 of relay 619 normal, and coil 623. The operation of relay —645 operates relays 1011 and 1052. The operating path for relay 1011 is through contact 1 of relay —645 operated, and the operating path for the overtime relay 1052 is through contact 2 of relay 1050 operated, contact 2 of relay 1051 normal, the upper contact of relay 651 operated, contact 2 of relay 633 normal, contact 5 of relay 618 normal, and contact 2 of relay —645, now operated. Relay 1052, in operating, locks to ground on the sleeve lead 630 in series with relay 1051 through contact 2 of relay 1052. Relay 1051 is held shunted down at this time by the orginal operating ground for relay 1052, now closed through contact 1 of relay 1052, and so does not operate. The operation of relay 1052 transfers control from automatic coin collect to manual coin collect, and releases relay 1050 at contact 2 of relay 1052. When relay 1050 releases, it recloses battery 1058 through its contact 1 to the lead 531 as a signal for the coin trunk 120 to be arranged for coin collect on disconnect, and advances the ground from contact 2 of relay —645 through contact 5 of relay 618 normal, contact 2 of relay 633 normal, the upper contact of relay 651 operated, contact 2 of relay 1051 normal, contact 2 of relay 1050 normal, contact 6 of relay 1026 operated, contact 3 of relay 613 operated, to the winding of relay 1014, to operate relay 1014. The negative potential on lead 531 is connected through the trunk finder 511 to lead 526 and through contact 8 of relay 423 to operate relay 341, which sets the coin trunk 120 to automatically collect any coins remaining in the coin box when the calling subscriber disconnects. When relay 1014 operates, it connects the —110 volt battery 1055 through its contact 2 and resistor 1056 and contact 1 of relay 634 normal, to the make contact 1 of relay 618, opens the locking path for relay 618 through contact 1 of relay 1014, and operates relay 618 through contact 3 of relay 1014, and contact 2 of relay —645. When relay 618 operates, it closes —110 volts from its contact 1 to the ring 640 as a check signal to tandem, and operates relay 633.

The return check signal from the step-by-step office operates relay —813 over a path from ring lead 640 through contact 10 of relay 710 normal, coil 810 and contact 7 of relay 827 operated. When relay —813 operates, it closes ground through its contact 1, contact 11 of relay 920 operated and contact 5 of relay 832 normal, to the winding of relay 831, causing it to operate. When relay 831 operates, it releases, at its contact 2, relay 711 which in turn removes the —110 volt signal of battery 818 from the tip 641 of the trunk to the step-by-step office. When tandem removes the —110 volts from the tip 641, relay —645 releases and in turn releases relays 1011, 633, 1014 and 618 to remove the check signal from the ring 640 and permits, by removing the shunting ground connection, relay 1051 to operate in series with relay 1050, to connect the leads 630 and 1013 together.

Under this condition, relay —813 releases and allows relay 832 to operate over a path in series with relay 831. When relay 832 operates, it releases relay 949 to remove the tone from the coin operator's jack 931. The operating path for relay 949 at this time was through contact 1 of relay 930 normal, contact 10 of relay 910 operated, contact 1 of relay 831 operated and contact 2 of relay 832 released. The talking circuit is now cut through to the operator and she explains to the subscribers about the overtime call and rates.

This circuit is now arranged so that the operator in the tandem office may collect or return coins at will on a manual basis and apply ringing potential to the calling line 240. The trunk finder 511 is held to ground on both the leads 1013 and 630 in order that the connection may be held under control of the operator when the calling subscriber disconnects.

*Operator disposes of overtime coins—Sequence chart Fig. 22*

If the operator wishes to dispose of coins during the overtime period, she will operate the coin collect or coin refund key and hold it until a check signal is received, as described below.

The coin supevisory operator can collect or refund a coin at the distant coin box, by operating the cord key and the position coin collect or refund key on the toll position. Under this condition a plus or minus 110-volt battery, not shown, is connected through jack 931 to the tandem trunk through contact 3 of relay 949 nomal, contact 1 of relay 1320 operated, the windings of relay 940, and resistance 958, to ground. Under this condition the relay 940 operates to its plus or minus position depending upon the polarity of coin potential. Assuming a coin collect signal of +110 volts is connected, it then causes relay +940 to operate, as shown in Fig. 22, and thereby closes ground from contact 11 of relay 1235 normal, through contact 4 of relay 910 operated, and contact 7 of relay 920 operated, through the upper contact of relay 940 to the primary winding of relay 930 causing it to operate. When relay 930 operates, it (*a*) closes its operate ground from relay +940 through contact 3 of relay 930, the lower contact of relay 1240 normal, through contact 1 of relay 711 normal to the winding of relay 710 causing it to operate, (*b*) opens the circuit at its contact 1 to the winding of relay 949 to prevent its operation, (*c*) locks on its secondary winding to its operate ground by-passed around relays 920 and 940 through contact 4 of relay 910 operated and contact 11 of relay 1235 normal, (*d*) prepares a path through its contact 6 to shunt out resistance 958 in series with the winding of relay 940, (*e*) supplies a lock ground through its contact 2 and contact 7 of relay 712 for the winding of relay 712 and closes —110 volts through resistor 961 from relay +940 operated, through contact 7 of relay 1225 operated, contact 13 of relay 1320 operated, contact 10 of relay 710 operated to the ring 640 of the trunk to the step-by-step office.

The —110 volt coin collect signal on the ring of the outgoing trunk to tandem causes relay —646 to operate through contact 1 of relay 618 normal, the upper contact of relay 610 operated, contact 3 of relay 619 normal and coil 620. Relay —646, in general, causes a coin collect potential to be sent out over the tip and ring leads 515 and 516 to the coin subscriber's telephone causing the coin magnet to operate and collect the coin.

More specifically, the relay —646 in operating closes ground through its contact 1 and contact 1 of relay 613 operated, to operate relay 1011 and through its contact 2 to operate relay 1029. The operating path for relay 1029 is from ground at contact 2 of relay —646 through contact 1 of relay 1022 normal, contact 1 of relay 624 normal, contact 3 of relay 629 normal, contact 3 of relay 650 operated, and contact 1 of relay 1021 operated. The operation of the coin collect relay 1029 closes its operate ground from contact 2 of relay —646, as described above, through contact 4 of relay 1052 operated and contact 4 of relay 1029 now operated, to the lower winding of relay 1034 causing said relay to operate. When relay 1029 operates, it closes +110 volt battery 1054 through its contact 2 to the winding of relay 1038 which appears at the contact 1 of relay 1034. When relay 1034 operates, it closes this 110-volt coin collect potential at its contact 1 to the contacts 2 and 3 of relay 614. The operation of relay 1034 also causes the operation of relays 1025 and 614 with relay 1025 operating over a path from its winding through contact 4 of relay 1034 operated, and relay 614 operating over a path from its winding, through contact 5 of relay 1034 operated. When relay 614 operates, it holds relays 610 and 660 operated, as is hereinafter described, and closes the coin collect potential at its contacts 2 and 3, through the coils 616 and 615, respectively, to the tip and ring leads 515 and 516 to the trunk finder 511. Relay 660 is held operated over a path from battery through its lower winding, through resistor 658, through contact 3 of relay 611 operated, resistor 663, preliminary make contact 1 of relay 614 operated, contact 2 of relay 611 operated, through resistor 657 to the upper winding of relay 660 to ground. Relay 610 is held operated over a path from battery through its lower winding, through the contact of relay 660 operated, to ground. The coin collect potential on the leads 515 and 516 is connected through the trunk finder circuit 511 and coin trunk circuit 120 to the subset 210 where the presence of coin ground due to a coin in to the coin hopper will connect ground over this path so that relay 1038 through which the coin collect potential from battery 1054 passes, as described above, will operate. When relay 1038 operates, it closes the operate ground of relay 1034, described above, through its lower contact, contact 3 of relay 1034 operated, contact 3 of relay 1025 operated, contact 3 of relay 1022 normal to the winding of relay 1022 causing said relay to operate. When relay 1022 operates, it locks to the operate ground for relay 1029 through contact 3 of relay 1022 operated and contact 1 of relay 1029 operated, and also causes the operation of relay 1043 by connecting ground thereto through contact 2 of relay 1022 operated. When relay 1043 operates, it closes the +110 volts from battery 1045 through resistor 1046, contact 4 of relay 1043 operated to the make contact 6 of relay 624. When relay 1043 operates, it also causes relay 624 to operate and connects this +110 volt potential at contact 6 of relay 624 to the tip lead 641 to the tandem office to light a lamp before the operator, as is hereinafter described, indicating that the coin collect potential has been applied and that a coin was present. The operating path for relay 624 is through contact 3 of relay 1043 operated and contact 2 of relay 1022 operated.

The return +110 volt check signal on the tip lead 641 causes the relay +830 in the tandem incoming trunk 150 to operate, as this relay is connected to the tip lead 641 through contact 2 of relay 910 operated and the coil 836. When relay +830 operates, it closes ground through its contact 2 to contact 12 of relay 1225 operated, contact 6 of relay 1120 normal to the winding of relay 945 causing said relay to operate. When relay 945 operates, it closes ground through its upper contact, contact 5 of relay 920 operated, contact 6 of relay 930 operated to short out the resistor 958 which is in series with relay 940, thus reducing the resistance in the 110-volt circuit to the operator's cord to allow a marginal relay, not shown, in the coin feature of the toll position to operate and light the coin collect lamp, also not shown, as an indication that there is a coin in the box to be collected. The coin operator thereafter holds the collect key, also not shown, down for approximately one-half second and thereafter releases it. Under this condition the relay +940, which was connected through contacts 1 of relay 1320 operated and contact 3 of relay 949 normal to the jack 931, releases. When relay +940 releases, it removes the —110 volt signal by opening its lower contact which connected the —110 volts therethrough and through contact 5 of relay 930, contact 7 of relay 1225 operated, contact 13 of relay 1320 operated and contact 10 of relay 710 operated from the ring lead 640 to the step-by-step office.

Generally, the step-by-step trunk 140 releases its coin collect feature which terminates the coin collect potential to the coin box in subset 210, to release the coin magnet 209 therein and also causes the return check signal on the tip 641 to be disconnected. More specifically, when the —110 volt potential in the ring 640 is removed, relay —646 which was connected thereto, as described above, releases. When relay —646 releases, it opens the operating paths, described above, to ground for the relays 1011, 1029, 1022 and 1034 causing them to release. The release of relay 1034 disconnects the +110 volt coin collect potential from the tip and ring leads, thereby releasing relay 1038, and opens at its contact 4 the operating path for relay 1025 and at its contact 5 the operating path for relay 614 causing said relays to release. When relay 1022 releases, it opens at its contact 2 the operating path for relay 1043 and for relay 624 causing them to release and to remove the +110 volt check signal from battery 1045 from the tip lead 641 to the tandem office. When the +110 volts are removed from the tip lead 641, relay +830 which was connected thereto, as described above, releases. When relay +830 releases, it removes the ground connection to relay 945 over a path also described above. When relay 945 releases, it removes the shunt connection through its upper contact for the resistor 958. When relay +940 released, as described above, when the operator released the coin collect key, not shown, it caused the relay 710 to release since the operating path therefor was through contact 1 of relay 711 normal, lower contact of relay 1240 normal, contact 3 of relay 930 operated, upper contact of relay +940 operated, contact 7 of relay 920 operated, contact 4 of relay 910 operated to ground on contact 11 of relay 1235 normal.

If the operator wishes to check at this point that the coin has been collected, the coin collect key is reoperated the sequence of operation, as shown in Fig. 22, with the exception that relay 1038 in the outgoing trunk 140 will not operate since the coin ground is not present, and relays 1022, 1043 and 624 will not operate to return the +110 volt tip check signal. The absence of the check signal will indicate to the operator that the coin has been disposed of.

Should the operator wish to return coins, the coin return key is operated to connect a —110 volt coin refund potential through contact 3 of relay 949 normal and contact 1 of relay 1320 operated, to the winding of relay 940 causing relay —940 to operate. When relay —940 operates, it closes an operating path for relay 930 which in turn operates relay 710 over a path therefrom through contact 1 of relay 711 normal, the lower contact of relay 1240, contact 3 of relay 930 operated, the upper contact of relay —940 operated, contact 7 of relay 920 operated, contact 4 of relay 910 operated, to ground on contact 11 of relay 1235 normal. When relay 710 operates, it closes +110 volts to the ring lead 640 to the step-by-step office through resistance 960, the upper contact of relay +940 operated, contact 5 of relay 930 operated, contact 7 of relay 1225 operated, contact 13 of relay 1320 operated, and contact 10 of relay 710 operated, to the tip lead 640.

With +110 volts on the ring lead 640 to the step-by-step office, relay +646 operates in the outgoing trunk 140 to cause —110 volt coin return potential to be sent out over the tip and ring leads 515 and 516 to the coin box to refund the coin. The balance of the operation in general is the same, as described above, for the collection of the coin. More specifically, when relay +646 operates, it in turn operates relay 1011 over a path through contact 4 of relay +646. Relay 1029 is not operated at this time as it was during the coin collect sequence of operations, described above and shown in the sequence chart of Fig. 22. The operation of relay +646 also causes the operation of relay 1034 by connecting ground through contact 3 of relay +646 operated, through contact 6 of relay 1022 normal, contact 3 of relay 624 normal, contact 2 of relay 627 normal, contact 2 of relay 1026 operated and contact 4 of relay 1029 normal to the lower winding of relay 1034. When relay 1034 operates, it in turn causes the operation of relays 1025 and 614. The operated path for relay 1025 is through the contact 4 of relay 1034 operated and the operating path for relay 614 is through contact 5 of relay 1034 operated. When relay 614 operates, it closes a —110 volt coin return potential to the tip and ring leads 515 and 516 instead of a +110 volt coin collect potential. The —110 volt coin return potential is connected from battery 1035 through lamp 1036, contact 2 of relay 1034 operated, contact 2 of relay 1029 normal, the winding of relay 1038, contact 1 of relay 1034 operated, contacts 2 and 3 of relay 614 operated through the coils 616 and 615 to the tip and ring leads 515 and 516, respectively. At the same time that relay 614 connects the —110 volts through to return the coins at the subset 210, it also causes the operation of relay 1038 if there is a ground present at the coin box due to the existence of coins therein. The operation of relay 1038 causes in turn the operation of relay 1022 over a path through contact 3 of relay 1022 normal, contact 3 of relay 1025 operated, contact 3 of relay 1034 operated, and the lower contact of relay 1038 to the operate ground for relay 1034. The operating path for relay 1034 is described above. When relay 1022 operates, it in turn causes the operation of relay 1043 through contact 2 of relay 1022 operated. When relay 1043 operates, it in turn causes the operation of relay 624 over a path through contact 3 of relay 1043 operated and contact 2 of relay 1022 operated. When relay 624 operates, it connects a +110 volt check signal from battery 1045 through resistor 1046, contact 4 of relay 1043 operated, contact 6 of relay 624 operated, to the tip lead 641 towards the tandem office.

The check signal, in the same manner as described above with reference to the coin collect sequence operations, as shown in Fig. 22, causes the relay +830 to operate which in turn causes the relay 945 to operate. When the operator releases the key during this coin return sequence of operations in response to the lighting of the coin return lamp, the —110 volt coin refund potential is opened causing relay —940 to release. When relay —940 releases, it causes relay —930 to release which in turn releases relay 710 and opens to +110 volts on the ring 640 to the step-by-step office. When the +110 volt ring potential, is removed, it releases the relay 646 which in turn releases the relays 1011, 1022 and 1034. Since relay 1029 was not operated during the coin return sequence operation it does not release at this time. The release of relay 1034 in turn causes the release of relays 614, 1038 and 1025 by opening their operating paths described above and removes the —110 volts connected through contacts 2 and 3 of relay 614 from the tip and ring leads 515 and 516 thereby removing the coin return potential from the subset 210.

The release of relay 1022, described above, causes the release of relays 1043 and 624 by opening their operating paths also described above. When the relays 624 and 1043 release, they open the path from battery 1045 thereby removing the +110 volt check potential on the tip lead 641. The removal of the +110 volts on the tip 641 causes the relay +830 to release which in turn allows relay 945 to release and extinguish the coin return lamp, not shown, at the operator's position.

*Operator ringback during overtime*

When it is necessary for the coin supervisory operator to recall the coin subscriber during the overtime period, the operator operates the ringing key, not shown, associated with the cord connected to jack 931. The operation of the ringing key connects a —48 volt battery, not shown, through contact 2 of relay 949 normal, the lower contact of relay 945 normal, contact 6 of relay 920 operated, contact 8 of relay 711 normal, contact 8 of relay 710 normal and contact 8 of relay 715 normal to the winding of relay 834 causing said relay to operate. When relay 834 operates, it locks through its contact 3 by-passing the contacts of relays 710, 711 and 715, as described above, through contact 6 of relay 920 operated, the lower contact of relay 945 normal and contact 2 of relay 949 normal through the jack 931 to the —48 volt battery, not shown. The operation of relay 834 also closes —110 volts through the negative potential source 850 through resistor 851, contact 1 of relay 834 operated, contact 6 of relay 815 normal to the make contact 4 of relay 711 which is at this time normal for connection, as is hereinafter described, to the tip lead 641 to the step-by-step office. Relay 711 is operated when relay 834 operates over a path from the winding of relay 711 through contact 2 of relay 710 normal, contact 4 of relay 815 normal, contact 3 of relay 834 operated to ground on contact 3 of relay 834. When relay 711 operates, it closes the —110 volt signal on its make contact 4 to the tip 641 of the trunk to the step-by-step office.

The —110 volt signal on the tip 641, in general, causes the relay —645 to operate causing the associated ringing relay 612 to operate to send ringing current to operate the calling subscriber's bell. There is no return check of this type of operation and the coin operator can ring at will during the overtime p riod. More specifically the —110 volts on the tip lead 641 is connected through contact 6 of relay 624 normal, contact 1 of relay 619 normal, coil 623 to the windings of relay 645 causing relay —645 to operate. When relay —645 operates, it in turn causes the operation of relay 1011 through contact 1 of relay —645, and of relay 612 through contact 2 of relay 1051 operated, the upper contact of relay 651 operated, contact 2 of relay 633 normal, contact 5 of relay 618 normal and contact 2 of relay —645 now operated. The operation of relay 612 maintains both relays 660 and 610 operated with relay 660 operating over a path from its lower winding through resistor 658, through contact 3 of relay 611 operated, resistor 663, preliminary make contact 1 of relay 612 operated, contact 2 of relay 611 operated, through resistor 657, to the upper winding of relay 660 and the operating path for relay 610 being from its lower winding through the contact of relay 660 operated. When relay 612 operates, it also transfers the tip and ring leads 515 and 516 to the continuous ringing supply from leads 670 and 671. The tip lead 515 is connected through coil 616, contact 2 of relay 614 normal, contact 6 of relay 613 operated and contact 3 of relay 612 operated, through lamp 672 to lead 670, and ring lead 516 is connected through coil 615, contact 3 of relay 614 normal, contact 5 of relay 613 operated and contact 2 of relay 612 operated, to the lead 671 to the continuous ringing supply, not shown. Ringing potential in this manner is applied through the trunk finder 511, leads 333 and 330, the coin trunk circuit 120 to the line 240 as long as the operator holds the ringing key.

The release of the ringing key allows relay 834 to release, which in turn releases relay 711 the release of relay 711 removes the —110 volts on the tip lead 641, allowing relay —645 to release and in turn release relays 1011 and 612 to remove thereby the connections to the continuous ringing supply, not shown.

*Splitting the connection by the coin operator during overtime*

If the coin operator has difficulty in obtaining coin deposits in the overtime period, the operator can block further conversation between the called and calling subscribers and will be able to talk to either subscriber. The sequence of events that occur when the operator splits the connection in this manner is not shown in any of the operating sequence charts of Figs. 15 through 23. In order to split the connection in this manner the coin operator inserts another cord in the jack 932 and operates thereby the relay 933. When relay 933 operates, it connects ground through its lower contact and contact 4 of relay 1320 operated, to the winding of the splitting relay 950 causing said relay to operate. The operation of the splitting relay 950 breaks or splits the called subscriber's end of the connection from the calling subscriber's end at its contacts 1 and 5. The coin operator can, under this condition, talk to either party by operating the proper cord key also not shown. Supervision can only be obtained from the calling subscriber, as is hereinafter described, and not by the called subscriber. When the difficulty is adjusted the operator restores the connection by removing the cord plug from jack 932 removing thereby battery from the windings of relay 933 causing it to release and in turn release relay 950.

*Subscriber flashing*

Should the calling subscriber wish to flash the operator either during the period the operator is in on the connection to supervise the initial deposit, or during the overtime period, the subscriber may be so in the usual manner by flashing the switchhook. Since relay 660 is connected over the tip and ring leads 515 and 516 to the subset 210, and since relay 610 is operated under control of relay 660, both relays 660 and 610 alternately release and reoperate as the loop 240 is alternately opened and closed at the subset 210 by the flashing of the switchhook. Relay 1010, however, which is connected to ground through the operated lower contact of relay 610, holds over during the flashing, being a slow-to-release relay as indicated by the arrow pointing away from it. On the first release of relay 610, relay 1043 operates over a path through contact 2 of relay 1011 normal, contact 2 of relay 1010 operated, contact 3 of relay 633 normal, contact 6 of relay 618 normal, contact 2 of relay 634 normal, contact 5 of relay 629 normal, contact 4 of relay 669 normal, contact 1 of relay 627 normal, contact 2 of relay 624 normal and contact 5 of relay 1026 operated. When relay 1043 operates, it locks to ground through contact 2 of relay 634 normal, contact 6 of relay 618 normal, contact 3 of relay 633 normal, contact 2 of relay 1010 operated and contact 2 of relay 1011 normal, to the back contact of relay 610. The operation of relay 1043 causes relay 624 to operate by connecting it through contact 3 of relay 1043 to the operating ground for relay 1043 and also connects +110 volts from battery 1045 to the make contact 6 of relay 624. When relay 624 operates, it sends the +110 volts at its make contact 6 to the tip 641 to the tandem office as a flash signal. When relay 610 reoperates, relay 624 releases removing the +110 volts from the tip 641 but relay 1043 holds operated being a slow-to-release relay as indicated by the arrows pointing away therefrom. Relay 624 thereafter continues to operate each time relay 610 releases and to release each time relay 610 reoperates, alternately closing and removing the +110 volt flash signal to the tip 641 in response to the subscriber flashing. When the subscriber stops flashing, then relays 624 and 1043 will both release. The +110 volts on the tip lead 641 cause the relay +830 to operate since the lead 641 is connected thereto through contact 4 of relay 711 normal, coil 836 and contact 2 of relay 910 operated. During overtime there is an auxiliary path through contact 9 of relay 1225 which was operated at that time. This path, however, does not interfere with the flashing by the calling subscriber. When relay +830 operates, it shunts the 1800-ohm winding of relay 934 through contact 5 of relay 1320 operated, contact 15 of relay 1235 normal and contact 1 of relay +830 operated. When the winding of relay 934 is shunted in this manner, it flashes the operator's cord lamp, not shown. During overtime when relay 1225 is operated, relay 945 is operated through contact 12 of relay 1225 operated but serves no useful function at that time. During the initial deposit period the operation of relay +830 maintains the operation of relays 1240 and 1243 which were operated at that time.

If the coin subscriber should flash too slowly so that relay 1010 releases during the time relay 610 is released, the operating path for relays 624 and 1043 is opened at contact 2 of relay 1010, permitting those relays to release and in so doing to remove the +110 volt flash signal from tip 641. When relay 1043 releases, it causes relay 624 to reoperate over a path from the winding of relay 624 through contact 1 of relay 628 operated, contact 1 of relay 629 normal, contact 1 of relay 669 normal, contact 5 of relay 634 normal, through the contact 2 of relay 1043 normal, contact 3 of relay 1026 operated, contact 2 of relay 1010 normal, contact 2 of relay 1011 normal, to ground through the lower contact of relay 610 normal. When relay 624 reoperates, it opens the operate path of relay 1043 at its contact 2, locks under control of relays 627, 629 and 1043 normal, and closes the —110 volt battery 1044 through resistor 1047, contact 4 of relay 1043 normal, through contact 6 of relay 624 operated, to the tip lead 641 as a disconnect signal to the tandem office operator. If the coin subscriber should at this time resume flashing at the normal rate, so that relay 1010 reoperates, no action will take place until a check signal is received from tandem. The —110 volt signal on the tip lead 641 is connected through contact 4 of relay 711 normal, the repeat coil 836, contact 2 of relay 910 operated to the winding of relay —830 causing the relay —830 to operate. When relay —830 operates, it operates in turn the calling party disconnect relay 1235 by connecting ground from contact 3 of relay 830 operated thereto. When relay 1235 operates, it closes ground from contact 4 of relay —830 operated, through its contact 2 to contact 2 of relay 1330 normal, contact 16 of relay 920 operated, contact 1 of relay 711 normal, to the winding of relay 710 causing it to operate. When relay 710 operates, it closes —110 volts through resistor 921, contact 15 of relay 920 operated, contact 4 of relay 1235 operated and contact 10 of relay 710 operated, to the ring lead 640 of the trunk to the step-by-step office as a return check signal. The action that takes place in outgoing trunk circuit 140 in response to this —110 volt check signal on ring 640 is the same as that described hereinafter under Calling subscriber disconnects during overtime.

*Calling subscriber disconnects during overtime*

When the calling subscriber disconnects or flashes slowly enough to permit relay 1010 to release, as described above, a disconnect signal is transmitted to the tandem office. At first when relay 610 releases, it operates relays 1043 and 624 to momentarily transmit a +110 volt signal from battery 1045 on the tip lead 641 as a flash signal, as described above. However, when the slow-to-release relay 1010 finally releases, relay 624 releases removing the +110 volts from the tip lead 641 and relay 1043 is deenergized. When relay 1043 finally releases, ground from the lower contact of relay 610 reoperates relay 624 over a path through contact 2 of relay 1011 normal, contact 2 of relay 1010 normal, contact 3 of relay 1026 operated, the contact 2 of relay 1043 normal, contact 5 of relay 634 normal, contact 1 of relay 669 normal, contact 1 of relay 629 normal and contact 1 of relay 628 operated. When relay 624 reoperates, its short-circuits at its contact 5 the pulsing contacts of relay 610 to keep the loop closed on the ring side, locks under control of relay 629 over a path through contact 4 of relay 624 operated, contact 4 of relay 627 normal, contact 6 of relay 629 normal and contact 1 of relay 1043 normal to ground, prepares an operating path for relay 629 through contact 1 of relay 624 operated and closes —110 volts from battery 1044 through contact 6 of relay 624 operated, to the tip lead 641 as a disconnect signal to tandem. The —110 volt signal on the tip lead 641 operates relay 830 on its negative side. Under this condition ground from contact 3 of relay —830 operates relay 1235. When relay 1235 operates, it locks to ground under control of relays 715, 815 and 712, supplies steady ground from its contact 16 through contact 5 of relay 1320 operated, to relay 934 to hold the overtime operator's cord lamp lighted as a disconnect signal, and closes ground from contact 4 of relay —830 operated, through contact 2 of relay 1235 operated, contact 2 of relay 1330 normal, contact 16 of relay 920 operated, contact 1 of relay 711 normal, to the winding of relay 710 causing it to operate. When relay 710 operates, it closes a —110 volt signal through resistor 921, contact 15 of relay 920 operated, contact 4 of relay 1235 operated and contact 10 of relay 710 operated over the ring lead 640 as a return check signal to the step-by-step office.

The —110 volt check signal operates relay —646 over a path from the ring lead 640 through contact 1 of relay 618 normal, contact 5 of relay 624 operated, contact 3 of relay 619 normal and coil 620. When relay —646 operates, it in turn operates relay 1011 through contact 1 of relay 613 operated and contact 1 of relay —646, and operates relay 629 from contact 2 of relay —646 operated, through contact 1 of relay 1022 normal and contact 1 of relay 624 operated. When relay 1011 operates, it in turn causes the operation of relay 1010 which is connected through contact 2 of relay 1011 operated, to the lower contact of relay 610 normal, and opens the start path to the winding of relay 618 through its contact 1 to prevent the sending of a start signal if the subscriber should reseize at this time. When relay 629 operates, it maintains at its contact 4 the short circuit across the pulsing contacts of relay 610, operates relay 669 over a path to ground through contact 6 of relay 629 operated and contact 1 of relay 1043 normal and releases relay 624 by breaking its locking path at contact 6 of relay 629 operated. When relay 669 operates, it locks to ground through its contact 3 under control of contact 2 of relay 618 normal and prepares a path for the operation of relay 618 through contact 2 of relay 669 operated. The release of relay 624 maintains a holding path for relay 629 through contact 1 of relay 624 normal and contact 3 of relay 629 operated, removes the —110 volt disconnect signal from the tip lead 641 causing the relay —830 at the tandem office to release and in turn releases relay 710 and thus terminating the return check signal. When the —110 volt return check signal is removed from the ring 640 it causes relays —646, 1011, 1010 and 629 to release by opening their operating paths, described above in reference to their operation. The circuit remains in this condition until the coin operator disconnects as is hereinafter described. The coin operator may desire to ring back to recall the coin subscriber or to collect or refund the coin in the coin box of the subset 210. The sequence of operations that occur would be similar to those described above in reference to these functions during the overtime period.

If the calling subscriber should now reseize or resume flashing at a normal rate before the operator can disconnect, relays 610 and 1010 will operate. The operation of relay 610 closes ground to operate relay 618 through contact 1 of relay 1011 normal, contact 2 of relay 629 normal and contact 2 of relay 669 operated. When relay 618 operates, it locks under control of contact 1 of relay 633 normal, releases relay 669 by opening its operating path at contact 2 of relay 618 operated, and closes +110 volts from battery 1015 to the ring lead 640 as a reseizure signal to the tandem office. The reseizure signal at the tandem office cancels the disconnect signal previously sent. The tandem office returns a —110 volt check signal on the tip lead 641 to operate relay —645, as described above, in reference to the seizure sequence of operations. When relay —645 operates, it in turn operates relays 1011 and 633. The operation of relay 633 releases relay 618 but holds to ground through contact 5 of relay 618 normal and contact 2 of relay —645. When relay 618 releases, it removes the +110 volt battery 1015 from the ring lead 640 and the tandem office in turn removes the —110 volt check signal from the tip lead 641. The removal of the —110 volt check signal in turn releases relays —645, 1011 and 633 restoring the circuit to the condition existing before the disconnect signal, described above, was transmitted. If the subscriber has resumed flashing, flash signals will again be transmitted to the tandem office, in the same manner as described above, when relays 1011 and 633 are restored to normal.

*Coin operator disconnects after receiving the disconnect signal from the calling subscriber*

As a result of the calling subscribers' disconnect-signals, as described above, relay 1235 is locked under control of relays 815, 715 and 712, all normal, and the coin overtime operator's cord signal is lighted to indicate that the coin subscriber has released. Under this condition the coin supervisory operator removes the plug from the jack 931 causing relay 934 to release. When relay 934 releases, it closes ground from contact 3 of relay 910 operated, through the upper contact of relay 934 normal, through contact 8 of relay 920 operated, contact 1 of relay 1235 operated, contact 14 of relay 1320 operated, contact 1 of relay 710 normal, to the winding of the overtime disconnect relay 1330 causing it to operate. When relay 1330 operates, it closes ground from its contact 4, through contact 4 of relay 815 normal and contact 2 of relay 710 normal, to the winding of relay 711 causing it to operate. When relay 711 operates, it closes +110 volts through resistor 1331 and contacts 5 of relay 1330 operated, contact 6 of relay 815 normal and contact 4 of relay 711 operated, over the tip lead 641 to the step-by-step office as a disconnect signal. When relay 1330 is operated, the coin or calling subscriber cannot start a new call through the incoming trunk 140 because the circuit to the relays +830 and +813 is opened. The +110 volts transmitted on the tip lead 641 operate relay +645. The operating paths during the sequence of operations, described below, are omitted in this description since they have been described above in detail. When relay +645 operates, it in turn operates the relays 1011 and 634. Relay 634 locks under control of relay 631 and connects —110 volts through resistor 680 to the make contact 1 of relay 618 and advances ground through its contact 3 from contact 3 of relay +645 to operate relay 618. When relay 618 operates, it releases at its contact 2 the ground connection for relay 669 and closes the —110 volts at its contact 1 to the ring lead 640 as a check signal to tandem. The step-by-step outgoing trunk 140 is held busy at this time so that it cannot be reselected until the tandem trunk 150 is restored as indicated by the removal of the +110 volt signal from the tip lead 641.

The —110 volt signal on the ring lead 640 causes the relay —813 to operate through contact 10 of relay 710 normal, coil 810 and contact 7 of relay 827 operated. When relay —813 operates, it closes ground from its contact 1 through contact 6 of relay 1330 operated to the winding of the disconnect relay 712 causing it to operate. When relay 712 operates, it locks to all the relays in the incoming trunk 150 that are operated at this time and causes all these relays to release. When relay 711 releases, it removes the +110 volt signal from the tip lead 641 to the step-by-step office as an indication that the tandem trunk 150 is normal. The step-by-step trunk 140, under this condition, as is hereinafter described, completes its restoral to normal and removes the busy condition so that it can be reselected. When the +110 volts are removed by the incoming trunk 150 from the tip lead 641, relay +645 releases. The release of relay +645 in turn releases relay 618 removing thereby the —110 volt check signal on the ring lead 640 and releases relay 1011. When relay 1011 releases, it opens the operating path for the slow-to-release relay 1010 which, when it restores to normal, in turn closes a path from ground at the lower contact 1 of relay 610 normal through contact 2 of relay 1011 normal, contact 2 of relay 1010 normal, contact 3 of relay 1026 operated, contact 2 of relay 1043 normal, contact 5 of relay 634 operated and contact 1 of relay 631 operated to the winding of relay 627 causing it to operate. When relay 627 operates, it locks through its contact 3 and contact 2 of relay 631 operated to ground and causes the release of relay 628 by opening the ground connection at contact 5 of relay 627. When the slow-to-release relay 628 releases, it shunts the relay 631 through contact 4 of relay 628 and contact 5 of relay 627 operated, to ground causing the release of relay 631. When relay 631 releases, it opens the operating paths for relays 627, 634, 611, 613, 650, 651, 1020, 1021, 1026, 1051 and 1052, and removes the ground connection from the leads 630 and 1013 to release the trunk finder 511 thus restoring the outgoing trunk circuit 140 to normal.

*Called subscriber disconnects during the overtime period*

If the called subscriber disconnects and the calling subscriber maintains connection during the overtime period, relay 835 releases as during the same circumstances in the initial charge period, as described above. When relay 835 releases, it opens the operating path for relay 812 and closes ground from contact 2 of relay 816 operated through the operated contact of relay 835 and contact 1 of relay 724 operated to the interrupter contact 741. When the interrupter contact 741 is closed, relay 739 operates and locks to ground through its upper contact by-passing the interrupter contact 741. After a time interval of 60 or 120 seconds later, ground from the interrupter contact 742 is closed through the lower contact of relay 739, contact 2 of relay 920 operated to the winding of relay 816 shunting it to ground and thus causing it to release. When relay 816 releases, it opens ground from its contact 2 through the operated contact of relay 835 to release relay 739 and also opens ground from its contact 3 through contact 1 of relay 1310 to the trunk link and connector circuit 1312 to release the outgoing connection and thus free the called subscriber's line. The balance of the tandem trunk circuit 150 and the step-by-step connection remains as is until the calling subscriber and the coin supervisory operator disconnect. The disconnect and release thereafter remain the same, as described above, in reference to the description of the disconnect of the calling subscriber and thereafter of the supervisory operator.

*Operator disconnects before calling subscriber in the overtime period*

If the coin supervisory operator disconnects before the coin subscriber in the overtime period, relay 934 releases and closes interrupted ground from the interrupter 1245 through contact 8 of relay 1225 operated, contact 19 of relay 1235 normal, contact 4 of relay 920 operated, the lower contact of relay 934 normal, contact 11 of relay 910 operated, through the contact 3 of the operated one of relay 1010, 1011, 1012 or 1013 to its associated zone lamp 1115, 1116, 1117 or 1118 at the operator's position causing it to flash as an indication that the cord plug was removed from the associated jack 931 in error. The interrupter, not shown, with a different rate of flashing, may be used to distinguish the flashing error from the regular overtime signal.

*Abandoned calls*

If the call is abandoned after sender 180 is attached but prior to plug-in by the coin operator, the step-by-step trunk 140 releases its relay 610, operating relays 619 and 653. Relay 610 also opens the tip lead 641 and ring lead 640 to tandem for a minimum of one-half second at the upper contacts of relay 610, to insure release of the sender, before operating relay 624 to send a —110 volt signal on the tip lead 641 to tandem as the disconnect signal. The one-half second delay is provided by the slow releasing characteristic of relay 1010, which when it finally releases, releases relays 619 and 653 and closes a path from ground at the lower contact of relay 610 normal and through contacts of relays 1011, 1010, 1026, 653, 634, 669 and 629 normal and relay 628 operated to operate relay 624. The sequence of operations that thereafter occurs is similar to that described above in reference to disconnect by the calling subscriber during the initial charge period. The —110 volt signal on the tip lead 641 causes relay —830 to operate which in turn operates relay 1235. Relay 1235, upon operating, locks under control of relays 715 and 712 normal and closes ground through relays 1320, 710 and 711 to the primary winding of relay 715 causing it to operate. When relay 715 operates, it locks to relay 712 normal on its secondary winding and further opens the circuit to the tip and ring leads 1322 and 1321 to the sender 180. The trunk circuit 150 under this condition waits for the sender 180 to release and release the trunk relay 812 which was operated over lead 1222. When the trunk relay 812 is normal the locking ground of relay 715 is closed through relay 1235 operated, and relay 711 normal to the winding of relay 710 causing it to operate. Relay 710, upon operating, closes a +110 volt signal from battery 855 through relay 815 normal, through relays 715 and 1235 operated, over the ring 640 as a return check signal to the step-by-step office. Under this condition the step-by-step trunk functions by operating relays +646, 1011 and 627 and releasing relay 624 to remove the −110 volt disconnect signal from the tip 641 to tandem. The removal of the −110 volts from the tip 641 causes the tandem trunk relay −830 to release and in turn release relay 1235 as its original operating circuit was opened when relay 715 operated. The release of relay 1235 causes relay 710 to release and remove the return check signal to the step-by-step trunk 140 causing it to restore to normal, as described above, in reference to Fig. 23, after approximately .5 second. Relay 1235 also closes ground from relay 1320 normal through relay 724 normal, relay 715 operated to the winding of relay 712 causing it to operate. When relay 712 operates, it locks to all operated relays in the trunk 150 and causes all operated relays to release.

If the call is abandoned while the coin operator is plugged in to obtain the initial charge deposit, the sender 180 is held by the trunk through the operated relay 920. The step-by-step trunk 140 sends a −110 volt signal on the tip 641 to tandem, as described above, causing the relay −830 to operate. When relay −830 operates, it operates relay 1235 which locks under control of relays 815, 715 and 712 normal. The operation of relay 1235 also prepares the circuit for the return check disconnect to the step-by-step office, as described above, and connects ground from its contact 16 to shunt out the 1800-ohm winding of the relay 934 to light the coin supervisory operator's coin lamp. When the operator removes the plug from the jack 931, relay 934 releases and closes ground from relay 910 operated through relay 920 normal, relays 1320 and 1235 operated, relays 710 and 711 normal to the primary winding of relay 715 causing it to operate.

Relay 715 operates, locking to relay 712 normal and opening the sender ring lead 1227 to release the sender 180. When the sender 180 restores to normal, it releases relays 812 and 910 which close the locking ground of relay 715 through relay 1235 operated, and relay 711 normal to the winding of relay 710 causing it to operate. When relay 710 operates, it closes a +110 volt signal through relay 815 normal, and relays 715 and 1235 operated to the ring 640 to the step-by-step office as a return check disconnect signal. The step-by-step trunk 140 operates to remove the −110 volt signal from the tip conductor 641 to tandem causing the relay −830 to release. When relay −830 releases, it causes relay 1235 to release which in turn closes ground from relay 1320 which released when relay 910 was released by the sender 180 through relay 724 normal and relay 715 operated to the winding of relay 712 causing it to operate. When relay 712 operates, it locks to all the operated relays in the trunk 180 and causes these relays to release. Under this condition the return check disconnect signal over the ring lead 640 to the step-by-step office is opened to allow the trunk 140 to restore to normal.

If the call is abandoned after relay 910 was operated but before the coin operator answered, the step-by-step trunk 140 functions, as described above, to open the tip and ring 641 and 640 to tandem for a minimum of one-half second and then sends −110 volts on tip 641 as a disconnect signal. Inasmuch as the sender line relay, not shown, is held in a local circuit to ground on relay 910, it must wait for the relay 715 to operate before it can restore to normal. The −110 volt signal on the tip lead 641 operates relay −830 which in turn operates relay 1235. Relay 1235 locks under control of relays 715 and 712 and closes ground through relay 1320 normal and relays 710 and 711 normal to the primary winding of relay 715 causing it to operate. When relay 715 operates, it opens the ring lead 640 to the sender 180 causing it to release. When the sender is released the relays 812 and 910 release and the release of circuits 140 and 150 proceeds as described above.

If the call is abandoned after the coin operator disconnects but before the sender 180 completes its selection, the opening of the tip and ring 641 and 640 releases the sender 180.

When the coin operator removed the plug from the jack 931 following the initial deposit condition, the relay 934 released and caused the relay 1225 to operate and signal the sender 180 to release the relay 910. When relay 1225 released, it released relay 1320. After the pen interval the step-by-step trunk sends a −110 volt signal over the tip lead to tandem to operate the relay −830. When relay −830 operates, it operates in turn relay 1235. When relay 1235 operates, it closes ground to the primary winding of relay 715 causing it to operate. The release thereafter is the same as described above.

If the coin subscriber leaves the subset 210 with the receiver off the switchhook while the operator is plugged in during the initial deposit period, the relays 910, 934 and 1320 are operated and the relay 1225 is normal. In order to clear the connection under such circumstances the circuit is arranged so that the operator, by inserting the plug in the splitting jack 932, will cause the relay 715 to operate as on a local code. The insertion of the plug of a cord in the "Split" jack 932 causes relay 933 to operate and operate in turn relay 950 through contact 4 of relay 1320 operated. When relay 950 operates, it closes ground from contact of relay 1225 normal, through contact of relay 920 normal, contact of relay 1320 operated, contact of relay 1235 normal, contact of relay 831 normal, contact of relay 815 normal, contact of relay 710 normal and contact of relay 711 normal to the primary winding of relay 715 causing it to operate. When relay 715 operates, it locks on its secondary winding to relay 712, and opens the ring lead 1227 to the sender 180 to cause it to release. When the sender 180 releases, it releases the relays 812 and 910. The relay 910 releases and releases in turn the relay 1320 which closes ground to shunt out the 1800-ohm winding of relay 934 to give a disconnect signal to the coin operator. The release of relay 812 closes the locking ground of relay 715 through relays 1235, 920, 831, 815 and 710 normal, to the winding of relay 711 causing it to operate. When relay 711 operates, it closes +110 volts through relays 815 and 1235 normal, and through relay 711 operated, over the tip lead 641 to operate the relay +645 in the outgoing trunk 140 at the originating step-by-step office. The sequence of operations in trunk 140 thereafter proceeds, as described hereinafter, in reference to Local call.

When relay +645 operates, it causes relay 634 to operate to cause the calling line to be transferred to the local train, as described hereinafter, and sends back a −110 volt signal over the ring 640 of the trunk to tandem as a return check signal.

The −110 volt signal on the ring 640 operates the relay −813 through the relays 710 and 812 normal. When relay −813 operates, it closes ground through relay 715 operated, relay 832 normal to the winding of relay 831 causing it to operate. When relay 831 operates, it releases relay 711 to terminate the +110 volt signal on the tip 641 to the step-by-step office. The removal of +110 volts from the tip 641 releases the relay +645 in the outgoing trunk 140 which causes the trunk to disconnect on a time basis of approximately 0.1 second. It also immediately removes the −110 volt return check signal to tandem. The removal of the −110 volt return check signal from the ring lead 640 causes relay −813 to release and allows relay 832 to operate. When relay 832 operates, it closes ground through relay 715 operated to the winding of relay 712 causing it to operate. When relay 712 operates, it locks to all operated relays and causes all operated relays in the tandem incoming trunk 150 to release thus restoring the circuit to normal.

*Local call*

When the marker 190 determines that the call should be handled via the originating step-by-step office local train consisting of selector switches 121, 122, etc., it connects ground to lead 1313 through the trunk line and connector circuit 1312. The ground connection is closed through contact 7 of the operated frame relay 1310 of the tandem trunk through contact 4 of relay 831 normal, contact 1 of relay 815 normal, contact 9 of relay 710 normal, contact 9 of relay 711 normal, to the primary winding of relay 715 causing it to operate. When relay 715 operates, it locks on its secondary winding through relay 712 normal, and opens the sender lead 1227 at its contact 10 to release the sender 180. After approximately one-half second the sender 180 releases the relay 812 by removing the ground connection from lead 1222 and thereafter releases the sender link 1220. With relay 812 normal the locking ground of relay 715 is closed through contact 4 of relay 715 operated, contact 8 of relay 812 normal, contact 13 of relay 1235 normal, contact 12 of relay 920 normal, contact 2 of relay 831 normal, contact 4 of relay 815 normal and contact 2 of relay 710 normal to the winding of relay 711 causing it to operate. When relay 711 operates, it closes the +110 volt battery 855 through contact 9 of relay 815 normal, contact 9 of relay 715 normal, contact 17 of relay 1235 normal, contact 6 of relay 815 normal, and contact 4 of relay 711 operated, over the tip lead 641 to the step-by-step outgoing trunk 140 as a local code signal.

This signal in general causes the step-by-step outgoing trunk 140 to signal the coin trunk circuit 120 to cut the calling subscriber through to the local train for completion of the call, and sends a return check signal of −110 volts over the ring lead 640 to tandem.

More specifically, the +110 volts transmitted on the tip lead 641 operates relay +645 during the interdigital time when relays 619 and 653 are normal, the tip lead 641 being connected thereto through contact 6 of relay 624 normal, contact 1 of relay 619 normal, and coil 623. When relay +645 operates, it in turn operates relays 1011 and 634, the winding of relay 1011 being connected to ground through contact 4 of relay +645 and of relay 634 through contact 3 of relay +645. The operation of relay 1011 opens the operating path of relay 619 at its contact 2, preventing any further operation of relay 619 on subsequent digits. Relay 634 locks on a separate winding under control of contact 4 of relay 631 operated, connects −110 volts through resistor 680 to the make contact 1 of the relay 618, advances the ground from contact 3 of relay +645 to operate relay 618 and grounds the lead 681. The relay 618, in operating, applies the −110 volts on its contact 1 to the ring conductor 640 toward tandem as a check signal.

The −110 volt signal on the ring lead 640 is closed through coil 810, contact 6 of relay 812 normal, the winding of the relay −813 and resistance 814 to ground. The negative side of relay −813 operates and operates in turn the relay 831 which is connected to ground at contact 1 of relay −813, through contact 5 of relay 832 normal and contact 2 of relay 715 operated. When relay 831 operates, it releases the relay 711 by opening its normal contact 2 to remove the local code signal from the tip lead 641 to the step-by-step office. The removal of the +110 volts from the tip 641 releases relay +645 which in turn releases relays 618 and 1011 and removes the check signal from the ring lead 640.

The removal of the return check signal from the ring lead 640 releases relay −813 which allows the prime relay 832 to operate by opening the shunting connection which was connected thereto and to the winding of relay 831. When relay 832 operates, it closes ground through its contact 3 and contact 7 of relay 715 operates to operate relay 712. When relay 712 operates, it releases all the operated relays in circuit 150 and when they are all released it in turn releases in a similar manner as described above. The ground on the lead 681 signals the coin trunk 120, through the trunk finder 511, that the call should be completed locally and the coin trunk 120 then functions to open the loop across the tip and ring leads 515 and 516 to the circuit 140 to release the tandem connection.

The ground on lead 681 is connected to lead 532 towards the coin trunk circuit 120, operating relay 311. Relay 311, in operating, releases relay 410 at its contact 4, locks through contact 4 to ground on the line finder sleeve lead 250, and transfers, at its contacts 3 and 6, the calling subscriber's transmission path via tip and ring leads 270 and 260 from the trunk finder tip and ring leads 333 and 330 to the first selector tip and ring leads 521 and 522. The operation of relay 311 also opens, at its contact 2, the loop closure across the tip and ring leads 333 and 330, which extend through trunk finder 511 to tip and ring leads 515 and 516, causing outgoing trunk circuit 140 to release and in turn to release the tandem incoming trunk circuit 150 and trunk finder 511, as described below. In this way the tandem connection is released and the call is completed over the local train in the usual manner. When the loop closure across leads 515 and 516 is opened, as described above, relay 610 releases opening the loop toward tandem and also releasing relay 1010. The release of relay 1010 removes ground from the lead 1013 releasing the trunk finder 511. With relays 610 and 1010 released, ground is supplied from the back contact of relay 610 normal, contact 2 of relay 1011 normal, contact 2 of relay 1010 normal, contact 3 of relay 1026 normal, the lower contact of relay 653 normal, contact 5 of relay 634 operated and contact 1 of relay 631 operated, to the winding of relay 627 causing it to operate. When relay 627 operates, it locks to contact 2 of relay 631 and releases relay 628 at contact 5 of relay 627 which in turn closes a path through its contact 4 for shunting relay 631. When relay 631 releases, ground is removed from the sleeve lead 630 by opening contact 4, and all relays held locked to relay 631 now release, including relay 627, and the trunk is restored to normal.

It is to be understood that the above-described arrangements are illustrative of the application of the principles of this invention. Numerous other arrangements may be devised by those skilled in the art without departing from the spirit and scope of the invention.

What is claimed is:

1. In a telephone system, a step-by-step office; a plurality of subscribers' lines terminating therein; a coin box line having an impulsing device terminating therein; a tandem crossbar office; called offices associated with said tandem office; a plurality of subscribers' lines terminating in said called offices; a plurality of trunks extending between said step-by-step and said tandem offices; seizure means at said step-by-step office responsive to a calling condition on said coin box line for seizing an idle one of said trunks; means at said tandem office responsive to the operation of said seizure means for causing the operation of said tandem office to return dial tone to said coin box line; circuit means at said step-by-step office responsive to dial pulses from said coin box line for simultaneously extending said line locally and transmitting said pulses through said selected trunk to said tandem office; first control means at said tandem office responsive to predetermined ones of said dial pulses for initiating the disconnection of said trunk for a call to one of said subscribers terminating in said step-by-step office; second control means at said tandem office responsive to predetermined others of said dial pulses for controlling said circuit means to release the local extension of said line for a call to one of said subscribers terminating in one of said called offices; and means at said tandem office controlled by said second control means for indicating at said tandem office the coin rate of the desired connection.

2. In a telephone system in accordance with claim 1, including means in said step-by-step office and said tandem office for reciprocally transmitting and receiving over said trunk positive and negative potentials of the same magnitude in response to each of certain predetermined operations in one of said offices for initiating each of certain predetermined operations in the other of said offices.

3. In a telephone system in accordance with claim 2, including local selector switches connecting said step-by-step office with said subscribers' lines terminating in said step-by-step office; timing means at said step-by-step office effective after a predetermined interval to disconnect said tandem office from said step-by-step office; and means in said step-by-step office controlled by said timing means for providing dial tone to said coin box line.

4. In a telephone system, a step-by-step office comprising a plurality of coin box lines terminating in said step-by-step office, each of said coin box lines having an impulsing device, a line circuit for each of said coin box lines; a plurality of line finders controlled by said line circuits in response to a calling condition on one of said lines to seize said calling line; a plurality of coin trunk circuits selectively connected to and controlled by said plurality of line finders; and a plurality of trunk finders connectable to said plurality of coin trunk circuits, each of said plurality of coin trunk circuits comprising means for initiating the operation of said plurality of trunk finders responsive to the energization of one of said plurality of line circuits before the seizure of a calling one of said lines by one of said plurality of line finders whereby the seizure of one of said plurality of coin trunks is facilitated.

5. In a telephone system in accordance with claim 4 wherein said step-by-step office comprises in addition a plurality of outgoing trunks selectively connected to said plurality of trunk finders, and a tandem office having a plurality of incoming trunks selectively connected to said plurality of outgoing trunks in said step-by-step office.

6. In a telephone system in accordance with claim 5 wherein said step-by-step office and said tandem office include initiating and responsive means for reciprocally providing plus or minus prime and check potentials of the same magnitude through said seized trunk extending between said step-by-step office and said tandem office in response to each of certain predetermined operations in one of said offices for initiating each of certain predetermined operations in the other of said offices as are necessary for placing a call from said coin box line through said tandem office.

7. In a telephone system, a step-by-step office; a plurality of subscribers' lines terminating therein; a coin box line having an impulsing device terminating therein; a tandem crossbar office; called offices; a plurality of subscribers' lines terminating in said called offices; a plurality of trunks extending between said step-by-step and said tandem offices; means at said step-by-step office responsive to a calling condition on said coin box line for seizing an idle one of said trunks and for causing the operation of said tandem office to return dial tone through said step-by-step office to said coin box line; means at said step-by-step office responsive to dial pulses from said coin box line for simultaneously extending said line locally and transmitting said pulses through said selected trunk to said tandem office; initiating and responsive means at said step-by-step and said tandem offices for providing plus or minus prime and check signals of the same magnitude of potential through said trunks for each of certain predetermined operations in the sequence of operations necessary for placing a call from said coin box line through said tandem office; control means at said tandem office responsive to predetermined ones of said dial pulses for initiating the disconnection of said trunk for a call to one of said subscribers terminating in said step-by-step office; and control means in said tandem office responsive to predetermined others of said dial pulses for indicating at said tandem office the coin rate of the desired connection for a call to one of said subscribers terminating in one of said called offices.

8. In a telephone system, a step-by-step office; a plurality of subscribers' lines terminating therein; a coin box line having an impulsing device terminating therein; a tandem crossbar office; a plurality of trunks extending between said step-by-step and said tandem offices; seizure means at said step-by-step office responsive to a calling condition on said coin box line for seizing an idle one of said trunks, responding means at said tandem office responsive to the operation of said seizure means for returning dial tone through said step-by-step office to said coin box line; local selector switches connecting said subscribers' lines and said step-by-step office; timing means at said step-by-step office operative upon failure to receive dial tone from said responding means to disconnect said seized trunk; and means controlled by said timing means for providing dial tone through said local selector switches.

9. In a telephone system, a step-by-step office; a plurality of subscribers' lines terminating therein; a coin box line having an impulsing device terminating therein; a tandem crossbar office; a plurality of trunks extending between said step-by-step and said tandem offices; means at said step-by-step office responsive to the calling condition of said coin box line for seizing an idle one of said trunks and for causing the operation of said tandem office to return dial tone through said step-by-step office to said coin box line; local selector switches connecting said subscribers' lines and said step-by-step office; means at said step-by-step office responsive to dial pulses from said coin box line for simultaneously extending said line locally and transmitting said pulses through said seized trunk to said tandem office; timing means operative upon failure to receive dial tone from said tandem office to disconnect said seized trunk; and means controlled by said timing means for locally providing dial tone for extending said coin box line through said local selector switches.

10. In a telephone system, a first office; a plurality of lines including a coin box line having an impulsing device terminating therein; a tandem office; called offices connected to said tandem office; control means in said tandem office; a plurality of trunks extending between said first and said tandem offices; an operator's position in said tandem office having cord circuits for connection with said trunks; means at said first office responsive to a calling condition on said coin box line for seizing an idle one of said trunks and for causing the association of said control means in said tandem office with the seized trunk; a plurality of coin charge lamps for each of said trunks at said operator's position; means controlled by said control means in response to the transmission of the digit impulses of the number of a desired line terminating in one of said called offices for selectively lighting one of the lamps of the selected trunk indicative of the coin rate for the desired connection; means operative following the connection of a cord circuit at said position with the selected trunk for enabling the operator to request and to check the deposit of the required coin or coins as indicated by the lighted coin charge lamp; and means controlled by said control means in said tandem office in response to the transmission of the digit pulses of the number of one of said lines terminating at said first office for disconnecting said seized trunk and for dissociating said control means therefrom.

11. In a telephone switching system, a first exchange, a plurality of lines connected to said first exchange, a second exchange, a plurality of trunks extending between said first and said second exchanges, means in said first exchange responsive to the initiation of a calling condition on one of said lines for seizing an idle one of said trunks, means in said second exchange effective upon the seizure of one of said trunks for supplying dial tone over said seized trunk and through said first exchange to said calling line, means in said second exchange for registering dial pulse information from said calling line, and means in said first exchange effective during the operation of said register means and responsive to dial pulses from said calling line for setting up a local talking connection from said calling line.

12. In a telephone system in accordance with claim 11, in addition means in said second exchange controlled by said register means when said dial pulses identify one of said lines connected to said first exchange for releasing said seized trunk and for returning said register means to normal.

13. In a telephone exchange in accordance with claim 11, in addition means in said first exchange responsive when said dial pulses indicate a toll call for releasing said local talking connection.

14. In a telephone system in accordance with claim 11, in addition timing means in said first exchange operative upon failure to receive dial tone from said second exchange for disconnecting said seized trunk, and means in said first exchange controlled by said timing means for providing dial tone to said calling line.

References Cited in the file of this patent

UNITED STATES PATENTS

| | | |
|---|---|---|
| 2,000,804 | Wehren | May 7, 1935 |
| 2,761,900 | Joel | Sept. 17, 1955 |